United States Patent [19]

Takaishi

[11] Patent Number: 5,859,742
[45] Date of Patent: Jan. 12, 1999

[54] DISK STORAGE APPARATUS HAVING HEAD OVERSHOOT AND UNDERSHOOT CONTROL

[75] Inventor: Kazuhiko Takaishi, Kawasaki, Japan

[73] Assignee: Fujitsu Limited, Kawasaki, Japan

[21] Appl. No.: 683,062

[22] Filed: Jul. 16, 1996

[30] Foreign Application Priority Data

Nov. 17, 1995 [JP] Japan .................................... 7-299535

[51] Int. Cl.$^6$ ................................................. G11B 5/596
[52] U.S. Cl. .................................. 360/78.01; 360/78.08; 360/78.05; 360/77.07; 360/78.09
[58] Field of Search ............................ 360/77.02, 77.07, 360/78.04, 78.05, 78.08, 78.01, 78.09

[56] References Cited

U.S. PATENT DOCUMENTS

| | | |
|---|---|---|
| 4,217,612 | 8/1980 | Matla et al. . |
| 4,775,903 | 10/1988 | Knowles . |
| 4,835,632 | 5/1989 | Shih et al. . |
| 4,839,876 | 6/1989 | Fennema . |
| 4,894,599 | 1/1990 | Ottesen et al. . |
| 5,132,855 | 7/1992 | Waugh et al. . |
| 5,189,571 | 2/1993 | Murphy et al. . |
| 5,195,067 | 3/1993 | Yanagi . |
| 5,305,158 | 4/1994 | Ueda et al. . |
| 5,680,272 | 10/1997 | Kadlec et al. ...................... 360/78.04 |

FOREIGN PATENT DOCUMENTS

| | | |
|---|---|---|
| 0000261 | 1/1979 | European Pat. Off. . |
| 2039078 | 7/1980 | European Pat. Off. . |
| 0493035 | 7/1992 | European Pat. Off. . |
| 61-080529 | 4/1986 | Japan . |
| 1091379 | 4/1989 | Japan . |
| 2123575 | 5/1990 | Japan . |
| 2214075 | 8/1990 | Japan . |
| 2278582 | 11/1990 | Japan . |
| 31748 | 1/1991 | Japan . |
| 3233609 | 10/1991 | Japan . |
| 4298868 | 10/1992 | Japan . |
| 4335272 | 11/1992 | Japan . |
| 5143165 | 6/1993 | Japan . |
| 5158543 | 6/1993 | Japan . |
| 5274831 | 10/1993 | Japan . |
| 9010630 | 9/1990 | WIPO . |

OTHER PUBLICATIONS

Jianzhong Chen, Osami Tsukamoto and Atsuo Hanazato: Reduction of Seek–Time of Hard Disk Drive by Dead–Beat Control; T .IEE Japan, vol. 113–D, No. 11, 1993.

Takashi Yamaguchi, Kazuhisa Shishida, and Hiromu Hira: Basic Study of the Initial Value Compensation at Mode Switching for Head Positioning Servo Magnetic Disc Drives, Papers; Japan Society of Measurement and Automatic Control, vol. 29, No. 7, pp. 792–799 (1992).

Takashi Yamaguchi, Kazuhisa Shishida, and Hiromu Hira: Variable Structure Control System for the Head Positioning Servo System of the Hard Disk Drive; MR 90 –66 (1990).

Mitsuo Hirata, Kang–Zhi Liu, Tsumtou Mita, and Takashi Yamaguchi: Head Positioning Control of a Hard Disk Drive Using H $\infty$ Control Theory; Papers, Japan Society of Measurement and Automatic Control, vol. 29, No. 7, pp. 71–77 (1993).

(List continued on next page.)

*Primary Examiner*—Nabil Hindi
*Attorney, Agent, or Firm*—Greer, Burns, & Crain, Ltd.

[57] ABSTRACT

A feedforward current from a feedforward current setting module, a target location trajectory from a position control module, and a correction value from a correction value setting module are produced for an elapsed time from each seek start time, namely at each sampling timing of a predetermined sample count. In the position control module, the position feedback control in response to an error between a target location and real position is performed in combination with the feedforward current. On a seek distance of one track, a coarse time is set to be 3 samples, for example. By intentionally slipping the target location trajectory from its ideal value, an overshoot and undershoot are restricted.

34 Claims, 54 Drawing Sheets

OTHER PUBLICATIONS

Koji Saito, Naoki Honda, Goro Obinanta, and Kasuhiro Ouchi: An Application of $H_2/H_\infty$ Control to Head Track Seek in Rigid Disk System; Technical Report of IEICE. MR 94–19 (1994).

Shinji Takakura, Takehito Yamada: Head Positioning Control System for Hard Disk Drives; Technical Report of IEICE. MR 93–11–1993.

Shinji Takakura and Takehito Yamada: Head Positioning Control System for Hard Disk Drives: Second International Conference on Motion and Vibration Control, Yokohama, Aug. 30—Sep. 3, 1994.

J. Ishikawa, T. Hattori, M. Hashimoto, T. Tsujisawa, and H. Inada: High–speed Positioning Control for Hard Disk Drives using a Two Degree–of freedom Controller Proceedings, 71st General Conf., Japan Society of Mechanical Engineers (IV) (1994).

J. Ishikawa, M. Hashimoto, and T. Tujisawa: A High–speed Track Access Technique Based on Two Degree–of–freedom control; Second International Conference on Motion and Vibration Control, Yokohama, Aug. 30—Sep. 3, 1994.

Susumu Hasegawa, Kazuhiko Takaishi, and Yoshifumi Mizoshita: Digital Servo Control for Head Positioning of Disk Drives: Fujisu Sci. Tech. J, 26, 4 (1991).

Eiji Okamura: Precision Seek Control of HDD with Dynamic Offset; Papers, Japan Society of Mechanical Engineers (Part C) vol. 60, No. 576, Paper No. 93–1931 (1994).

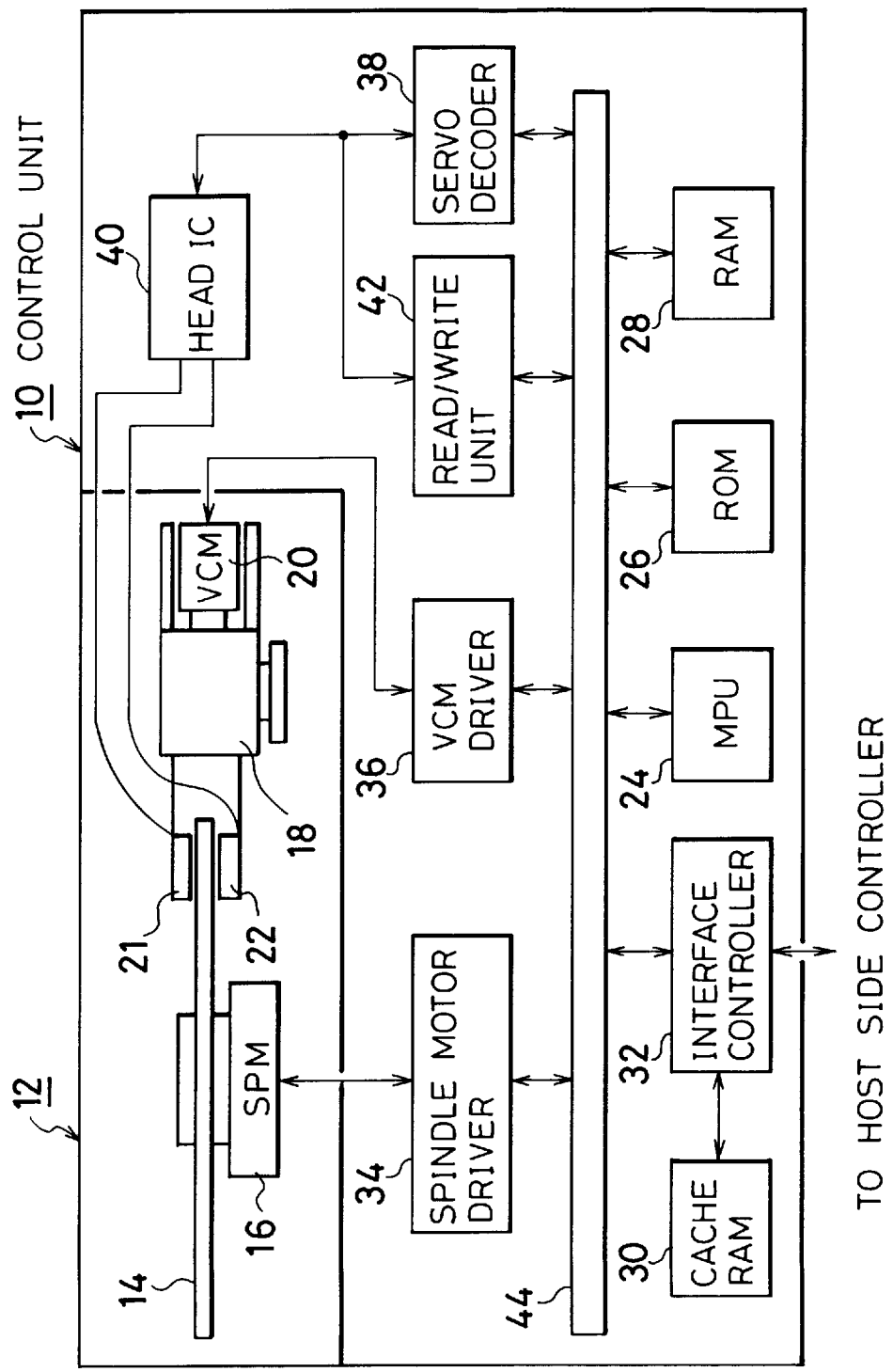

FIG. 8

| SEEK DISTANCE | SAMPLE NO. | CORRECTION VALUES | FIRST FF CURRENT | SECOND FF CURRENT |
|---|---|---|---|---|
| 1 | 1<br>2<br>3 | K11<br>K12<br>K13 | FI11<br>FI12<br>FI13 | SI11<br>SI12<br>SI13 |
| 2 | 1<br>2<br>3 | K21<br>K22<br>K23 | FI21<br>FI22<br>FI23 | SI21<br>SI22<br>SI23 |
| 3 | 1<br>2<br>3 | K31<br>K32<br>K33 | FI31<br>FI32<br>FI33 | SI31<br>SI32<br>SI33 |
| 4 | 1<br>2<br>3 | K41<br>K42<br>K43 | FI41<br>FI42<br>FI43 | SI41<br>SI42<br>SI43 |
| 5 | 1<br>2<br>3<br>4 | K51<br>K52<br>K53<br>K54 | FI51<br>FI52<br>FI53<br>FI54 | SI51<br>SI52<br>SI53<br>SI54 |
| 6 | 1<br>2<br>3<br>4 | K61<br>K62<br>K63<br>K64 | FI61<br>FI62<br>FI63<br>FI64 | SI61<br>SI62<br>SI63<br>SI64 |
| 7 | 1<br>2<br>3<br>4 | K71<br>K72<br>K73<br>K74 | FI71<br>FI72<br>FI73<br>FI74 | SI71<br>SI72<br>SI73<br>SI74 |
| 8 | 1<br>2<br>3<br>4 | K81<br>K82<br>K83<br>K84 | FI81<br>FI82<br>FI83<br>FI84 | SI81<br>SI82<br>SI83<br>SI84 |
| 9 | 1<br>2<br>3<br>4<br>5 | K91<br>K92<br>K93<br>K94<br>K95 | FI91<br>FI92<br>FI93<br>FI94<br>FI95 | SI91<br>SI92<br>SI93<br>SI94<br>SI95 |
| 10 | 1<br>2<br>3<br>4<br>5 | K101<br>K102<br>K103<br>K104<br>K105 | FI101<br>FI102<br>FI103<br>FI104<br>FI105 | SI101<br>SI102<br>SI103<br>SI104<br>SI105 |
| 11 | 1<br>2<br>3<br>4<br>5 | K111<br>K112<br>K113<br>K114<br>K115 | FI111<br>FI112<br>FI113<br>FI114<br>FI115 | SI111<br>SI112<br>SI113<br>SI114<br>SI115 |
| 12 | 1<br>2<br>3<br>4<br>5 | K121<br>K122<br>K123<br>K124<br>K125 | FI121<br>FI122<br>FI123<br>FI124<br>FI125 | SI121<br>SI122<br>SI123<br>SI124<br>SI125 |

74-1

F I G. 11
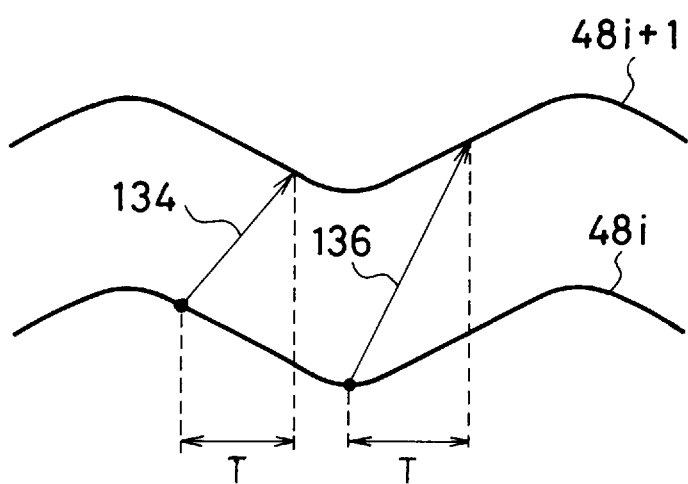

FIG. 28

| SEEK DISTANCE | SEEK DIRECTION | FIRST SAMPLE CORRECTION COEFFICIENT | SECOND SAMPLE CORRECTION COEFFICIENT | THIRD SAMPLE CORRECTION COEFFICIENT |
|---|---|---|---|---|
| LESS THAN 2.0 TRACKS | FORWARD | -1.0 | -1.0 | -0.550 |
| LESS THAN 2.0 TRACKS | REVERSE | -1.0 | -1.0 | -0.520 |
| 2.0 TRACKS OR GREATER | FORWARD/REVERSE | -1.0 | -1.0 | -0.620 |

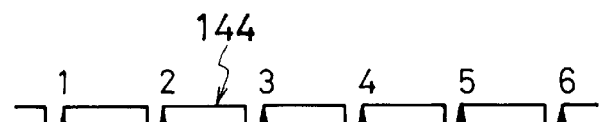
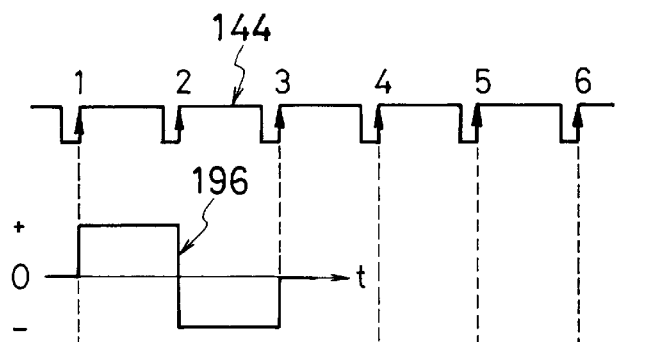
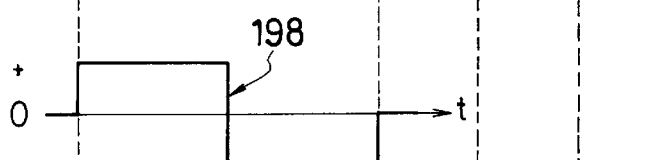
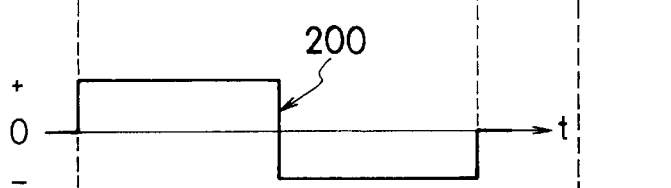
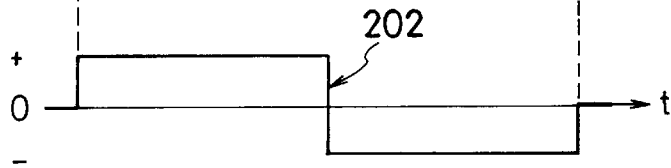
FIG. 38A
FIG. 38B
FIG. 38C
FIG. 38D
FIG. 38E

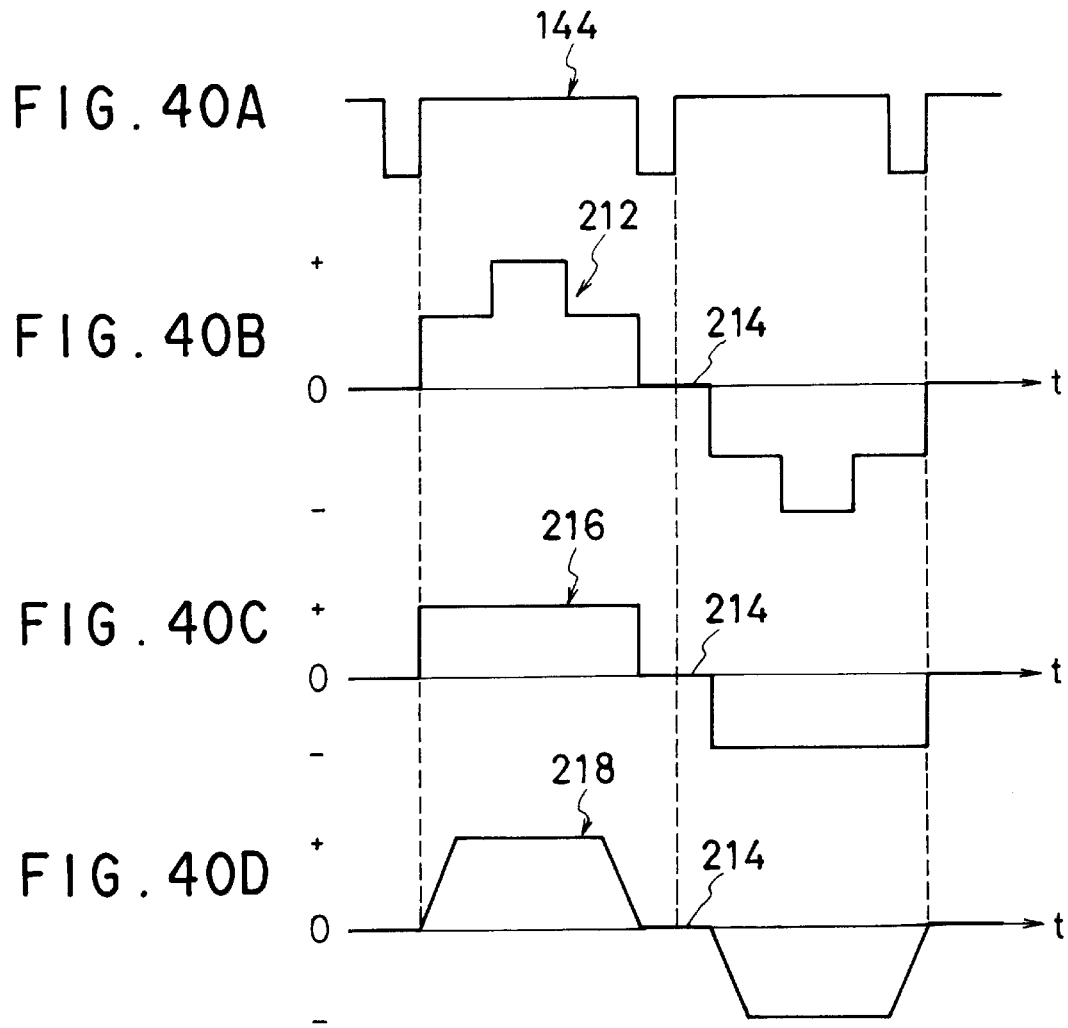

DISK STORAGE APPARATUS HAVING HEAD OVERSHOOT AND UNDERSHOOT CONTROL

BACKGROUND OF THE INVENTION

The present invention relates to a disk storage device that performs seek control of positioning a head to a target location at a fast speed, and, more specifically, to a disk storage apparatus which performs seek control over a short seek distance of 1 to 10 tracks to handle a sector servo having a relatively long sampling period for sampling a head location signal.

In the prior art disk storage apparatuses such as magnetic disk storage apparatuses, a head is mounted on each data surface of a plurality of disk media. In such a disk storage apparatus, the head switching time is substantially shorter than the time required for traversing one track, namely the one track seek time. To access data that continues beyond one track, a target track address is first sought, and then head switching is performed to access data on a different data surface but in the same track. As track pitch is narrowed with the increase of memory capacity, the offset between heads relatively increases, and thus offset correction is required when head switching is performed. For this reason, the head switching time is going to be equal to or exceed the one track seek time. Furthermore, the relative position of one head to another is likely to change with time, and the seek time is not constant. To write or read continuous data in the prior art, data over different data surfaces but in the same track is written or read, while head switching is performed. In the future, however, it is likely that a faster seek control is achieved by sequentially writing or reading data to or from the same disk surface on a one track seek basis, followed by head switching to shift to the next track.

FIG. 1 shows the change of the head location versus elapsed time in a typical seek control. Seek time, coarse time, settling condition and settling time frequently used in the following discussion are defined as follows. Seek time is the time from the reception of a seek command to positioning the head to its target location with its settling condition met. After the seek, the position error to the target location is measured. The settling condition is the condition that assures position error to within the permissible range of position error. The coarse time that is included in the seek time is the time the head takes to reach the target location from its seek start position, and excludes the settling time. The settling time is the time the head takes to satisfy the settling condition from its arrival to the target location.

I. Position gain

To perform a seek, the current location should be accurately acquired. In the magnetic storage disk apparatus, a location signal, for example, two-phase servo signal, is recorded on a disk medium so that the offset between tracks is determined. This position offset signal is typically an analog signal, and is thus fed to an MPU through an AD converter. To convert the output of the AD converter into a value in the unit of actual track, it should be multiplied by the gain that is beforehand measured on a track by track basis in order to achieve an appropriate position gain.

II. Loop gain

Since the force constant BL of a VCM (Voice Coil Motor) for driving a head actuator usually varies with track position, loop gain should be corrected to make the servo bandwidth of a control system constant. The force constant BL of the VCM and gain of an electric circuit system vary depending on temperature and the like, and correction gain stored beforehand in a firmware becomes unable to match the real value. Since the control system is designed and adjusted such that with no error taking place and its gain corrected, overshoot and undershoot are minimized and the settling time is shortest, variations of gain leads to a prolonged settling time. For this reason, the loop gain should be corrected so that the servo bandwidth of the control system is constant over all tracks.

III. Bias force

External force exerted to the actuator varies from place to place. Correction is required to make an external bias force constant regardless of place.

IV. Head-to-head offset

Head switching is required when the track numbers (cylinder numbers) are the same but with different head numbers. In this case, a head-to-head offset takes place. A one track seek needing head switching is associated with the offset involved in head switching, and thus results in 1.2 track seek in practice, affecting the seek time.

V. Mechanical resonance

Current characteristic with respect to the location of VCM is expressed by an equation that is proportional to a double integral. In practice, however, the current characteristic is influenced by the mechanical resonance between the actuator and the head. Depending on seek current, a mechanical resonance takes place, and a vibration remains after the seek. This post-seek vibration is called residual vibration. If a large residual vibration is generated, a long settling time is required before the vibration ceases.

VI. Runout

A target track on the disk is not concentric but slightly deformed in practice. Among deviation components from an ideal track, a component in synchronism with rotation is called a repeatable runout, and a component not in synchronism with rotation is called non-repeatable runout. The effect of the repeatable and non-repeatable runouts is problematic because of the following two reasons. First, a problem arises from the same track. In the course of the settling determination immediately after a seek, the settling condition remains difficult to satisfy due to the effect of the repeatable and non-repeatable runouts, and thus the settling time is prolonged.

FIGS. 2A and 2B plot the maximum values of each amplitude of the repeatable runout RRO and non-repeatable runout NRRO on each track when a position control system is track following to a target location in a 3.5-inch magnetic disk storage apparatus. As seen from these figures, the repeatable and non-repeatable runout values vary greatly from track to track. A second problem lies in adjacent tracks. To traverse from a current track to an adjacent track, traveling a distance of one track is sufficient enough theoretically. In practice, however, seek distance varies with time and place because of the effect of the repeatable and non-repeatable runouts. FIG. 2C plots the ranges of variations in track pitch measured on each track when one track seek to the adjacent track is performed. In this test, the track pitch varies within a range of ±20%.

The disk storage apparatus should perform seek control in optimum fashion to shorten the seek time. To this end, it is necessary to reduce variables such as the position gain, loop gain, bias force, head-to-head offset, mechanical resonance, and repeatable and non-repeatable runouts in disk rotation, as much as possible. The position gain, loop gain, bias force, and head-to-head offset can be measured beforehand, and their effect is canceled by making correction with respect to the current location. Resonance presents no problem in a dedicated servo control apparatus. Specifically, in the dedicated servo control, a head location signal is always obtained from a servo head arranged on a dedicated servo embedding servo information, and a head location is detected in a short sampling period. The effect of strong vibration is avoided by inserting a filter that filters out components on or in the vicinity of a resonance frequency from output currents. In a sector servo control or embedded servo control in which servo information is discretely recorded on tracks of the data surfaces, the sampling period of the head location signal is long. Constructing a filter is physically impossible. There is a possibility that the effect of resonance cannot be excluded. The repeatable runout and non-repeatable runout cannot be fully eliminated, because the tracks are different in shape from track to track. In a short-distance seek control, such as one track seek, precluding the effect of the resonance and repeatable and non-repeatable runouts is vitally important. In the prior art disk storage apparatus using sector servo control having a long sampling period, even a relatively short-distance seek control as short as 1 through 4 tracks needs a long coarse time of 10 samples or longer under the effect of the repeatable and non-repeatable runouts. Hence, a need exists for a faster seek control.

SUMMARY OF THE INVENTION

The present invention offers a fast-seek disk storage apparatus in which the sector servo control having a relatively long sampling period of a head location performs a short-distance seek as short as 1 through 10 tracks within a short coarse time as short as several samples, and the seek time including the settling time is restricted to 10 samples or shorter.

The disk storage apparatus according to the present invention uses a sector servo disk medium on which the servo frame embedding track information and head location information is discretely recorded on each track. The disk storage apparatus comprises an actuator for moving a head relative to the disk medium, a current-driven motor for driving the actuator, a servo demodulator circuit for detecting a head location signal and track information at a predetermined sampling period from a head pickup signal, and a seek control circuit for positioning the head to a target location designated when a seek command is received from a host system.

The coarse time and seek time are defined by a sample count in the present invention. As for the coarse time, for example, the sample count means the number of the sampling cycles of the head location signal for the duration from the sampling timing the seek control starts to the sampling timing the coarse control is completed. Therefore, the sample count is identical to the sampling timing count. For example, the coarse time of 4 samples means that the first sample is the seek start timing and the fourth sample agrees with the coarse end timing. The sample count minus 1 is equal to the sampling periods. For example, 4 samples means 3 sampling periods.

The present invention as a seek controller for the disk storage apparatus comprises a setting control module, an FF current setting module, a target location trajectory setting module, a correction value setting module, and a position control module (position servo), for performing a short-distance seek control of 1 through 12 tracks. When the seek command from the host system is a predetermined distance or shorter, for example, 12 tracks or shorter, the setting control module sets a short-distance coarse control duration extending over a plurality of the sampling periods of the head location signal and gives a control instruction at each of the timings during the short-distance coarse control duration inclusive of the control start timing. The FF current setting module holds beforehand the value of the feedforward current (FF current) required for moving the head from the seek start location to the target location within the short-distance coarse control duration, at each of the sampling timings during the short-distance coarse control duration excluding the control end timing, and allows the current to flow through the motor at each sampling timing in response to the instruction from the setting control module. The target location trajectory setting module holds beforehand, as an object location, the position of the head trajectory at each sampling timing in response to the feedfoward current from the FF current setting module, and outputs the target location at each sampling timing in response to the instruction of the setting control module. The correction value setting module holds beforehand the correction value of the target location of the target location trajectory setting module at each sampling timing, and outputs the correction value at each sampling timing in response to the instruction from the setting control module. The position control module corrects the target location with the correction value at each sampling timing to compute the error with respect to the current location, adds the error to the FF current, and further allows the current flow through the motor so that the corrected target location is followed based on the error to achieve position feedback control. The FF current setting module outputs an accelerating current and decelerating current. The FF current setting module sets the period of the current waveform determined by the time (coarse time) from the start of the accelerating current and the end of the decelerating current to be longer than the resonance period of the actuator having a resonance frequency higher than the frequency bandwidth of the position control module. Furthermore, the FF current setting module makes the waveform of the accelerating current similar to the waveform of the decelerating current. The FF current setting module sets the period of the current waveform to be longer than the resonance period of a structure having a resonance frequency higher than the frequency bandwidth of the position control module. The FF current setting module makes the absolute value of the maximum accelerating current equal to the absolute value of the maximum decelerating current. Optionally, the FF current setting module may set up a zero-current duration between the accelerating current and decelerating current. The FF current setting module uses triangular, rectangular or trapezoidal current waveform as the accelerating current and decelerating current.

The short-distance coarse control duration set by the setting control module is the number of sampling timings according to the seek distance. For example, for a short seek distance of 1 through 12 tracks, the number of sampling times range from 3 to 6. This range corresponds to 2 to 5 periods. For example, 3 sampling timings for 1 through 4 track seek 4 sampling timings for 1 through 4 track seek 5 sampling timings for 5 through 8 track seek 6 sampling timings for 9 through 12 track seek When the seek distance designated by the seek command is one track length, the short-distance coarse control duration set by the setting control module ranges from 2 to 6 sampling timings (1 to 5 sampling periods), and the feedforward current is changed a plurality of times during one sample. For example, triangular current waveforms as the accelerating current and decelerating current are output, the zero-current duration is set up between the accelerating current and the decelerating current, and the short-distance coarse control duration set by the setting control module is 5 sampling timings (4 sampling periods). When the seek distance designated by the seek command is one track length, the short-distance coarse control duration set by the setting control module ranges from 5 to 10 sampling timings (4 to 9 sampling periods), and the feedforward current is changed once during one sample. For example, triangular current waveforms as the accelerating current and decelerating current are output, the zero-current duration is set up between the accelerating current and the decelerating current, and the short-distance coarse control duration set by the setting control module is 8 sampling timings (7 sampling periods).

The FF current setting module holds the value of the feedforward current at sampling timings and at a plurality of timings set between two sampling timings, for example, for each of the ½ sampling periods, and outputs the corresponding current at each timing. When the current output is delayed at the seek start timing, the FF current setting module increases the current value to compensate for the current component corresponding to the delay time.

The target location trajectory setting module determines the target trajectory according to the feedforward based on the modified seek distance into which the seek distance designated by the seek command is shortened, and sets it as a target location at each sampling timing. For example, the seek distance designated by the seek command is modified to a shorter seek distance, within a range of 10%. The target location trajectory setting module uses a value modified through simulation test, as the target location at each sampling timing of the head location trajectory determined from the feedforward current. The target location trajectory setting module uses a value modified through calibration, as the target location at each sampling timing of the head location trajectory determined from the feedforward current. The target location trajectory setting module modifies the value at the last sampling timing of the target location trajectory. The target location trajectory setting module holds the target location at each sampling timing of the target location trajectory according to seek direction. The target location trajectory setting module holds the target location at each sampling timing of the target location trajectory according to seek distance. The target location trajectory setting module holds an offset measurement due to rotatable runout in synchronism with the rotation of the disk, on a per sector location basis, wherein the sector location is common to all tracks. The target location trajectory setting module modifies the seek distance of the seek command based on the offset measurement of a seek start sector and the offset measurement of a target sector, and determines the target location trajectory based on the feedforward current of the modified seek distance, and holds the target location at each sampling timing. In this case, the target location is modified according to the offset measurements of the seek start sector and the target sector. The target location trajectory setting module holds the offset corresponding to a head switching. When the target location trajectory setting module receives a seek command involving a head switching, the target location trajectory setting module determines the target location trajectory based on the feedforward current of the seek distance modified by the offset measurement of the head switching, and holds the target location at each sampling timing. For example, the target location at each sampling timing of the location trajectory based on the seek distance of the seek command is modified by the offset measurements before and after the head switching.

When receiving a seek command for reading, the seek controller determines whether the head is within a permissible reading error range predetermined at the end of the short-distance coarse control. If it is within the permissible reading error range, the seek controller immediately gives a read permission to a data demodulator module. The seek time for reading is made equal to the coarse time, and the settling time becomes unnecessary. The seek controller has a sensor for detecting shocks exerted to the apparatus. If any shock is detected during the short-distance coarse control duration, the read permission is not given immediately after the short-distance coarse control duration but is delayed until the sensor detects no shock any more. When receiving a seek command for writing, the seek controller determines whether a predetermined settling condition is satisfied after the short-distance coarse control. If the settling condition is satisfied, a write permission is given to a data modulator module.

The seek controller comprises a switching control module. When the seek distance designated by the seek command is a long-distance seek, namely, in excess of the predetermined seek distance, the switching control module performs speed control in which a target speed is followed according to a remaining distance (track difference) to the target location. When the remaining distance to the target location becomes shorter than the predetermined distance, the switching control module performs a short-distance seek control by the FF current setting module, target location trajectory setting module and correction value setting module. The switching control module comprises a speed sensor module for sensing the head speed at the time of switching from the long-distance seek control to the short-distance seek control, a first computing module for determining a feedforward current I1 that makes the head speed zero at the moment of switching, a distance run L1 when the feedforward current I1 is allowed to flow through the motor, and the target location at each sampling timing, a second computing module for determining the feedforward current I2 at each sampling timing in order to perform the short-distance seek control to the remaining distance L2 that is obtained by subtracting the distance run L1 given by the first computing module from the distance L0 to the target location, and the target location at each sampling timing of the target location trajectory when the feedforward current I2 is allowed to flow through the motor, and an adder module for adding two types of feedforward currents and the target locations computed at each sampling timing by the first and second computing modules. In addition to the adder module that gives the feedforward current I0 and target location trajectory, the disk storage apparatus according to the present invention comprises a calibration module for performing an automatic calibration based on the statistic information of seek time in the short-distance coarse control by the seek controller. In the calibration module, a time measuring modules measures and then stores the seek time from the start of a seek to the end of settling is measured on a per seek distance basis for each short-distance coarse control, and an initiator module determines the probability distribution of seek times of equal seek distances and initiates calibration when the seek time giving a predetermined probability is longer than a predetermined reference time. In response to the calibration initiated by the initiator module, a calibration execution module performs a predetermined calibration. For example, the calibration execution module measures the loop gain of the position control module. When the measured loop gain fails to agree with the optimum value set at initial setting, the loop gain is corrected to the optimum value. The calibration execution module performs short-distance control by selecting a plurality of feedforward currents and set values of target position trajectory corresponding to the plurality of feedforward currents in order to measure seek times, and then selects the feedforward current out of the plurality of feedforward currents that results in the shortest seek time, and then causes the FF current setting module to hold it.

According to the present invention, in the short-distance seek as short as 1 through 12 tracks, the coarse control is completed within a short time as short as 3 to 5 samples of the head location signal, or 10 samples if inclusive of the settling time. The short-distance control is a combination of FF current and position feedback control. In the position feedback control, based on the target location trajectory based on the FF current and its corrected value, the target position is determined at each sampling timing and the current, in accordance with the position difference to the real location, flows through the motor. The FF current, the target location trajectory and the corrected value of the target location trajectory are produced according to the elapsed time from the seek start time, namely, at each sampling timing during the predetermined number of sampling cycles. The coarse time determined by the accelerating current waveform and the decelerating current waveform is free from the effect of resonance, and is set to be as short as possible as long as the amplifier of the motor (VCM) is not saturated by current. For example, in a disk storage apparatus having a sampling period of 185.6 μs, the coarse time is set to be 3 samples for the seek distance of one track. The coarse time of such an extremely small sample count cannot be set in the prior art control. With the FF current and target location trajectory only, an overshoot and undershoot take place after the seek. The magnitude of these depends on the seek direction and seek distance. The overshoot and undershoot are controlled by intentionally offsetting the target location trajectory off its ideal value.

The above and other objects, features, and advantages of the present invention will become more apparent from the following detailed description with reference to the drawings.

BRIEF DESCRIPTION OF THE DRAWINGS

FIG. 3 is a block diagram of the disk storage apparatus of the present invention.

FIG. 8 is an explanatory view showing the forward table of FIG. 7.

FIG. 11 shows the relationship between the repeatable runout and the seek distance.

FIG. 28 shows the corrected values of the target location trajectory according to the seek distance and direction obtained by a simulator.

FIGS. 38A–38E show the rectangular FF current waveform versus the sample count.

FIGS. 40A–40D show the FF current waveform with a zero-current duration.

DETAILED DESCRIPTION OF THE PREFERRED EMBODIMENTS

Figure 1:
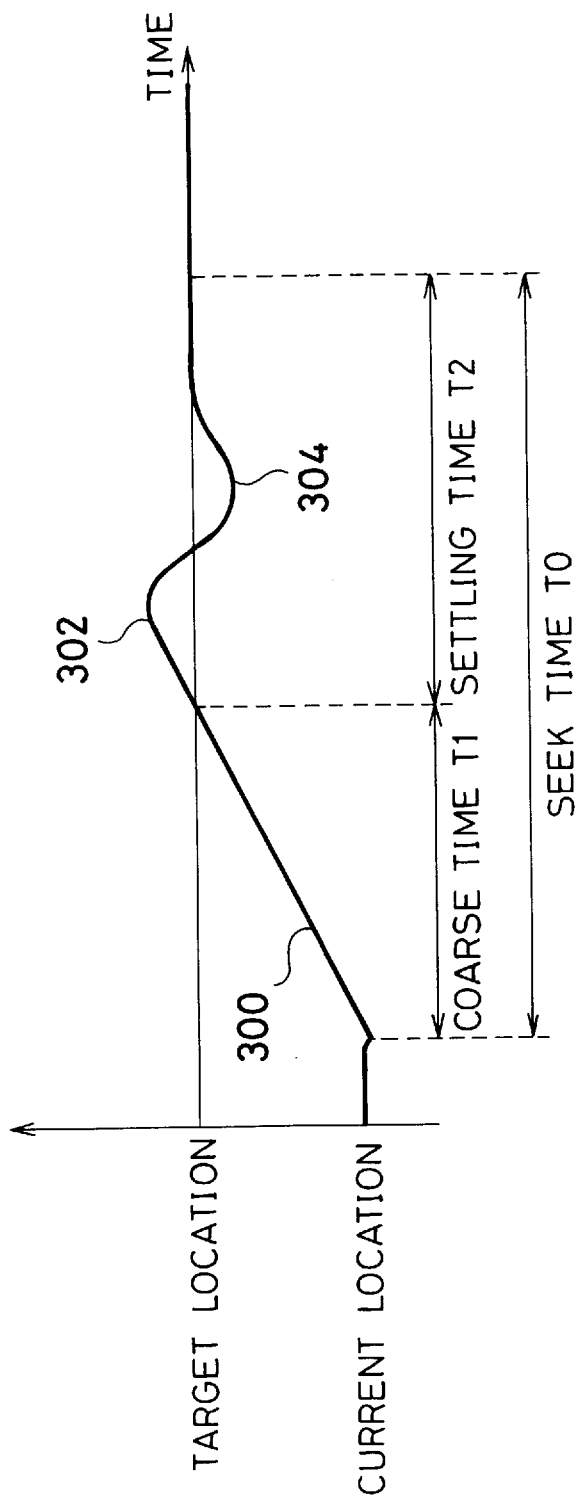
FIG. 1 illustrates the definitions of the seek time, coarse time and settling time.

Construction of the Apparatus and Servo Pattern

FIG. 3 is the block diagram of the disk storage apparatus of the present invention. The disk storage apparatus is constructed of a control unit 10 and a disk enclosure 12. A disk 14 driven by a spindle motor 16 is mounted on the disk enclosure 12. Heads 21, 22 are arranged on the top and bottom data surfaces of the disk 14. Used as the heads 21, 22 are integrated heads, each having an integrated read head and write head. Its write head is an inductive head, and its read head is an MR head. The heads 21, 22, mounted at the end of an actuator 18, are moved to any track location on the disk 14 by a voice coil motor (hereinafter VCM) 20. Used as the actuator 18 is a rotary actuator that is pivoted about its axis by VCM 20 to move the heads 21, 22. The control unit 10 has MPU 24, to which ROM 26 and RAM 28 are connected via a bus 44. ROM 26 stores a diversity of control programs including the one for the seek control, performed by MPU 24, and also stores the parameters required for a diversity of controls. MPU 24 connects via the bus 44 to an interface controller 32 which exchanges commands and data with a host controller. The interface controller 32 is connected to a cache RAM 30. In response to a read access request or write access request from the host controller, the interface controller 32 first references the cache RAM 30. If the reference is a mishit, the interface controller 32 gives MPU 24 a read or write access request to the disk 14. Further connected to MPU 24 via the bus 44 are a spindle motor driver 34, a VCM driver 36, read/write unit 42, and a servo decoder 38. The spindle motor driver 34 under the control of MPU 24 causes the spindle motor 16 mounted on the disk enclosure 12 to rotate at a constant speed. The VCM driver 36 that is under the control of the seek controller and post-seek positioning control module in MPU 24 causes a current to flow through the VCM 20, and performs positioning control to move the heads 21, 22 to a target track location by the actuator 18. The heads 21, 22 are connected to the read/write unit 42 and the servo decoder 38 via an head IC 40. The read side of the read/write unit 42 is active working as a demodulator circuit during read operation. The read/write unit 42 demodulates into read data a read signal which either the head 21 or the head 22, selected by the head IC 40, picks up from the data record portion of the disk 14. The read/write unit 42 stores the read data in RAM 28, while transferring the read data to the host controller via the interface controller 32. During write operation, the write side of the read/write unit 42 is active working as a data modulator circuit. The write data that is transferred to RAM 28 via the interface controller 32 from the host controller is written to the disk 14 by either the head 21 or the head 22 selected by the head IC 40. The servo decoder 38 demodulates into a track number and head location signal the servo read signal picked up by either the heads 21 or 22 selected by the head IC 40. Based on the track number and head location signal demodulated by the servo decoder 38, MPU 24 performs positioning control of the heads 21, 22 relative to the disk 14 by supplying a current to VCM 20 via VCM driver 36.

Figure 4:
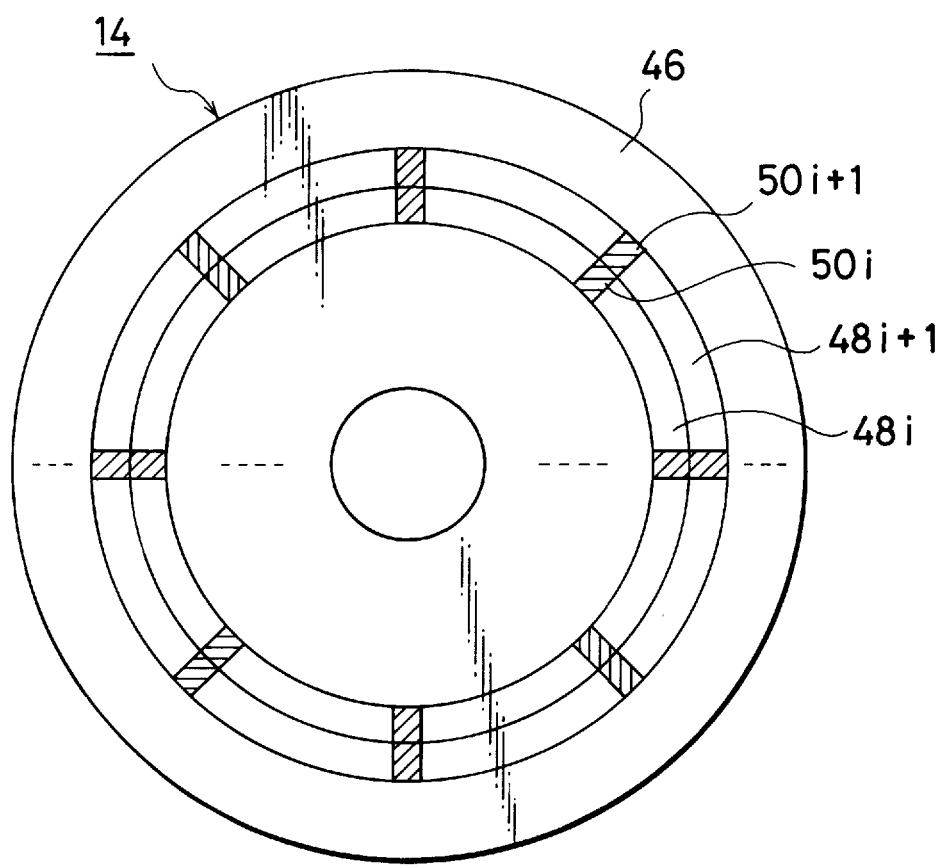
FIG. 4 shows the servo frame of the disk.
Figure 5:
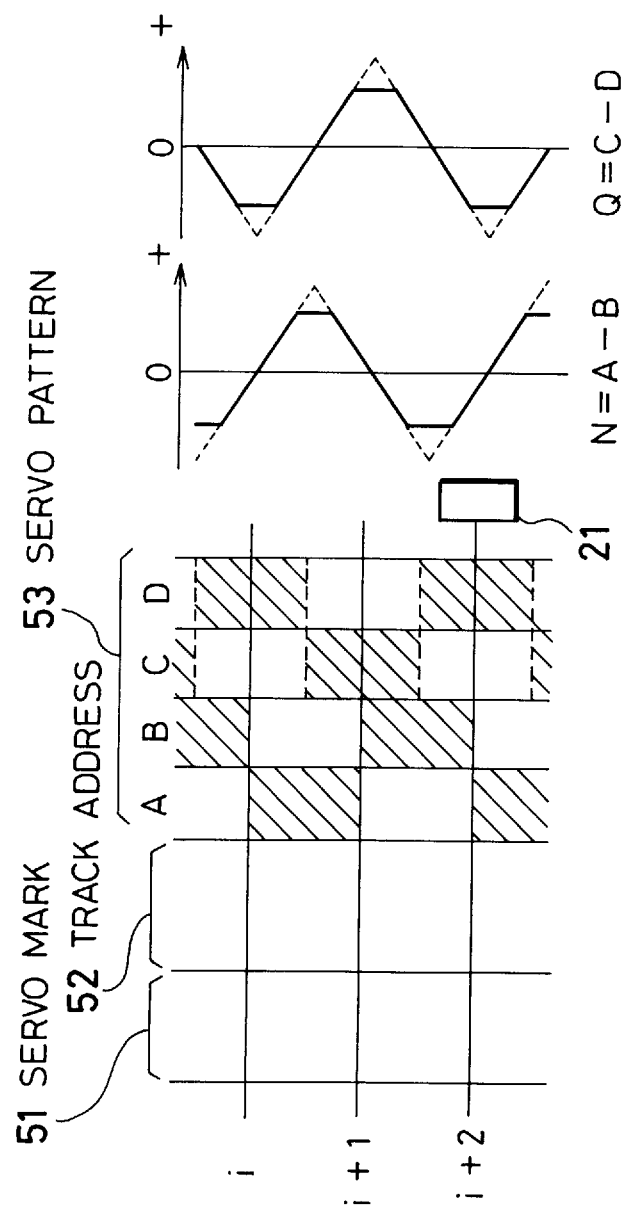
FIG. 5 shows the servo frame and the head location signal to be demodulated.

FIG. 4 shows the track format of the disk medium 14 of FIG. 3. The disk medium 14 uses both sides as data surfaces 46. The data surface 46 has a plurality of concentric tracks. In FIG. 4, the plurality of tracks are represented two tracks 48$i$ and 48$i$+1 only with the remaining tracks not shown. The tracks 48$i$, 48$i$+1 have servo frames 50$i$, 50$i$+1 spaced apart at regular intervals circumferentially around the disk 14. As shown in FIG. 5, each of the servo frames 50$i$, 50$i$+1 has a servo mark 51, a track address 52, and four types of servo patterns 53 circumferentially arranged. The servo mark 51 is the starting position of the servo frame. The track address 52 records a track number in a gray code, for example. The servo patterns 53 are made up of patterns A, B, C and D. The patterns A and B alternate at steps of one track in the direction of radius of the disk, and the patterns C and D alternate at steps of one track in the direction of radius of the disk. The patterns A and B are shifted from the patterns C and D by 0.5 track. Based on the read signal from the four types of patterns 53, a head location signal N is demodulated from the difference between the patterns A and B, and a head location signal Q is demodulated from the difference between the patterns C and D, as shown on the left of FIG. 5. The head location signals N, Q are mutually out of phase by 0.5 track, and is usually called two-phase servo signal. Namely, the head location signal N, having a zero point at the center of each track represented by i, i+1, i+2, linearly varies with its polarity alternating in the direction of radius of the disk, and is saturated in each boundary region between tracks. The head location signal Q, having a zero point at each track boundary, linearly varies with its polarity alternating as the head 21 moves, and is saturated in the center of each track. The head location signal indicative of the head location is obtained over all tracks by selectively using the head location signal N in a predetermined region centered on the track center or the head location signal Q in the track boundary region.

In the disk storage apparatus of this embodiment, the servo frames in FIG. 5 are discretely recorded on the tracks as shown in FIG. 4, and the intervals between the servo frames are used as data area. The record of such servo frame is called sector servo or embedded servo. In the sector servo disk storage apparatus, the servo frames 50$i$, 50$i$+1 are discretely recorded, and the head location signal derived from the read signal of the servo frames is intermittently obtained at the period determined by the number of revolution of the disk 14 and the number of servo frames per track. For example, suppose that the number of revolution of the disk 14 is 5400 rpm and the number of servo frames per track is 60 frames, the period of the head location signal read by the head is 185.6 $\mu$s. The head location signal is given by the servo decoder 38 at the period of 185.6 $\mu$m in FIG. 3, and MPU 24 samples the head location signal at this period as the sampling period in order to perform the head positioning control such as the seek control or an on-track control. In the disk storage apparatus of this invention, when the seek distance from a current location to a target location designated by a seek command is 13 tracks or more, the standard seek control is performed. In a short seek distance of 12 tracks or shorter, the short-distance seek is performed within a short coarse time as short as 3–6 samples using the position feedback control based on the feedfoward waveform, target location trajectory and target location trajectory correction according to the present invention. The standard seek control for the seek distance of 13 tracks or more works as follows: speed control for acceleration, constant speed, and deceleration is performed according to the speed control pattern that is read according to the number of remaining tracks from the current location to the target location, and, during deceleration phase at the final stage of the speed control, the speed control is switched to position control at the moment the head comes within a predetermined track range with respect to the target location.

Short-distance Seek Control

Figure 6:
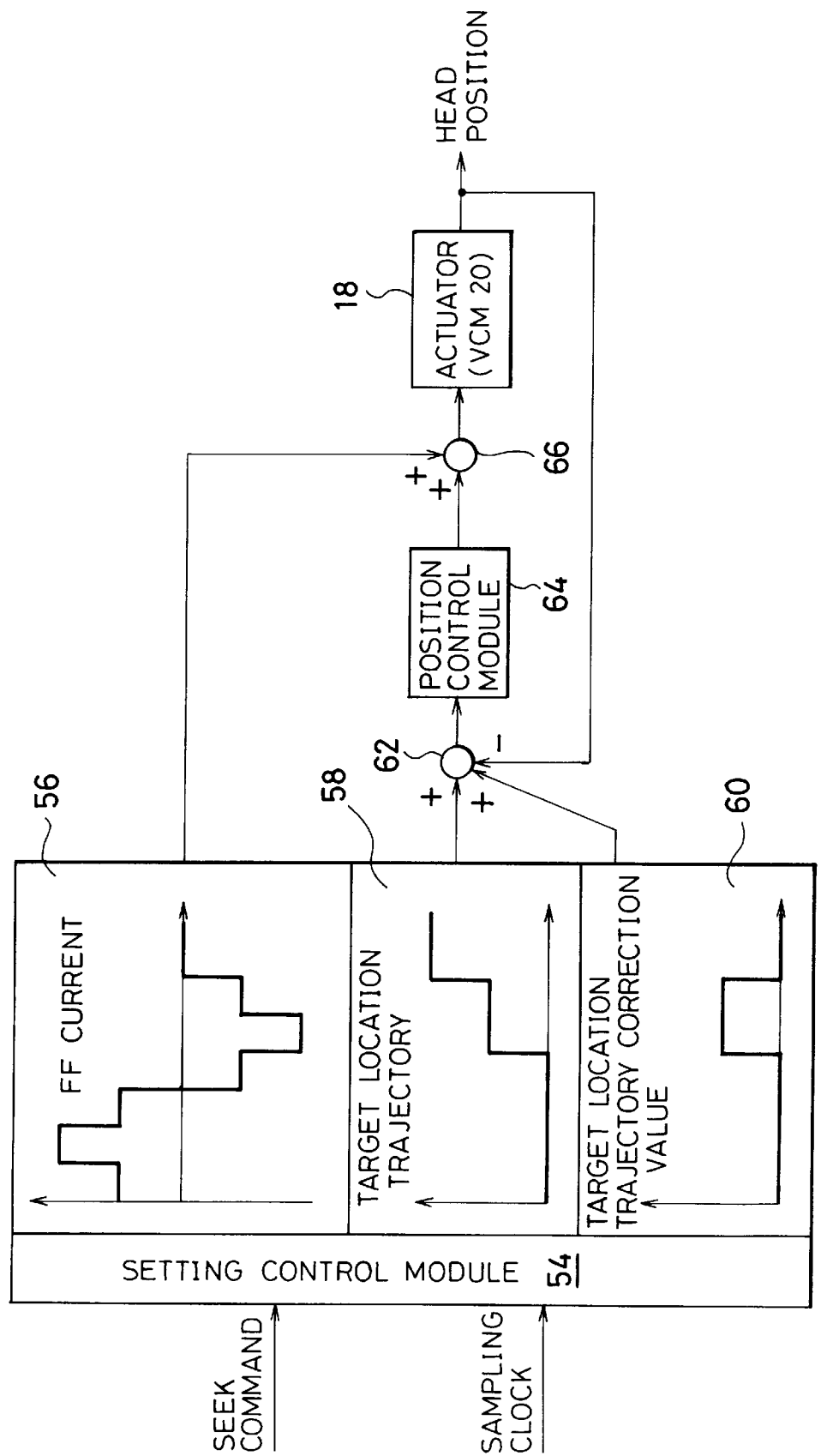
FIG. 6 is a block diagram showing the basic configuration of the short-distance seek control according to the present invention.

FIG. 6 is the functional block diagram of the seek controller that performs the short-distance seek of 12 tracks or shorter in the disk storage apparatus of the present invention. The short-distance seek control of this invention performs controlling by combining four control modules: a feedforward current (hereinafter FF current) module, a position control module, a target location trajectory module and a target location trajectory correction module. Depending on the seek distance, the apparatus performs a predetermined control within the duration the head takes to reach the target location from the seek start location, namely within the coarse time of 3 to 5 samples. The seek controller for performing the short-distance control comprises a setting control module 54, an FF current setting module 56, a target location trajectory setting module 58, a correction value setting module 60, an adder 62, a position control module 64, an adder 66, and the actuator 18 having VCM 20. At the manufacturing stage of the apparatus, the FF current setting module 56 stores beforehand design values and FF current values optimum at each sampling timing determined by the calibration using a simulator to be described later. In response to the seek command and the sampling clock to the setting control module 54, the FF current setting module 56 selects the FF current value corresponding to them and outputs it at each sampling timing to an addition point 66 to allow the current to flow the actuator 18. The target location trajectory setting module 58 beforehand stores the target location at each sampling timing of the target location trajectory of the head with the FF currents stored in the FF current setting module 56 flown through the VCM 20 of the actuator 18. In response to the seek command and the sampling clock to the setting control module 54, the target location trajectory setting module 58 outputs the target location at each sampling timing to an addition point 62. The correction value setting module 60 beforehand stores the target location correction values that correct each value of the target location trajectory stored in the target location trajectory setting module 58. The correction value of the target location trajectory gives rise to an overshoot or undershoot after the seek if controlling is performed solely based on the FF current and the target location trajectory only. To prevent the overshoot or undershoot, the target location trajectory is intentionally slipped off its ideal value. At the manufacturing stage of the apparatus, the optimum value of the correction of the trajectory is determined through the calibration using the simulator to be described later, and then stored. The position control module 64 performs the standard position feedback control. The position control module 64 amplifies the deviation between the target location corrected by the target location trajectory correction value to the adder 62 and the actual head location fed back according to the loop gain set by the position control module 64, and then feed the result to the adder 66. At the adder 66, the result is added to the FF current separately fed from the FF current setting module 56 to cause the current to flow the actuator 18. Thus, the feedback control is performed so that the error at the adder 62 is constantly kept to zero.

Figure 7:
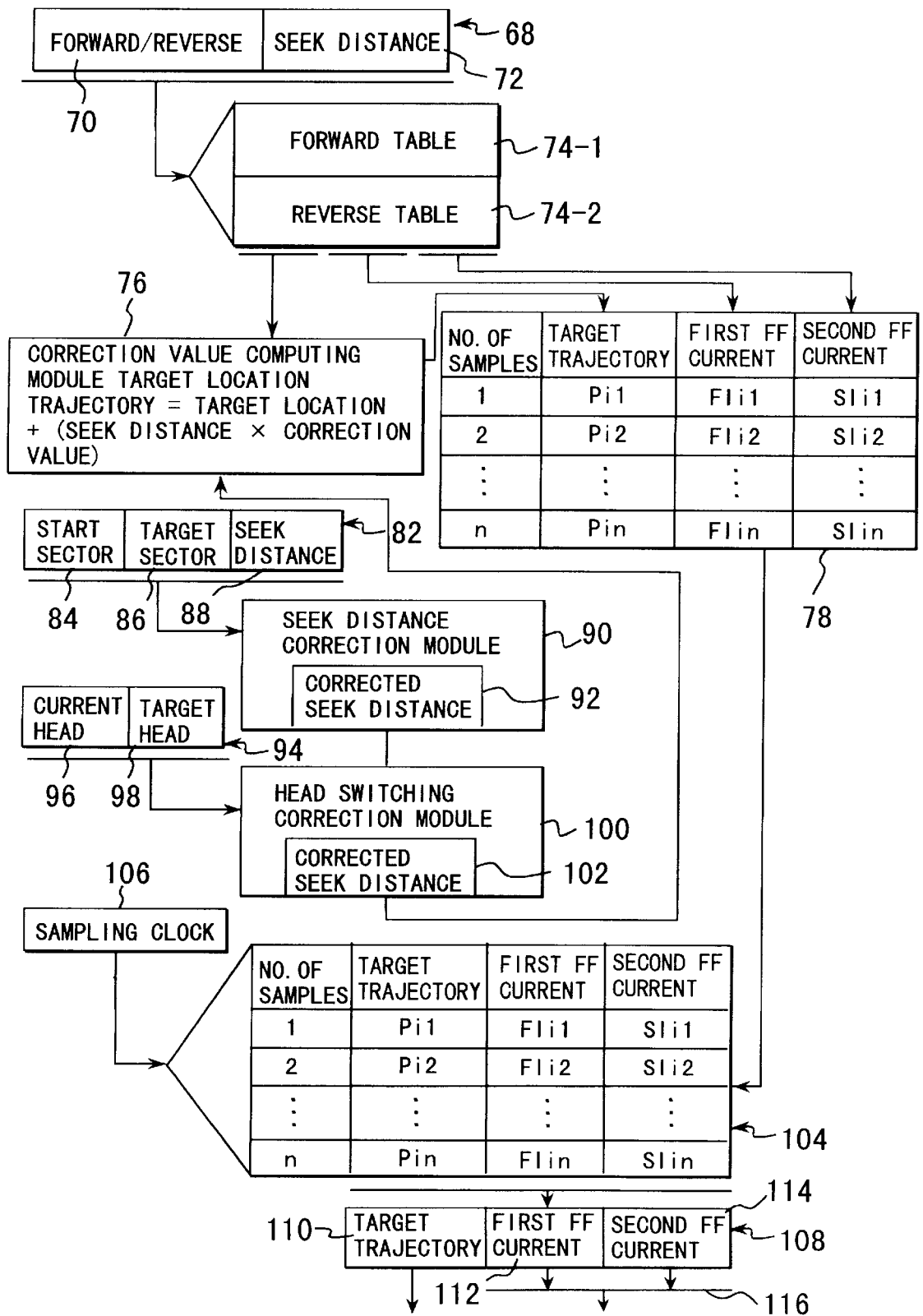
FIG. 7 is a block diagram showing the embodiment of the setting process of the FF current, target location trajectory and corrected location trajectory of the short-distance seek control.

FIG. 7 shows specific examples of the FF current setting module 56, target location trajectory setting module 58, and correction value setting module 60 of FIG. 6. According to the seek direction, a forward table 74-1 and a reverse table 74-2 are produced. As shown in FIG. 8 that lists the forward table 74-1 only representatively, the forward table 74-1 and reverse table 74-2 store a correction value Kij, a first FF current FIij and a second FF current SIij with the seek distance and the sample number indicating the order of sampling as parameters. Here, i represents the seek distance ranging from 1 to 12, and j represents the sample number ranging from 1 to 5. The sample number represents the order of sampling. This table lists the sample numbers from the first sampling timing to the penultimate sampling timing. At the last sampling timing, the FF current goes to zero. The table lists no target location, because the seek distance itself is the target location. The optimum values of these correction and first and second FF currents are determined through calibration of the seek control when the apparatus is manufactured, and stored as tabled data in ROM 26. The data of the forward table 74-1 in FIG. 8 is prepared for the short-distance seek ranging from 1 to 12 tracks, the present invention intends to cover. The relationship of the sample count to the seek distance and the coarse time is shown in FIG. 9.

Figure 9:
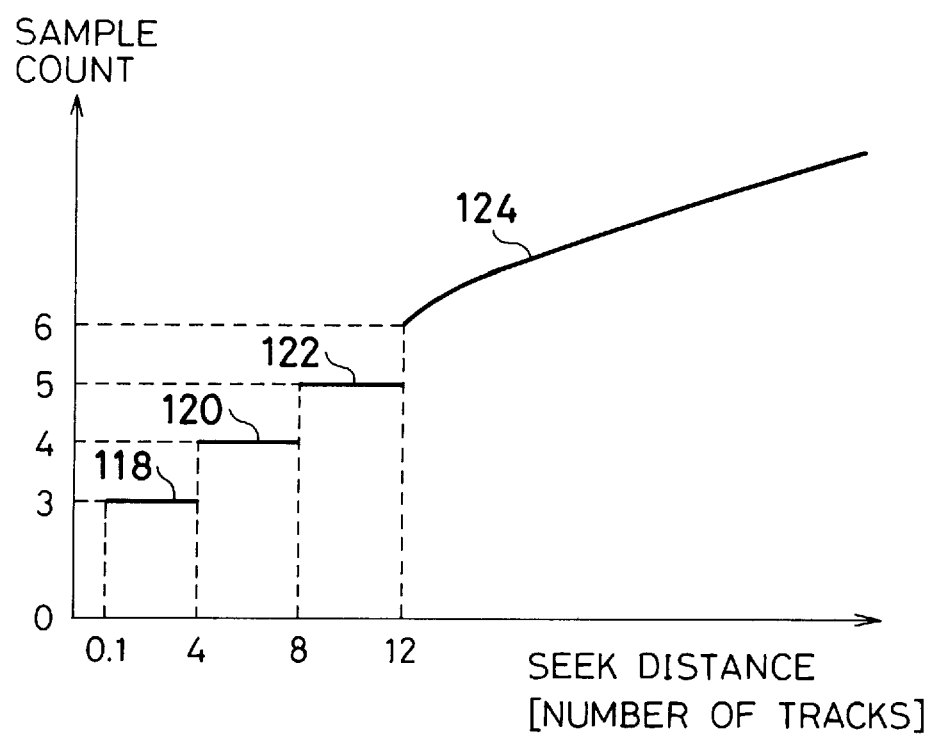
FIG. 9 shows the relationship of the seek distance and the sample count.

In FIG. 9, when the seek distance is 0.1–4 tracks, the sample count is 3 as shown by 118. For the seek distance of 5–8 tracks, the sample count is 4 as plotted by 120. For the seek distance of 9–12 tracks, the sample count is 5 as plotted by 122. For the seek distance of 13 tracks or larger, the sample count is 6 or more as plotted by 124. The characteristic by the plot 124 falls within the range of the prior art seek control, specifically, the speed control is made by reading the target speed according to the track difference to the target location.

Returning to the forward table 74-1 in FIG. 8, for the seek distance of 1 and the sample numbers 1–3, FI11, FI12, and then FI13 is output as the first FF current at each sampling timing. The second FF current SI11–SI13 contain FF currents that take place at intermediate ½ sampling periods at which no head location signal is obtained yet. Since, for each ½ sampling period, the FF current is output, the frequency of the output is doubled. For the sample count of 3, for example, the FF current is output 6 times. The target location trajectory using the correction values K11–K13 is produced at the sampling timings determined by the sample numbers 1, 2, and 3, and thus the position control is performed 3 times.

Returning to FIG. 7, a forward/reverse 70 and seek distance 72 are set to a register 68 as a table pointer for the forward table 74-1 and reverse table 74-2. The forward/reverse 70 indicative of the seek direction is set when the seek command is decoded. The seek distance 72 is the difference between the target location designated by the seek command and the current location at the start of the seek. The values set in the register 68 designate either the forward table 74-1 or the reverse table 74-2, and the memory content corresponding to the seek distance within the designated table is read as table read data 78. The first FF current and second FF current in the table read data 78 are those in either the forward table 74-1 or the reverse table 74-2. However, the target location trajectory is computed for correction using the correction value K which a correction value computing module 76 reads from the table. The correction value computing module 76 computes the target location trajectory at each sampling timing by the following equation.

Target location trajectory=Target location+(Seek distance×Correction value Kij)

The values of the target location trajectory Pi1, Pi2, . . . at each sample number, namely, at each sampling timing, computed by the correction value computing module 76 are set as the table read data 78. The table read data 78 is buffered at an appropriate area in RAM 28 as table read data 104. The correction value computing module 76 uses, as the corrected seek distance, the corrected seek distance by the head switching correction module 100 and the corrected seek distance by the seek distance correction module 90. The seek distance correction module 90 compensates for variations due to repeatable runout of the disk in the seek distance.

Figure 2A:
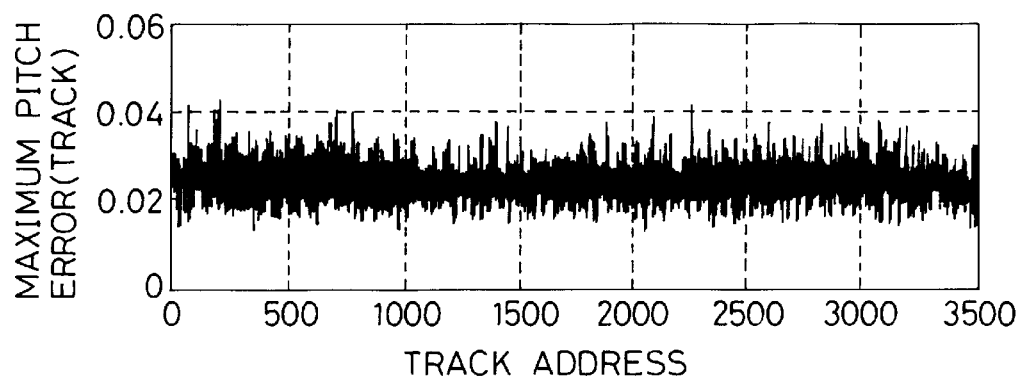
FIGS. 2A–2C are explanatory views showing respectively the repeatable runout, non-repeatable runout, and the range of variations in the track pitch measured in the prior art apparatus.
Figure 10:
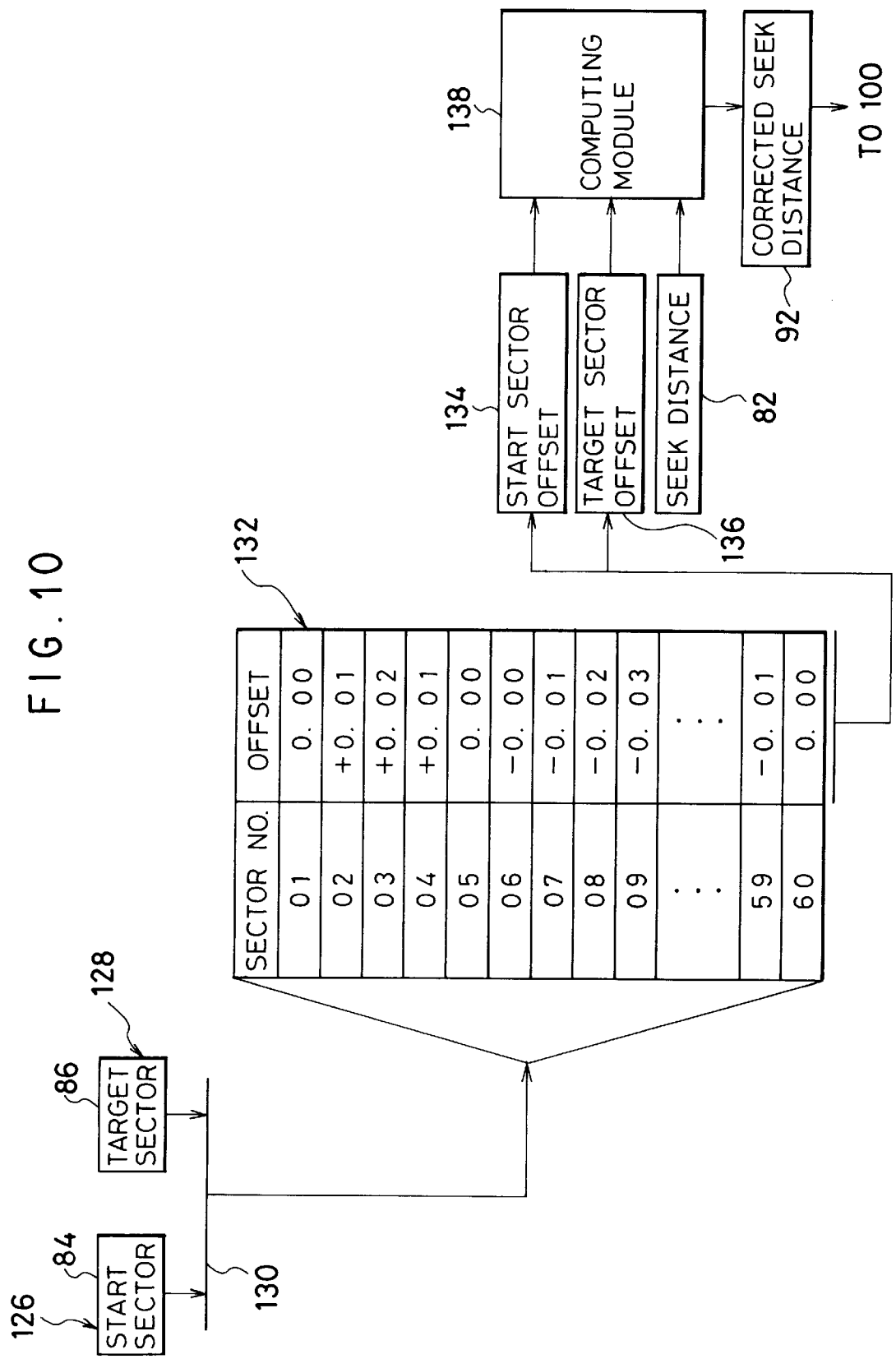
FIG. 10 is a block diagram showing the seek distance correction module of FIG. 7.
Figure 12:
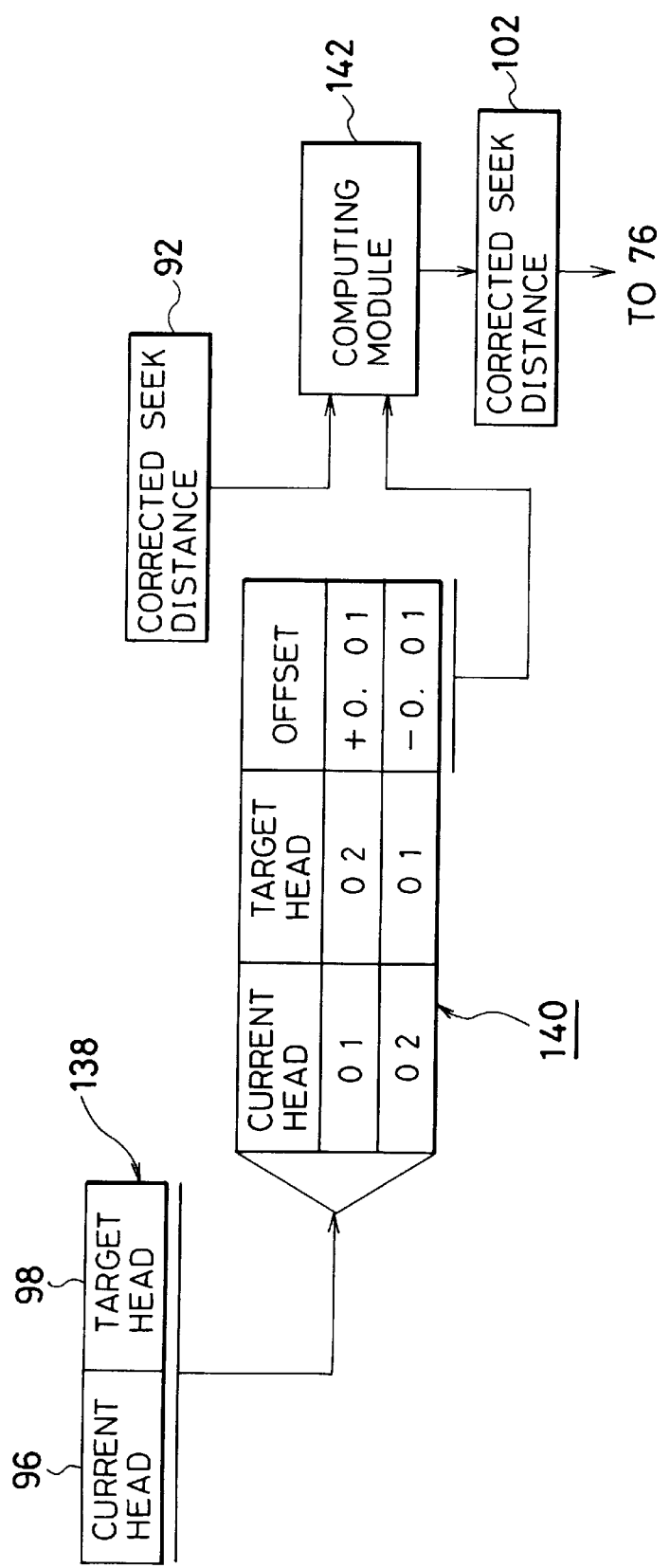
FIG. 12 is a block diagram showing the head switching correction module of FIG. 7.

FIG. 10 shows the example of the seek distance correction module 90 with a repeatable runout table 132. The repeatable runout table 132 has as a pointer a sector number common to all tracks and an offset with respect to each track center at each sector number. The offset is obtained by averaging the measured values of all tracks of the disk on the same sector number. FIG. 11 shows the offsets used in the repeatable runout table 132. Now suppose that one track seek is performed from the track 48i to the track 48i+1 on the tracks having track variations due to similar repeatable runout. In this case, seek trajectories 134, 136 have different seek distances arising from repeatable runout, namely, eccentricity even with the same seek time T. Compared to the ideal one track of seek distance, the seek trajectory 134 is shorter, while the seek trajectory 136 is longer. Actual variations due to repeatable runout are something like the one shown in FIG. 2A. In the present invention, the offset is measured on each of the sector numbers 01 through 60 of the disk medium when one track seek control is performed, and the offsets on the same sector number are averaged to produce the repeatable runout table 132 in FIG. 10. Provided corresponding to the repeatable runout table 132 are a register 126 to which a start sector 84 is set, a register 128 to which a target sector 86 is set, and a setting mechanism of a table pointer employing a selector 130. The start sector 84 is set to the register 126, the selector 130 selects this start sector 84, the offset corresponding to the sector number is read from the repeatable runout table 132, and the offset of the start sector 134 is thus obtained. The selector 130 is switched and the offset of the repeatable runout table 132 corresponding to the target sector 86 in the register 128 is read as the target sector offset 136. Using the start sector offset 134 and target sector offset 136 read from the repeatable runout table 132, a computing module 138 corrects the seek distance 82 of the seek command. Specifically, a corrected seek distance 92 is obtained by subtracting each offset from the seek distance 82 designated by the seek command, and the result is fed to the head switching correction module 100 in FIG. 7. The head switching correction module 100 in FIG. 7 corrects the seek distance at the short-distance seek involving a head switching. As shown in FIG. 12, for example, the head switching correction module 100 is provided with a head offset table 140. In this embodiment, two heads 21, 22 in the disk enclosure 12 in FIG. 3 are used, and the head offset table 140 stores the offset with the current head being head number 01 and the target head being head number 02 and the offset with the current head being head number 02 and the target head being head number 01. Each offset in the head offset table 140 is the one that is caused by head switching with the heads positioned at arbitrary tracks. In actual measurements, offsets are obtained by performing head switching on all tracks of the disk, and then are averaged. The offset at head switching from the head number 01 to the head number 02 and the offset at head switching from the head number 02 to the head number 01 are equal and opposite signs. The current head number 96 and the target head number 98 are set to the register 138 to reference the head offset table 140. The head offset table 140 is accessed with the two head numbers 96, 98, and the corresponding offsets are read and output to a computing module 142. The computer module 142 receives the corrected seek distance 92 from the seek distance correction module 90 in FIG. 7, and adds it to the offset read from the offset table 140 to obtain a corrected seek distance 102. The corrected seek distance 102 is fed to the correction value computing module 76 in FIG. 7. For the short-distance seek involving no head switching, the correction by the head switching correction module 100 will not be performed, and the corrected seek distance 92 given by the seek distance correction module 90 is fed to the correction value computing module 76 as it is. The table read data 104 finally obtained through the correction value computing module 76 is read into a sequential register 108 in the order of the sample numbers 1, 2, . . . ,n in synchronism with the sampling clock 106. Out of the table read data 104, the target location trajectory 110 and the first FF current 112 are respectively fed to the adder 62 and adder 66 in FIG. 6 at each sampling timing. The second FF current 114 is fed to the adder 66 in FIG. 6 at each ½ sampling timing. The first FF current 112 and the second FF current 114 are selected by a selector 116. The selector 116 is switched at each ½ period of a sampling clock 106, and thus outputs the first FF current 112 at each sampling timing and the second FF current 114 at the moment a ½ sampling period elapses from the first FF current.

FIGS. 13A–13D show the timing diagrams for the sampling clock, FF current, target location trajectory, target location trajectory correction, and head trajectory when the seek command of one track seek distance is received. One track seek command has the short-distance seek time of 3 sampling periods as shown in FIG. 13A. In the 3 sampling period short-distance seek, four timings of t1, t3, t5 and t7 are generated. For the FF current, control timings are generated at ½ sampling periods. As shown by arrows in FIG. 13B, a total of 7 control timings are generated at t1 through t7. In response to the control timings t1–t7, the FF current 146 shown in FIG. 13C is output. As the FF current 146, a triangular current waveform is used with an accelerating current 148-1 for the timings t1–t4 during the first half period and a decelerating current 148-2 for the timings t4–t7 during the second half period. Thus, one wave period of the FF current 146 is made up of the accelerating current 148-1 and the decelerating current 148-2, and is interpreted as a coarse time of 4 samples having by 3 sampling periods. FIG. 13D shows an ideal target location trajectory 150 when the FF current 146 of FIG. 13C flows through VCM 20. In the present invention, this is corrected by the correction value to give a target location trajectory correction 152 plotted in the dotted line. Based on the target location trajectory correction 152, the short-distance seek control results in a head trajectory 154 along which the head moves to the target location within the duration of 3 samples as shown in FIG. 13E. By combining the current output of the FF current 146 at control timings t1 through t7 in FIG. 13C and the target location of the target location trajectory 152 set at control timings t1, t3, t4 and t7 in FIG. 13D in the position feedback control, the seek control is achieved within a short duration as short as 3 sampling periods, during which position track control causes the head to settle the target location.

Figure 14:
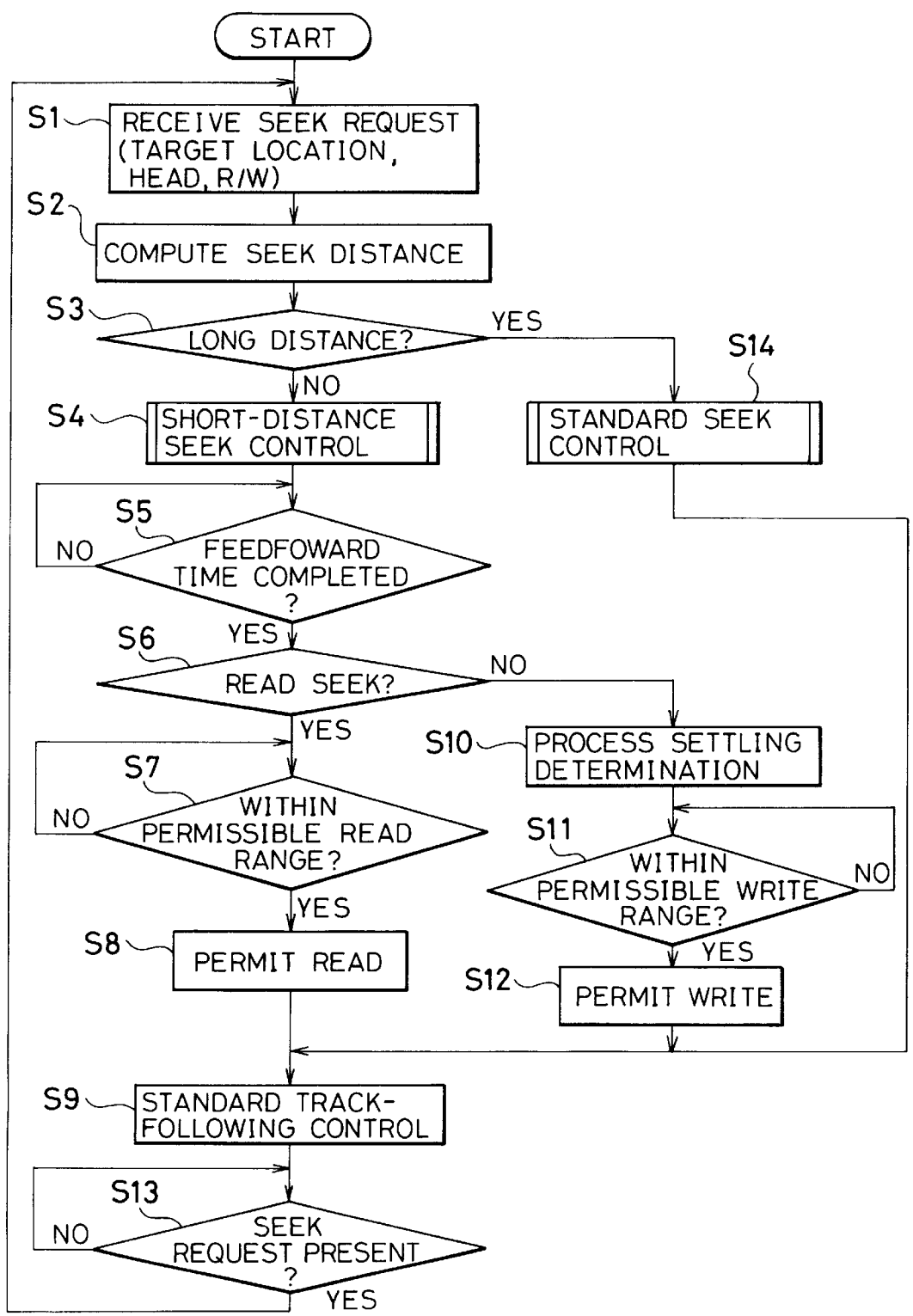
FIG. 14 shows the general process of the seek control with reference to FIG. 3.

FIG. 14 is the flow diagram for the seek control performed by MPU 24 in FIG. 3 of the disk storage apparatus of the present invention. At step S1, the seek command is received from the host controller. The seek command specifies, as command parameters, a target location, a head number, and read/write seek categories. At step S2, an ideal seek distance is computed based on the target location and the current location. The ideal seek distance means the difference in the number of tracks between the track address of the target location and the track address of the current location. At step S3, a determination is made of whether the seek distance is a long-distance one or not. If the seek distance is 12 tracks or shorter, it is a short-distance seek. The sequence of the control goes to step S4, where the short-distance seek control of the present invention is performed based on the FF current, target location trajectory, target location trajectory correction, and position control shown in FIG. 6. At step S5, a determination is made of whether the feedforward time set according to the seek distance elapses or not, namely, whether or not the sample count predetermined is completed is monitored. If this process ends, the sequence goes to step S6, where a determination is made of whether the seek is a read seek. If it is a read seek, the sequence goes to step S7. If the head location is within a permissible read range, a read permission is given to the read/write unit 42. At step S9, a standard track-following control is performed. If the seek is not a read seek at step S6, namely, the seek is a write seek, the sequence goes to step S10, where a settling determination process is performed. The settling determination process is performed by checking, after the elapse of the coarse time, that the following four conditions are satisfied.

I. The absolute value of the error of the current location is 0.1 track or smaller.

II. The absolute value of the difference between the current location and the location one sample earlier is 0.09 track or smaller.

III. The absolute value of the difference between twice the error of the current location and the error of the location one sampler earlier is 0.11 track or smaller.

IV. All the preceding three conditions are continuously satisfied for 4 samples.

If the above settling conditions are satisfied at step S10, the sequence goes to step S11, where a determination is made of whether the seek is within a permissible write range. At step S12, a write permission is given to the read/write unit 42, and the standard track following control is performed at step S9. When the read operation or write operation in the standard track following control ends at step S9, a next seek is monitored at step S13. When a new seek command is received, the sequence returns to step S1, and another seek operation starts over.

Figure 15A:
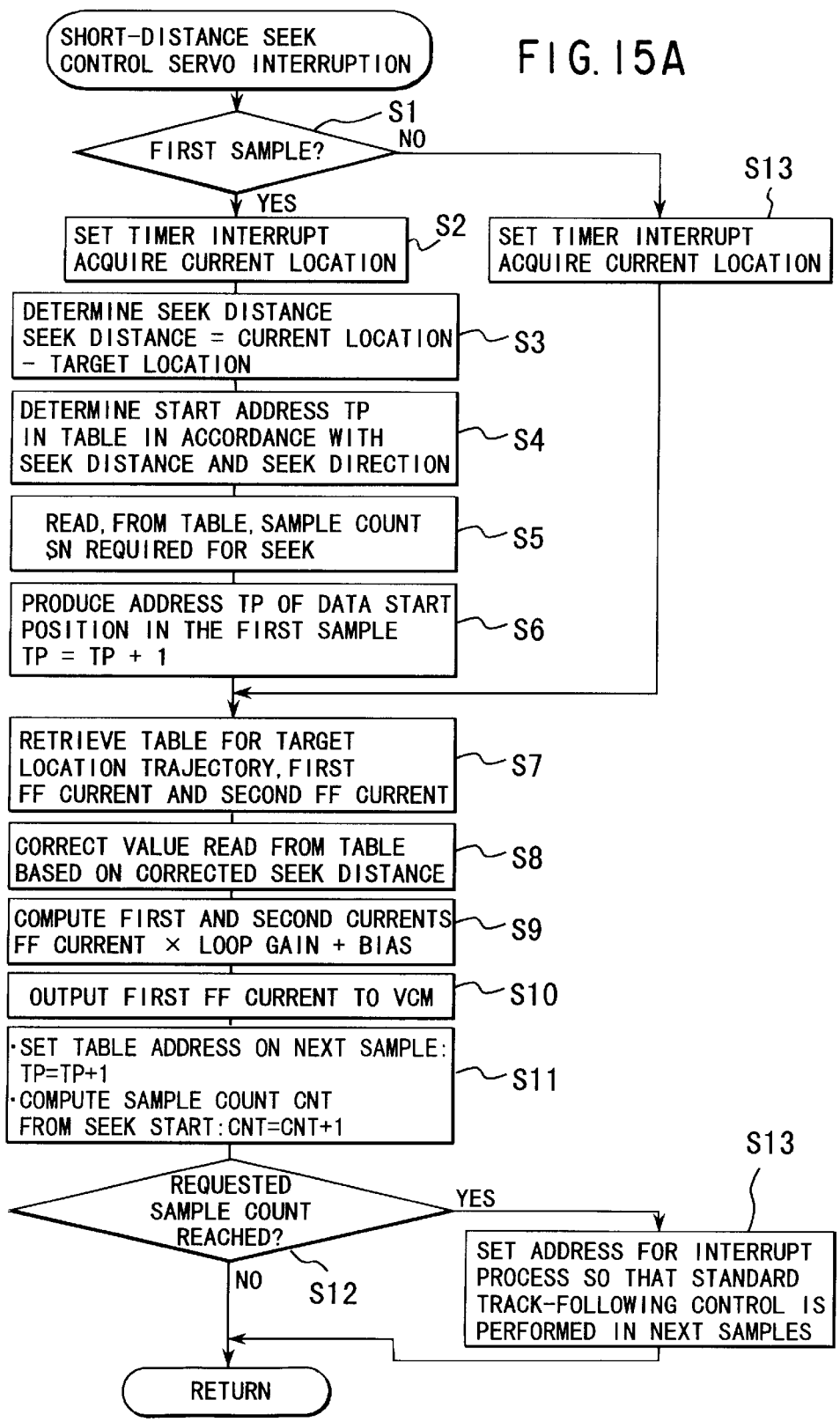
FIGS. 15A and 15B are flow diagrams showing the short-distance seek control with reference to FIG. 14.

FIG. 15A is the flow diagram showing the servo interrupt process that executes the short-distance seek control at step S4 in FIG. 14 according to the present invention. When a servo interrupt signal is generated at a sampling timing, a determination is made of whether the timing is that of a first sample, at step S1. If it is of the first sample, the sequence goes to step S2. At step S2, a timer interrupt is set to output the FF current at each ½ sampling period, and the current location is acquired. At step S3, a seek distance is determined, and at step S4, a start address TP of, for example, the forward table 74-1 in FIG. 8 in accordance with the seek distance and seek direction is determined. At step S5, for example, the forward table 74-1 is referenced to produce the address TP at the data start position of the first sampling timing. At step S7, the target location trajectory, first FF current and second FF current are acquired through table reference. At step S8, correction at table reading is performed according to the seek distance correction. For example, the seek distance correction module 90 in FIG. 7 performs corrections according to the offset of repeatable runout. For the seek control involving a head switching, the head switching correction module 100 performs corrections according to the offset arising the head switching. At step S9, the first FF current and second FF current actually flowing through VCM 20 are computed. In the computation of the FF currents, the FF current is multiplied by the loop gain and a bias component is added to the result. Since the force constant BL of the VCM 20 varies with track position, the loop gain should compensate for the variations on all track positions.

Figure 15B:
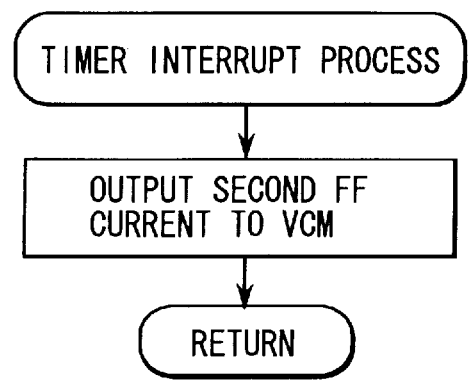

Since external force exerted to the actuator 18 varies from place to place, corrections are made to make an external bias force constant regardless of track position. At step S10, the first FF current computed at step S9 is output to VCM 20. At step S11, table address TP=TP+1 for the next sampling timing is set, and further the sample count CNT from the start of the seek is increased by 1. At step S12, a determination is made of whether the designated sample count, for example, 3 samples is reached. If the designated sample is not yet reached, the address for the interrupt process is set so that the standard track following control is performed at the next sampling at step S13, and then the sequence exits the servo interrupt process to wait for the next sampling timing. If, in the course of waiting the next sampling timing, a ½ sampling period elapses, the timer interrupt process in FIG. 15B is initiated, and the second FF current computed at step S9 in FIG. 15A is output to VCM 20, and then the sequence returns to the main routine in FIG. 15A. When step S1 verifies that it is the second sampling timing, the sequence goes to step S13, where the timer interrupt is set and the current location is acquired in the same way as at step S2. On the second sampling timing thereafter, the sequence directly goes to S7, where table reference provides the target location trajectory, the first and second FF current in the same way as in the first sampling timing. The above process is repeated until the designated sample count is reached at step S12.

Table Production and Calibration

Figure 13:
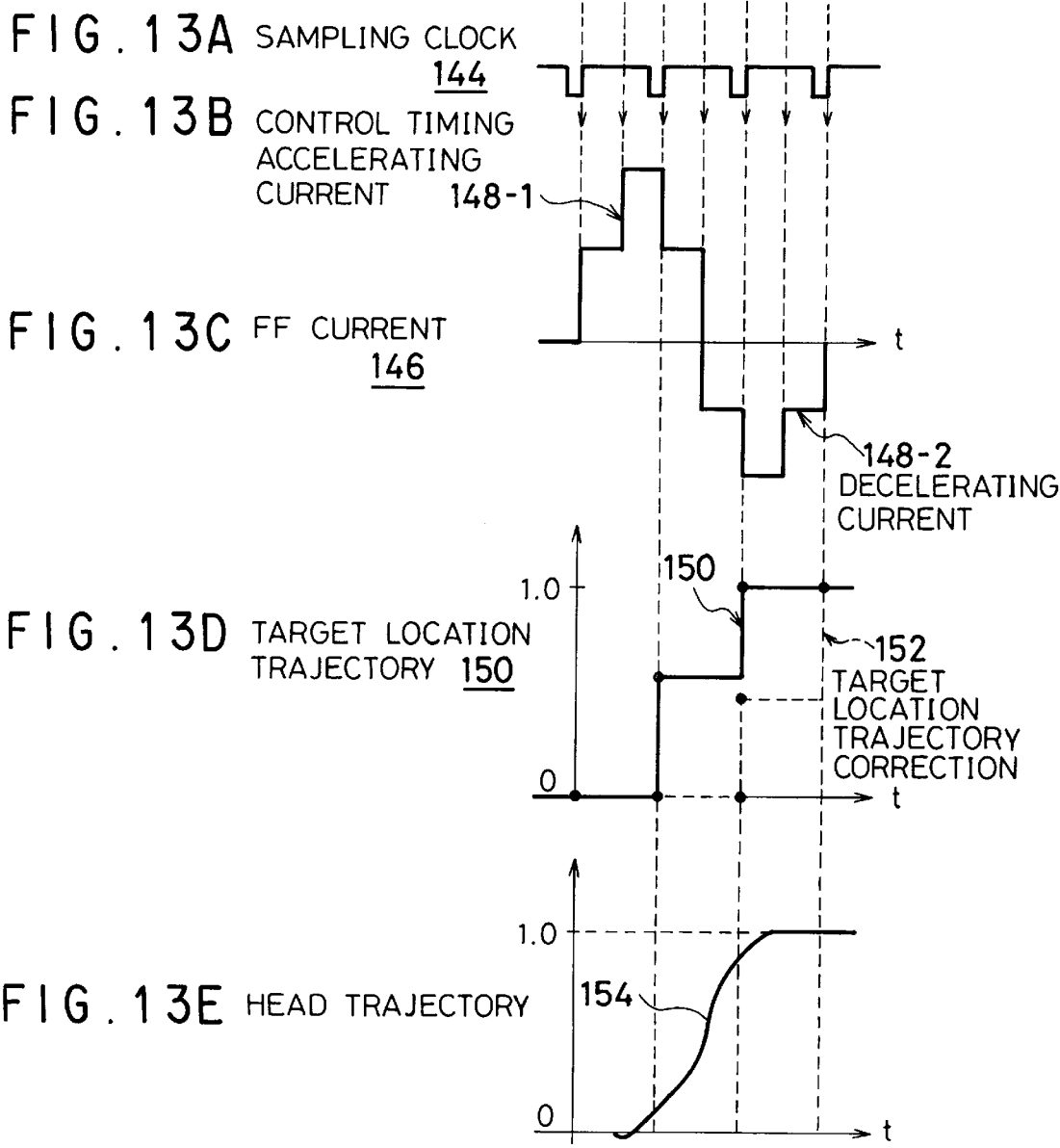
FIGS. 13A–13D are timing diagrams of the short-distance seek control of FIG. 6.
Figure 16:
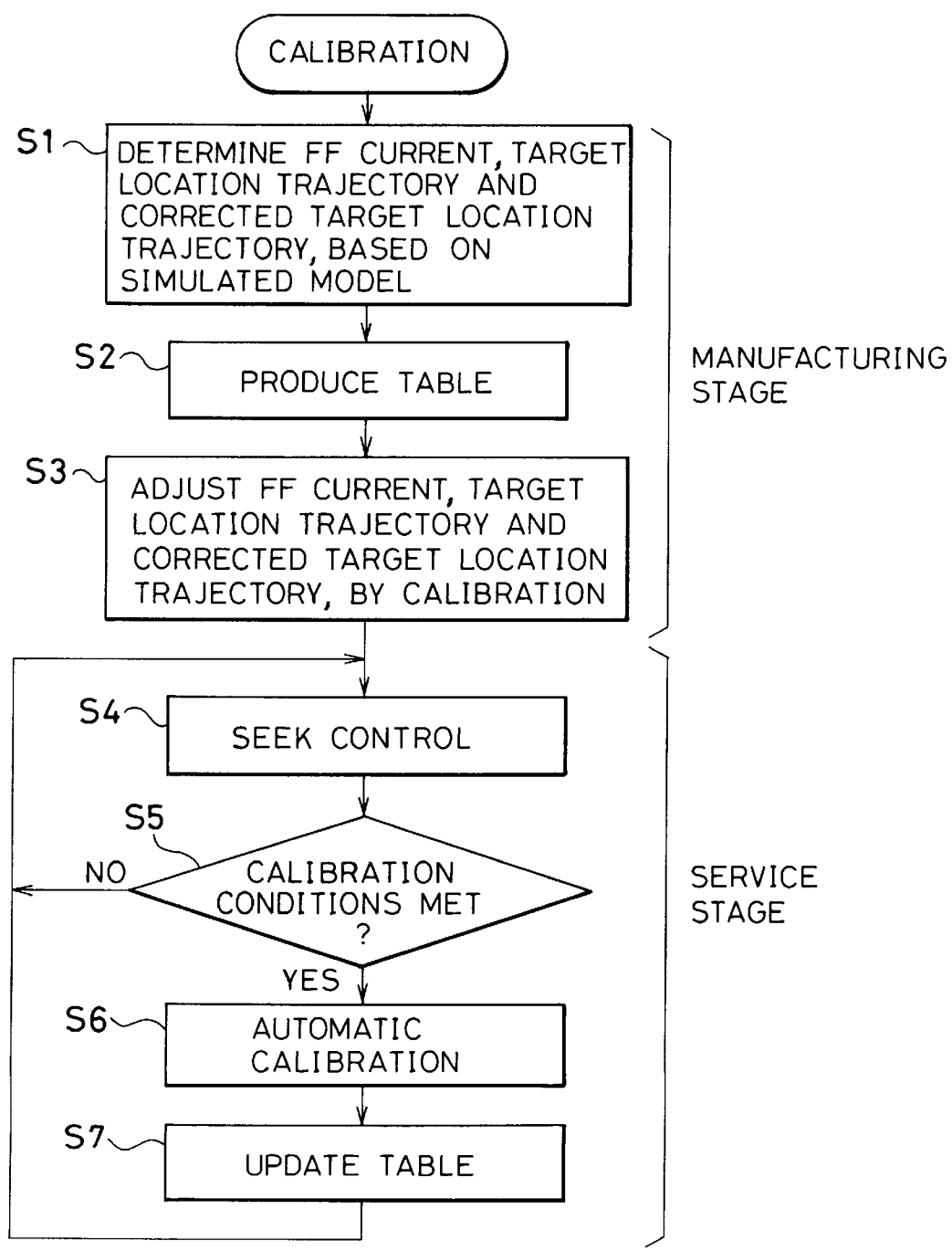
FIG. 16 is a flow diagram showing the calibration process according to the present invention.

FIG. 16 is the flow diagram showing the process of the disk storage apparatus at its manufacturing stage at a factory and its user stage after the apparatus is shipped from the factory. At the manufacturing stage, the FF current, target location trajectory and target location trajectory correction are produced at steps S1 through S3 using a simulated model, and based on these values, the table is produced at step S2. At step S3, the FF current, target location trajectory and target location trajectory correction are corrected and adjusted through calibration. By producing and adjusting the FF current, target location trajectory and target location trajectory correction using the simulated model at the manufacturing stage, the table information for the optimum short-distance seek is provided to achieve, for example, the coarse control of one track seek within 4 samples as shown in FIG. 13. In the user stage of the apparatus, statistic information is collected by recording the seek time on a per seek distance basis, at each seek control at step S4. Based on the seek time statistic, at step S5, a determination is made of whether calibration conditions are satisfied or not. An automatic calibration is made at step S6. Based on the result, the content of the table is updated at step S7. The calibration at steps S1 through S3 at the manufacturing stage is now discussed.

Figure 17:
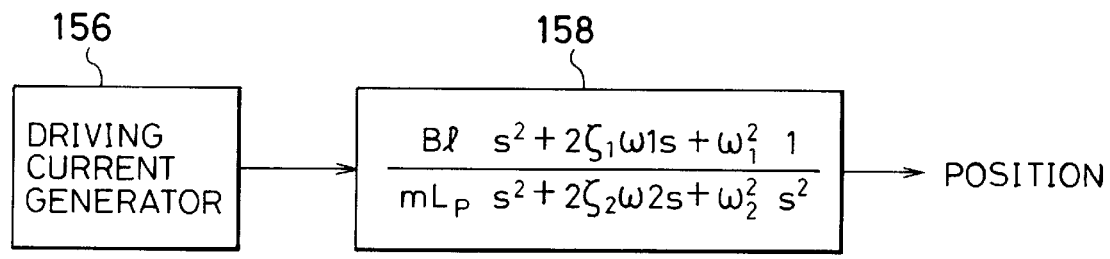
FIG. 17 shows a simulated model for studying resonance.
Figure 18A:
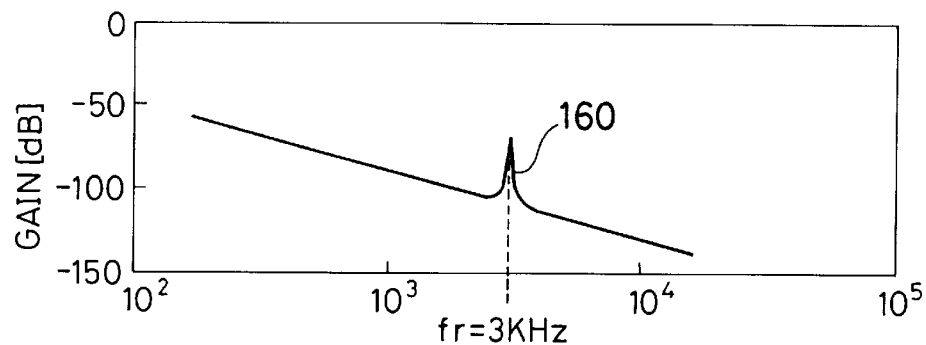
FIGS. 18A and 18B show the frequency characteristics of the simulated model of FIG. 17.
Figure 18B:
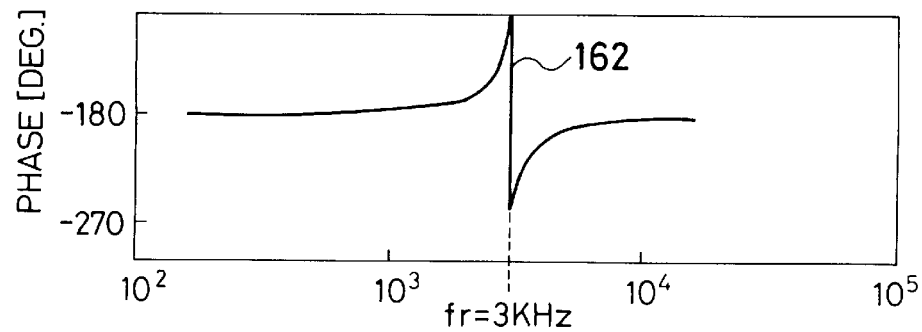
Figure 19:
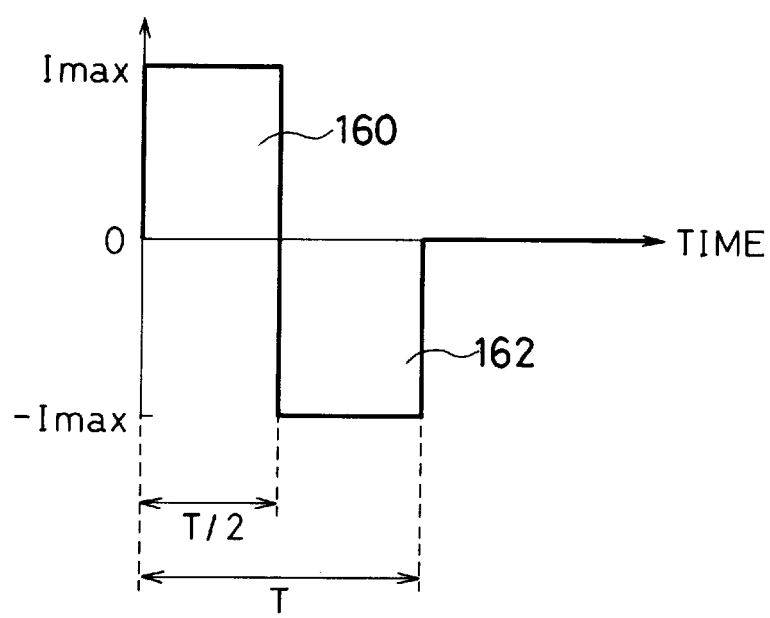
FIG. 19 shows the rectangular-wave FF current used in simulation test.

Discussed below is the relationship of the period of the FF current with resonance, wherein the FF current is output throughout the coarse time determined by the sample count. When gain of the resonance frequency of the arm of the actuator supporting the head is large in the disk storage apparatus of the present invention, the seek operation vibrates excessively the head arm. The head arm thus continuously vibrates even after the seek and the settling time is prolonged. To preclude the effect of mechanical resonance, the FF current unlikely to vibrate the mechanical resonance frequency should be output. To study the relationship between the period of the mechanical vibration and the waveform and period of the FF current, a simple simulation test is performed. Now, let BL/m represent an acceleration constant and Lp the width of a track. Suppose that the VCM proportional to an ideal double integrator 158 has a single resonance frequency. As shown in FIG. 18A, a resonance 160 is now at a resonance frequency fr of 3 kHz and a peak gain is +40 dB for a nominal model. FIG. 18B shows phase characteristic at the resonance frequency 162. A driving current generator 156 in FIG. 17 outputs the FF current having a rectangular waveform of maximum current of Imax and period of T as shown in FIG. 19. The maximum value Imax of the FF current required to make the head traverse by a distance of 1.0 track is given by the next equation.

$$I\max = \frac{4mL_p}{BlT_{ff}^2}$$

Figure 20A:
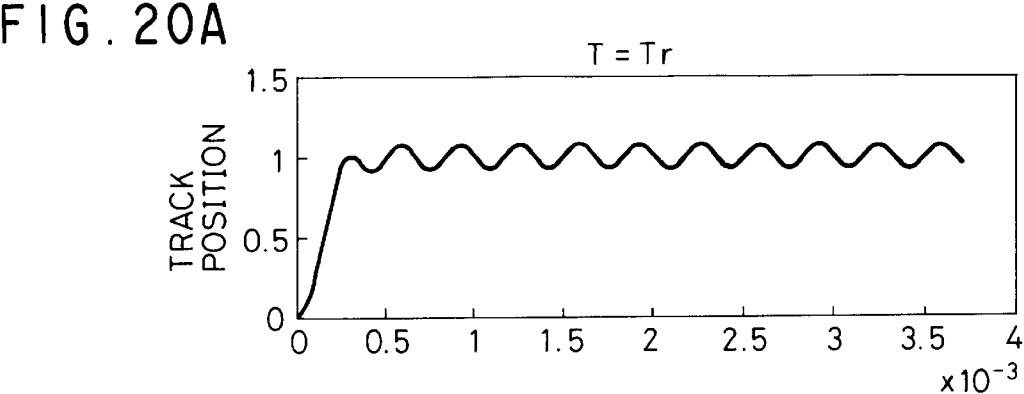
FIGS. 20A and 20B show showing the vibration state having the period of the FF current waveform after the seek.
Figure 20B:
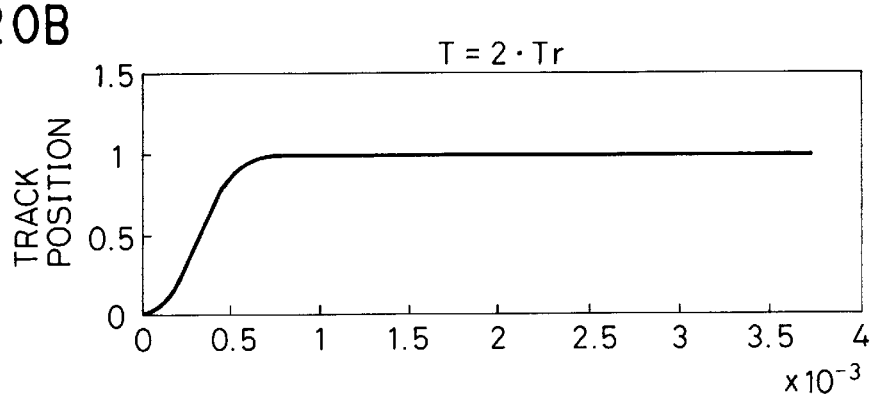

With 3-kHz resonance frequency, FIGS. 20A and 20B show how, after seek movement, residual vibration varies with the period of the driving current varying. In FIG. 20A, the period T of the current waveform and the resonance period Tr are set to be equal. A residual vibration is observed after the seek operation. In FIG. 20B, the period T of the current waveform is twice the period Tr of the resonance frequency. No vibration is observed at all after the seek operation. This suggests that the selection of an optimum period of T of the current waveform allows the seek control to work without giving rise to residual vibration after the seek even on the VCM having a resonance of high peak gain.

Now, a triangular waveform as shown in FIG. 23 is studied. In case of the triangular waveform, the maximum value Imax of the driving current to move the head by 1.0 track is expressed as follows:

$$I\max = \frac{6mL_p}{BlT_{ff}^2}$$

Figure 21:
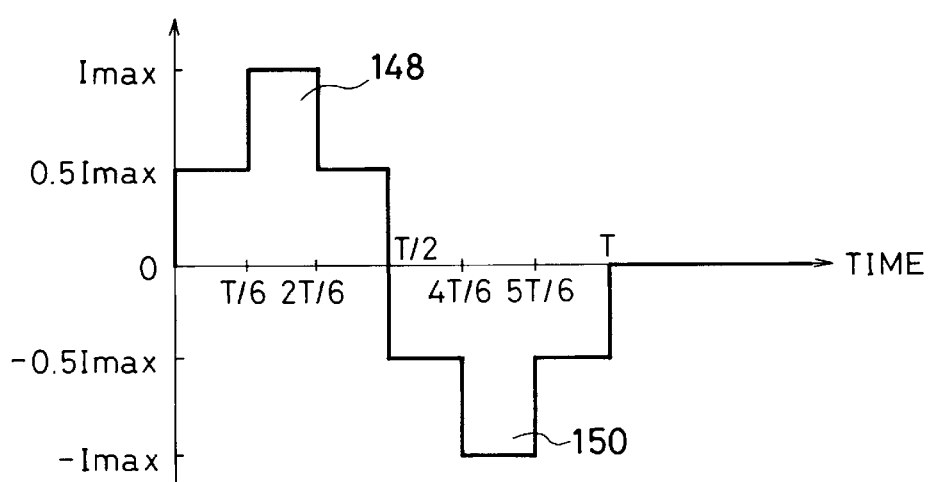
FIG. 21 shows a triangular FF current waveform used in the seek control of the present invention.
Figure 22A:
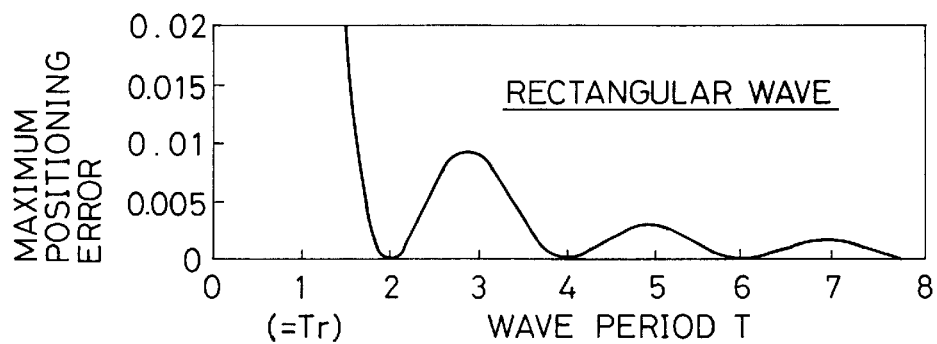
FIGS. 22A and 22B show the relationship between the amplitude and period of the vibration after the seek, when the rectangular wave and triangular wave are given as FF currents.
Figure 22B:
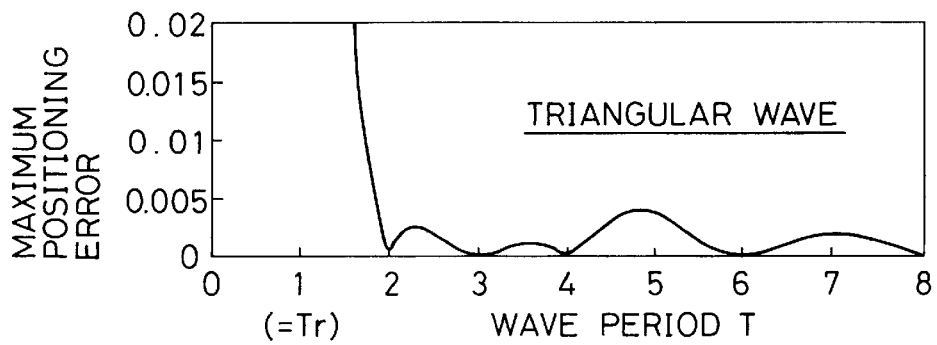

Now, with a resonance frequency of 3 kHz, the maximum amplitude of the residual vibration is studied by varying the period T of the rectangular wave in FIG. 19 and the triangular wave in FIG. 21. The results are shown in FIGS. 22A and 22B. FIG. 22A is the result of the rectangular wave and FIG. 22B is the result of the triangular wave. In both figures, the wave period is normalized with the resonance period Tr being 1. In FIGS. 22A, 22B, the phenomenon that the residual vibration becomes zero with a normalized waveform period T=2 is identical to the phenomenon that the signal of Nyquist frequency as half as the sampling frequency is not observed. Interestingly, both the rectangular wave and the triangular wave have a period of T longer than twice the resonance frequency Tr, the amplitude of the residual vibration is sufficiently small. In this case, the residual vibration is smaller in the triangular waveform in FIG. 22B than in the rectangular waveform in FIG. 22A. In both FIGS. 22A and 22B, the residual vibration is reduced much more when the waveform period T is 1.5 times the resonance frequency Tr than when the waveform period T is equal to the resonance frequency Tr. The relationship of the resonance frequency and the period of the FF current waveform shows that the effect of the residual vibration is suppressed if the period T of the FF current waveform is set to be longer than the resonance period Tr. Furthermore, the residual vibration differs depending the current waveform. The triangular wave suppresses the residual vibration better than the rectangular wave. On the other hand, to end the seek control in a short period of time, the period T of the current waveform should be shorter. The following factors should be considered as to how short the period T of the current waveform can be made.

I. Peak gain at the resonance frequency

II. Resolution of the head position signal, namely, position error of the minimum bit of the AD converter III. Amplitudes of repeatable runout RRO and non-repeatable runout NRO IV. Distortion of the current waveform and cutoff frequency of the VCM driver The permissible level of the residual vibration is determined in view of the above factors, and the optimum period T of the current waveform is determined from the relationship between the residual vibration and the period of the current waveform shown in FIGS. 22A and 22B through the simulation test shown in FIG. 17. No problem seems likely if the magnitude of the residual vibration is smaller than the minimum one bit of the AD converter or substantially smaller than the amplitudes of the repeatable runout and non-repeatable runout in the position control after the seek. For example, suppose that a 3.5-inch magnetic disk storage apparatus having a sampling period of 185.2 $\mu$m has a resonance frequency at 3.0 kHz (resonance period of 333 $\mu$m). If the period T of a triangular FF current waveform is two sampling periods, namely, 370.4, it is 1.1 times the resonance period. As seen from FIG. 22B, the effect of the residual vibration causes some concern. With one sampling period added to make a three-sampling period, the period of the FF current waveform is 556 $\mu$s, namely, 1.67 times the resonance period. Now, the residual vibration is reduced to a level some one-fifth the one at the two-sampling period. When the FF current is switched on a per sampling period basis, a rectangular wave with zero-current durations requires 4 samples. The triangular wave in FIG. 21 needs 6 samples. The more the sample count the more time is required. Thus, if the current is switched on a per ½ sampling period, both the triangular and rectangular currents having a three-sampling period T=556 $\mu$s, namely, 1.67 times the resonance period Tr work. Since the period T is smaller than twice the resonance period Tr, at which the residual vibration is sufficiently suppressed, an actual measurement is necessary to make sure that the residual vibration is sufficiently suppressed. With another one sampling period added further to make a four-sampling period, the effect of resonance is negligibly small. In the actual design of the apparatus, the optimum period T of the current waveform should be determined so that the shortening of the seek time and the increase of the settling time due to the residual vibration should be balanced. In the discussion that follows, the period T of the current waveform is a three-sampling period, and the FF current is switched at the ½ sampling period. The FF current herein is a three-sampling period, triangular waveform as shown in FIG. 21. When the current is deformed because of the characteristics of the VCM driver, its period may be prolonged. It is not necessarily required that the current is switched at ½ sampling period. When a faster MPU or DSP is employed, controlling on a per sampling period works satisfactorily. In an apparatus in which the sampling period of acquiring a head location signal is relatively long, the FF current is preferably switched at a ½ sampling period or ⅓ sampling period to shorten the seek time.

To calibrate a diversity of parameters required for the short-distance seek control, the present invention performs the seek control in FIG. 6 using a controller of position control having the following structure. The target location trajectory is added to the position error of the controller constituting the position control module at the sampling period. The FF current is added to the command current to the controller at the ½ sampling period, and the switching of the FF current at the ½ sampling period other than the sampling period is performed in the timer interrupt process. From the fourth sample period thereafter, the controlling by the FF current is taken over by the standard position control. The controller is constructed of an observer and a state feedback loop. The controller is a second-order observer with its computation delay compensated for, and its cutoff frequency is 2 kHz. The current value is the integral of the addition of the state feedback from the observer and the position error, namely, the controlling herein is identical to PID control. Next set values are a servo bandwidth of 450 Hz and a phase margin of 35°. The observer of this controller is expressed by the following equations.

$$\begin{pmatrix} X\text{hat}[k] \\ V\text{hat}[k] \end{pmatrix} = \begin{pmatrix} X\text{bar}[k] \\ V\text{bar}[k] \end{pmatrix} + \begin{pmatrix} L1 \\ L2 \end{pmatrix} (y[k] - X\text{bar}[k]) \quad (1)$$

$$u_{obs}[k] = -(Kp\ Kd) \begin{pmatrix} X\text{hat}[k] \\ V\text{hat}[k] \end{pmatrix} \quad (2)$$

$$u_i[k] = -K_i \sum_k y[k] \quad (3)$$

$$u[k] = u_{obs}[k] + u_i[k] \quad (4)$$

$$\begin{pmatrix} X\text{bar}[k+1] \\ V\text{bar}[k+1] \end{pmatrix} = \begin{pmatrix} 1 & 1 \\ 0 & 1 \end{pmatrix} \begin{pmatrix} X\text{hat}[k] \\ V\text{hat}[k] \end{pmatrix} + \begin{pmatrix} B11 \\ B12 \end{pmatrix} u_{obs}[k] + \begin{pmatrix} B21 \\ B22 \end{pmatrix} u_{obs}[k-1] \quad (5)$$

Equation (1) is an error correction equation for computing a preprocess and current for trajectory correction at each sampling period, where y[k] is a deviation between the current location and the target location, reflecting the target location in the observer. Equations (2), (3) and (4) are for PID process for adding the integral of the position error to the state feedback from the observer. Equation (5) is a position estimation equation of the observer which estimates location at the next sampling timing subsequent to the current output to the VCM, in the post-process computation. The current value to be finally output to the VCM is corrected subject to the loop gain and bias correction value measured through calibration. The correction is performed according to the following equations.

VcmCur[k]=BlGain(Tack)×(u[k]+CurDash[k])+Bias(Track)

VcmCur[k+0.5])=BlGain(Track)×(u[k]+CurDash[k+0.5])+Bias-(Track) (6)

To study the effect of loop gain shift with the simulator, the loop gain may be forcibly updated at the FF current output. In this case, the process is performed according to the following equation. "GainOfs" on the right-hand side denotes a gain shift.

VcmCur[k]=BlGain(Track)×u[k]+Bias(Track) (7)

Figure 23A:
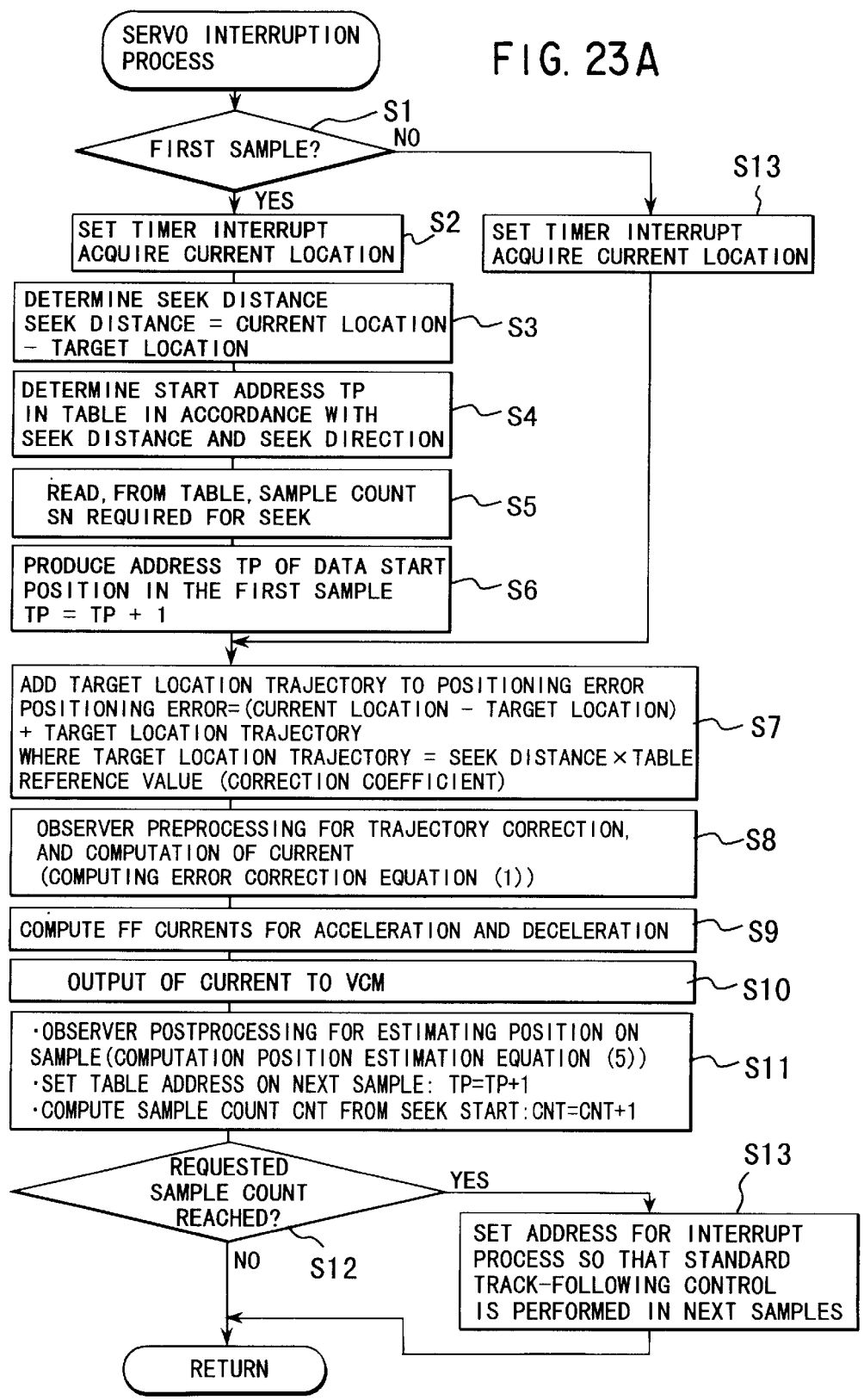
FIGS. 23A and 23B are flow diagrams showing the short-distance seek control according to the present invention.
Figure 23B:
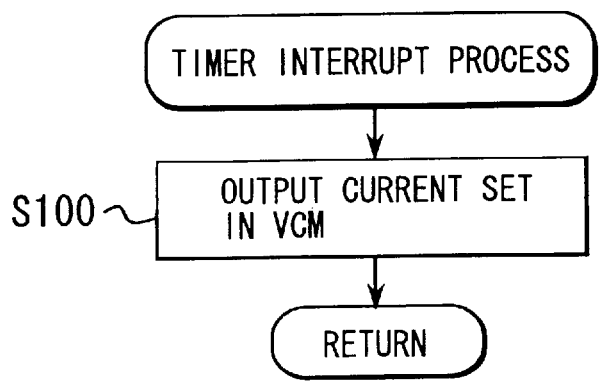
Figure 24A:
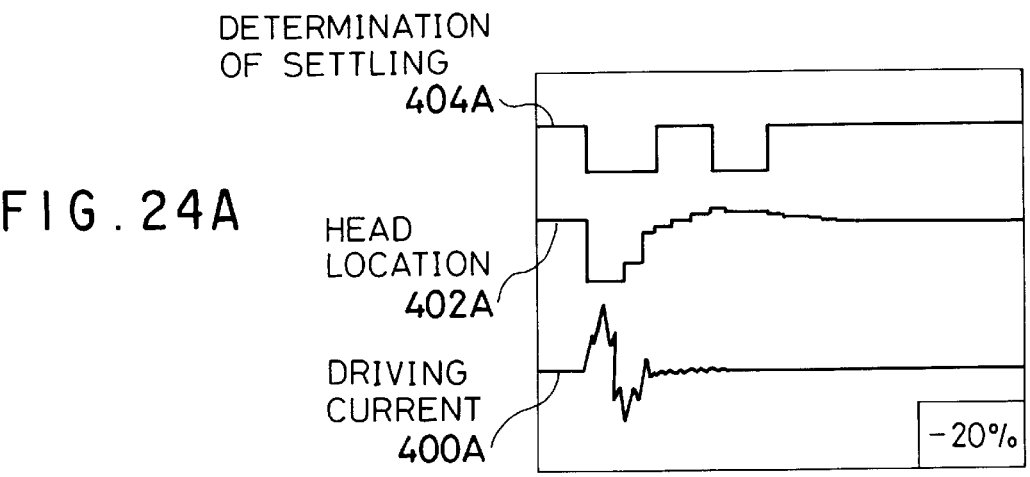
FIGS. 24A–24I show test results with the loop gain varied.
Figure 24B:
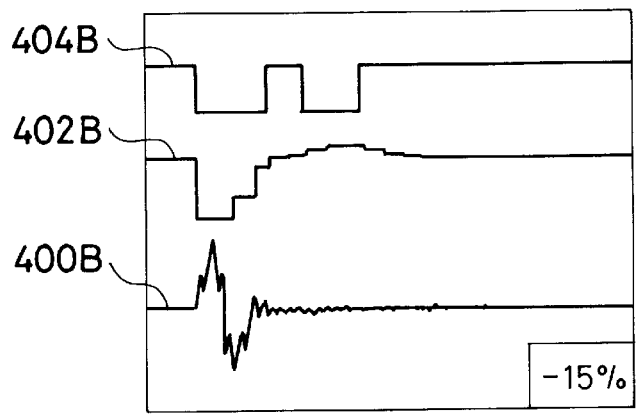
Figure 24C:
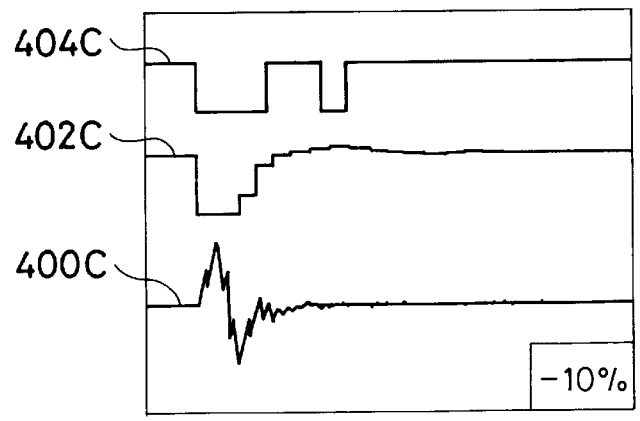
Figure 24D:
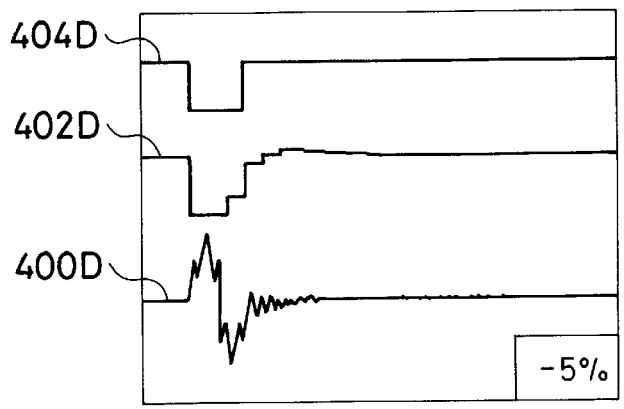
Figure 24E:
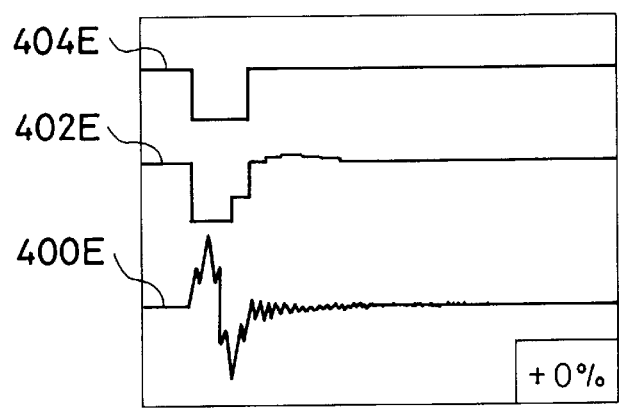
Figure 24F:
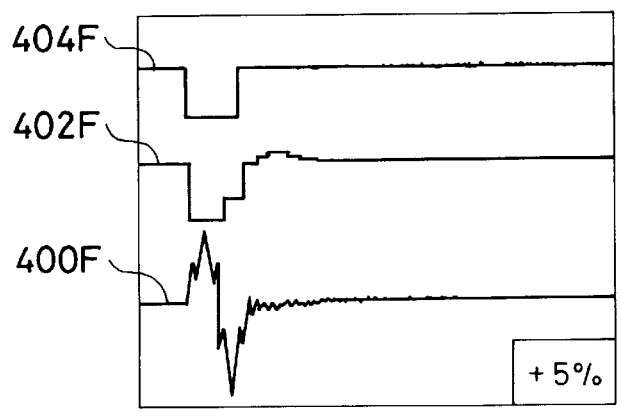
Figure 24G:
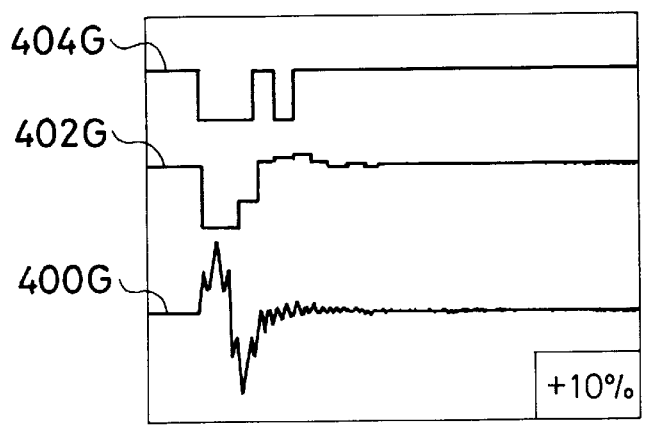
Figure 24H:
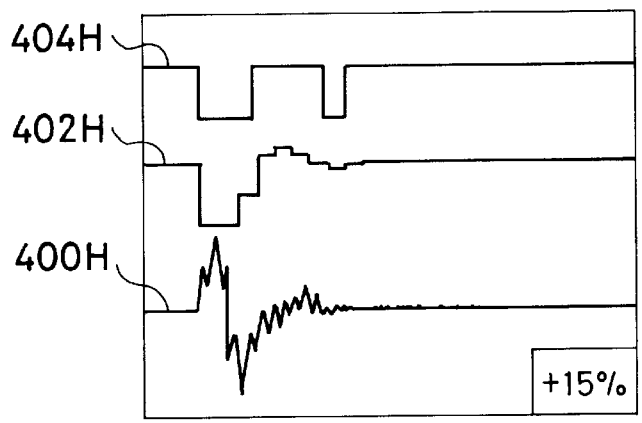
Figure 24I:
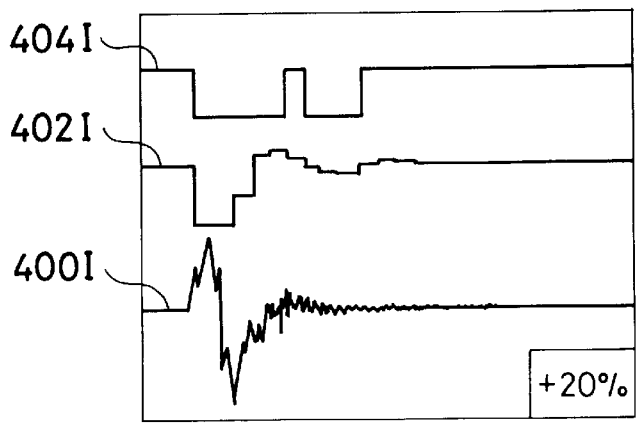
Figure 25A:
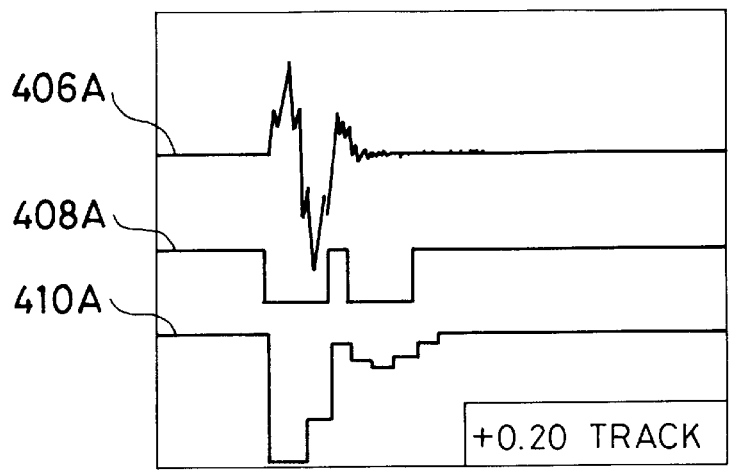
FIGS. 25A–25E show test results with the target location intentionally slipped.
Figure 25B:
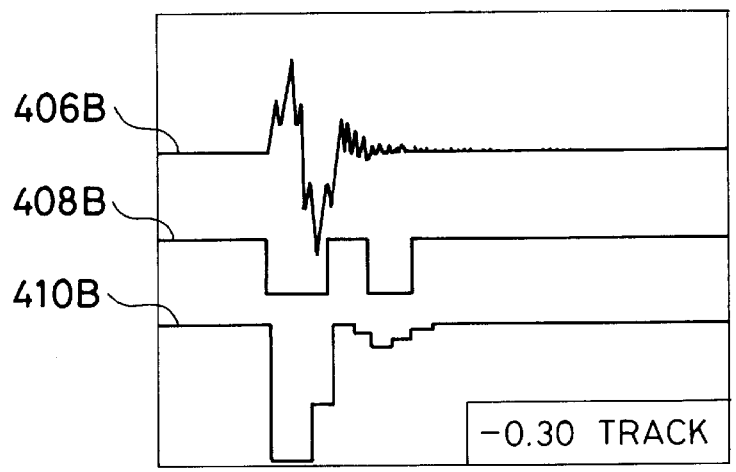
Figure 25C:
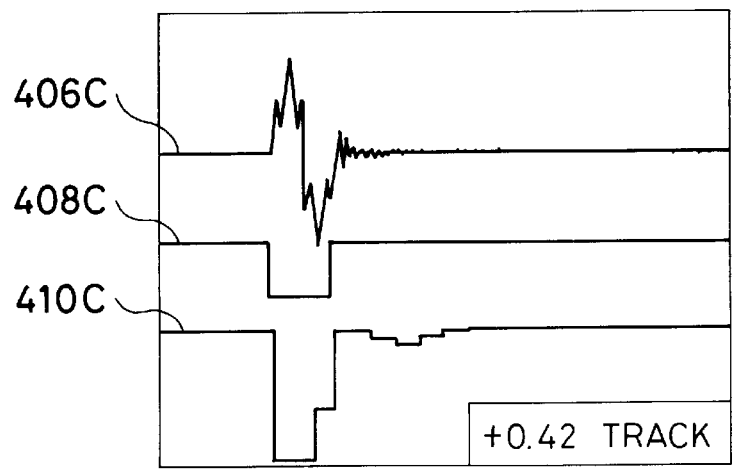
Figure 25D:
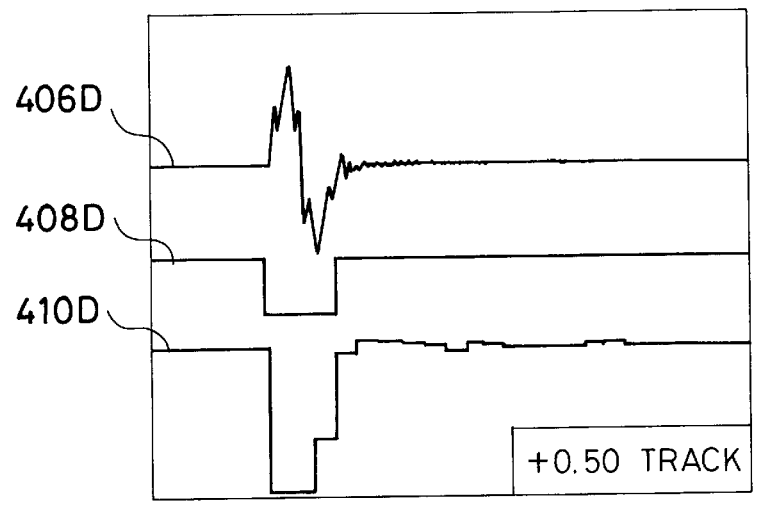
Figure 25E:
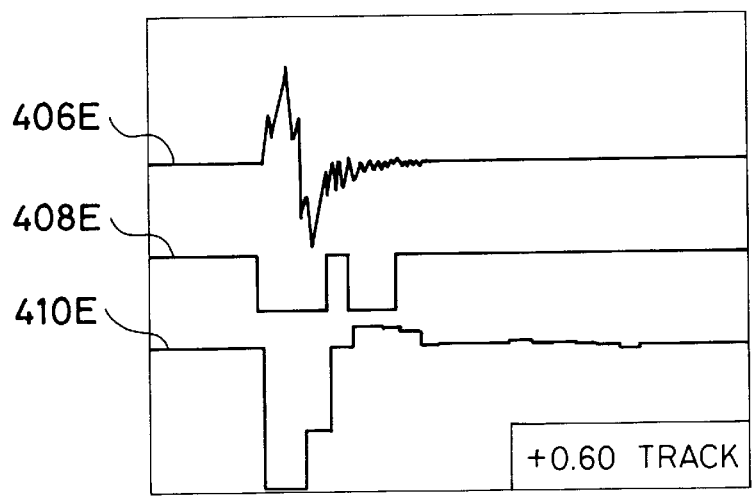

FIGS. 23A and 23B are flow diagrams for the servo access process of the observer to perform the function shown in FIG. 6. The observer control is largely similar to the short-distance seek control of the present invention with reference to FIGS. 15A, 15B. The difference from the short-distance seek control is that the FF current, target location trajectory and its correction are computed according to the observer structure following the preceding equations (1) through (6) in steps S7 through S11.

In the seek control according to the present invention, when the loop gain was measured and corrected through calibration, and to study the effect of the shift of loop gain, the loop gain for outputting the current was varied at steps of 5% within the range from −20% to +20% according to the equation (7). FIGS. 24A–24I are the test results. Represented by 400A–400I is the driving current for the VCM, by 402A–402I the head location, and by 404A–404I the settling condition of within ±0.1 track. From these test results in FIGS. 24D, 24E, and 24F, the overshoot and undershoot caused by a shift of ±5% is on a level as high as the repeatable runout and non-repeatable runout during position control, and thus pose no problems. As seen from FIGS. 24A–24C and 24G–24I, a gain shift greater than ±5% increases overshoot and undershoot, and thus prolongs the seek time accordingly. The seek time is prolonged more when the gain is increased than when the gain is decreased. This result suggests that the variation in the seek time with respect to the loop gain variation is reduced by intentionally setting the loop gain at a few percent smaller at its default setting. Namely, this means that the seek distance is set to be slightly smaller, for example, 0.98 track rather than accurately 1.0 track.

In the tests of the seek control of the present invention, the overshoot and undershoot immediately after the seek differ depending on the seek direction and seek distance as shown in FIGS. 25A–25E. Represented by 406A–406E is the driving current for the VCM, by 408A–408E the head location, and by 410A–410E the settling condition of within ±0.1 track. As seen from FIGS. 25A–25D, the magnitude of the undershoot is reduced by intentionally slipping the target location by +0.2 track, +0.3 track, +0.42 track, +0.50 tack from the ideal value in the course of the seek. In this case, however, an excess slip as large as +0.60 track in FIG. 25E makes the overshoot increase. Namely, the tests show that the magnitudes of the overshoot and undershoot are reduced by intentionally slipping the target location from its ideal value in the course of the seek.

Figure 26:
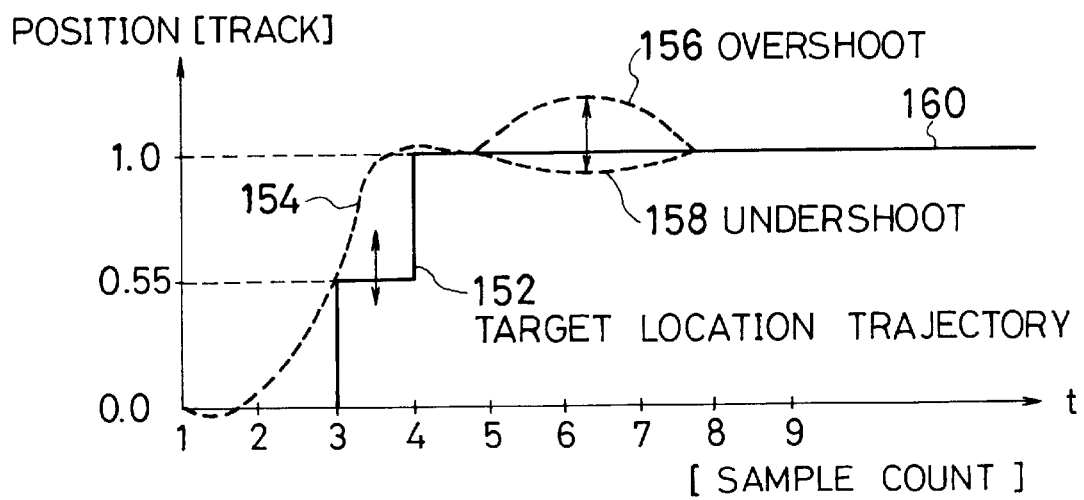
FIG. 26 shows response characteristic in position error after the seek when the target location trajectory is varied.
Figure 27A:
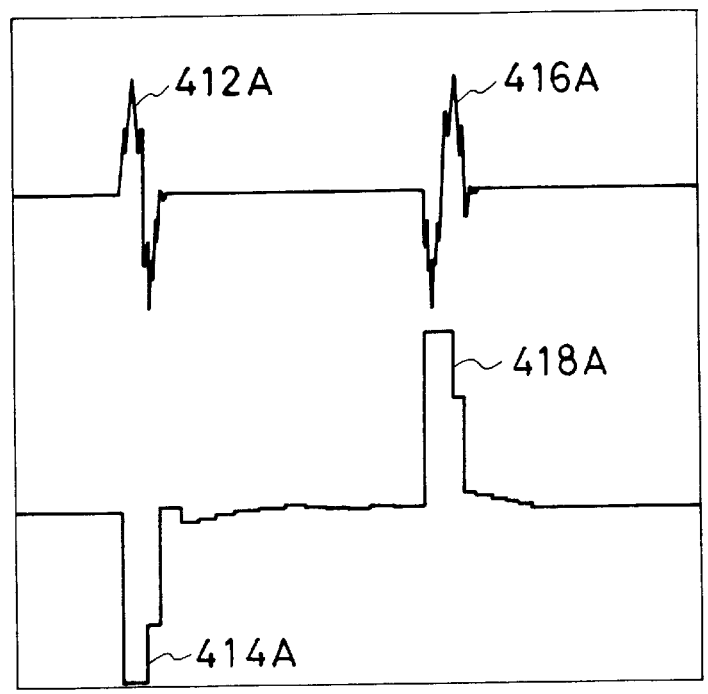
FIGS. 27A and 27B show test results of seek control in forward and reverse directions.
Figure 27B:
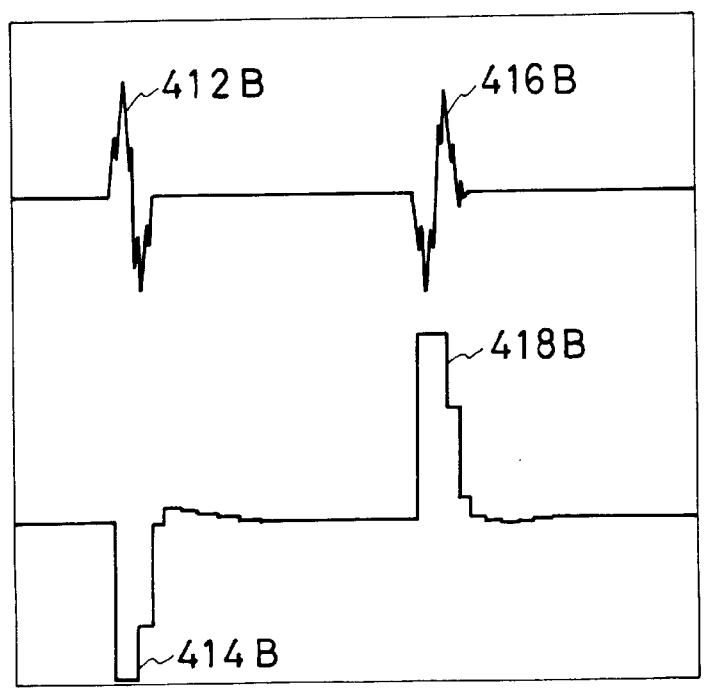

FIG. 26 shows a four-sample coarse control. If the value of the target location trajectory 152 at the third sample, one sample before the end of the coarse control, is increased, for example, an overshoot 156 is generated. If the value of the target location trajectory is decreased, an undershoot 158 is generated. The overshoot and undershoot is freely adjusted in this way after the seek if the value of the target location trajectory is adjusted in the course of the seek control. Tests show that the overshoot and undershoot immediately after the target location is reached becomes different depending on whether the seek direction is forward or reverse. FIGS. 27A and 27B show these test results. FIG. 27A show the test result before the target location trajectory is adjusted. A forward driving current 412A controls a head location 414A, a reverse driving current 416A controls a head location 418A, and a small degree of undershoot is observed. FIG. 27B show the test result after the target trajectory adjustment. A forward driving current 412B controls a head location 414B, a reverse driving current 416B controls a head location 418B, and the undershoot is reduced. To avoid the overshoot and undershoot due to the difference between the seek directions, it is required that the target location in the forward direction and the target location in the reverse direction be of different values. Furthermore in the tests, after adjustments were made so that neither overshoot nor undershoot takes place in both forward and reverse directions, the seek control was made using the same constants with different seek distances of 1.5, 2.0, 3.0, and 4.0 tracks. At the seek distance of 4.0 tracks, the overshoot appeared again. The phenomenon of the overshoot at 4.0 tracks was traced down to the following reason: the saturated output voltage of the VCM driver 36 distorted the accelerating current and decelerating current failing to make the waveforms of both currents similar. To cause the short-distance seek control to function correctly, the seek distance should be determined to within a range that keeps the FF accelerating current waveform and FF decelerating current waveform similar. If the FF current waveforms are distorted and not similar, their waveform period should be prolonged.

In consideration of the loop gain error, the adjustment of the overshoot and undershoot, and performance difference due to the different seek directions and seek distances, the values of the final target location are obtained as shown in FIG. 28. FIG. 28 shows the seek control of three-sampling period using a triangular FF current. The seek distance, if smaller than 2.0 tracks, is different between the forward direction and reverse direction. On the seek distances of 2.0 tracks or greater, there is no difference between the two seek directions. The correction coefficients for determining the target location at each sampling time are −1.0, −1.0, and −0.550 on the seek distances smaller than 2.0 and the seek direction forward. Computation of the target location using the coefficients in FIG. 28 at each sampling timing is used for computing the target location trajectory for determining position error in step S7 in the flow diagrams in FIG. 15A and 15B. Namely, the target location trajectory is given by the following equation.

Target location trajectory=Seek distance×Correction coefficient

For example, in FIG. 28, when the seek distance and direction are respectively 1.0 track and forward, the target location is as follows: 0 at the first sample, 0 at the second sample, 0.45 at the third sample. At the fourth sample, the target location is 1.0 track because the standard position control takes over. The present invention achieves a short seek control within the predetermined sample count by performing not only the closed-loop control using the FF current in the position feedback control of the target location trajectory, but also by correcting the target location trajectory in consideration of the seek distance and direction.

Figure 2B:
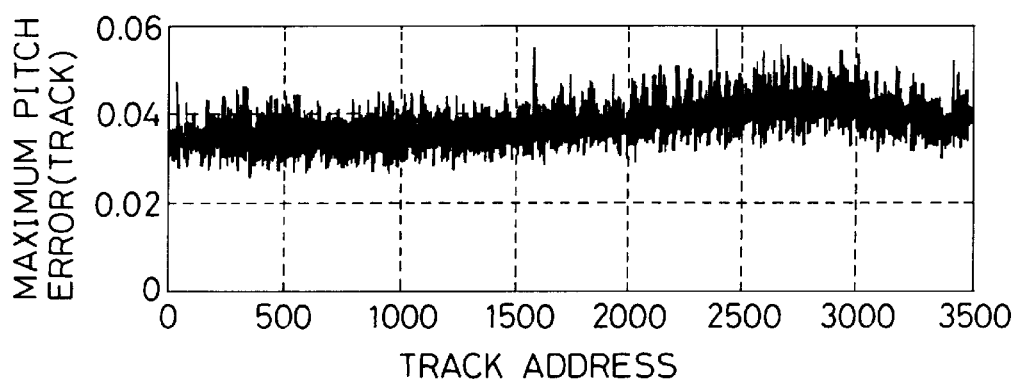
Figure 2C:
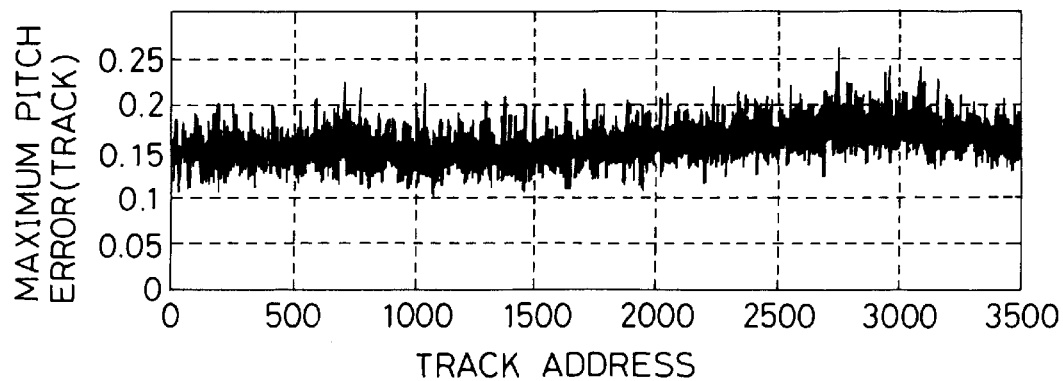

In the seek control of the present invention, the validity of the position feedback control in combination with the FF current is now studied. As discussed with reference to the prior art in FIG. 2, the track pitch suffers variations of ±20%. Even with the track pitch having such a range of variations, the present invention is found to restrain the effect of repeatable and non-repeatable runouts that are variations in low-frequency bands by combining the position feedback control by the position control module 64 with the open-loop control using the FF current.

Figure 29:
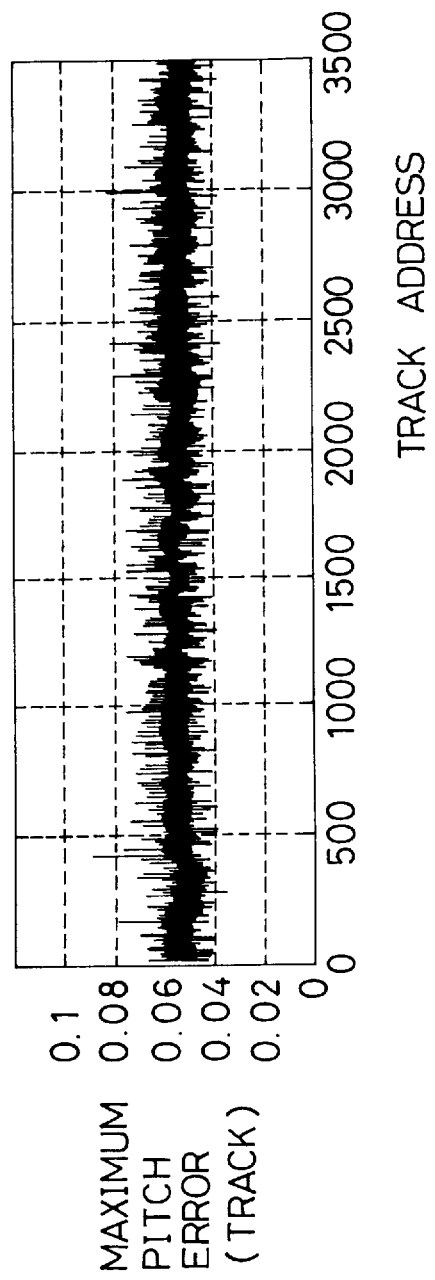
FIG. 29 shows variations in the arrival position in the coarse control when one track seek is performed using the seek control of the present invention.

FIG. 29 shows variations in the arrival position at the end of the coarse control when one track seek was produced according to the seek control of the present invention. Compared with the prior art in FIG. 2, the variations in the track pitch are reduced to approximately one-third. Namely, a variation range of ±20% in the prior art is improved to a range of ±6 to 7% in the present invention. This means that the VCM follows the low-frequency components of the repeatable and non-repeatable runouts through the position feedback control. Therefore, even during a short period of time as short as 4 samples, the present invention successfully reduces the effect of the repeatable and non-repeatable runouts by performing the closed-loop control of position feedback.

In the seek control of the present invention, the overshoot and undershoot are rarely observed after the seek in the control process over the 4 samples, from the seek start point to the target location; thus, the settling state is reached at the moment the four-sample control ends, namely immediately after the coarse time, at a substantially high percentage of trials. After the target location is reached, depending on the coarse time, the settling state is determined referring to, for example, whether the following four conditions are satisfied or not. This is referred to as a first settling determination condition.

I. The absolute value of the error of the current location is 0.1 track or smaller.

II. The absolute value of the difference between the current location and the location one sample earlier is 0.09 track or smaller.

III. The absolute value of the difference between twice the error of the current location and the error of the location one sampler earlier is 0.11 track or smaller.

IV. All the preceding three conditions are continuously satisfied for 4 samples.

Figure 30A:
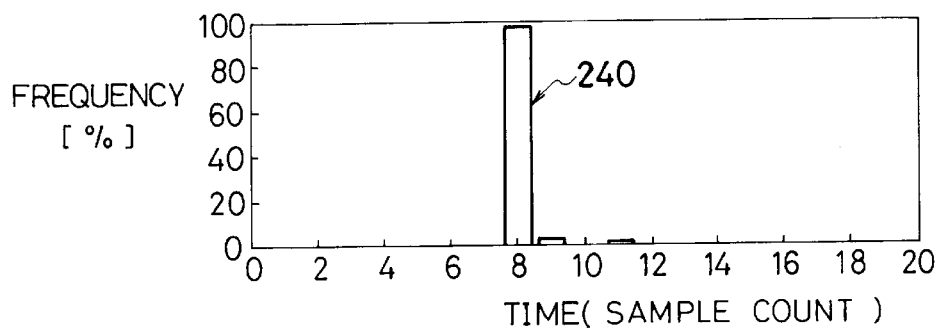
FIGS. 30A and 30B show the frequency distributions of the seek time when two types of settling conditions are used in the seek control of the present invention.
Figure 30B:
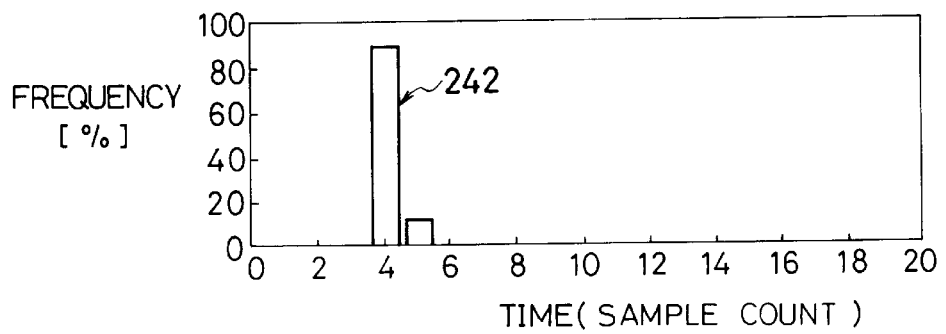
Figure 31A:
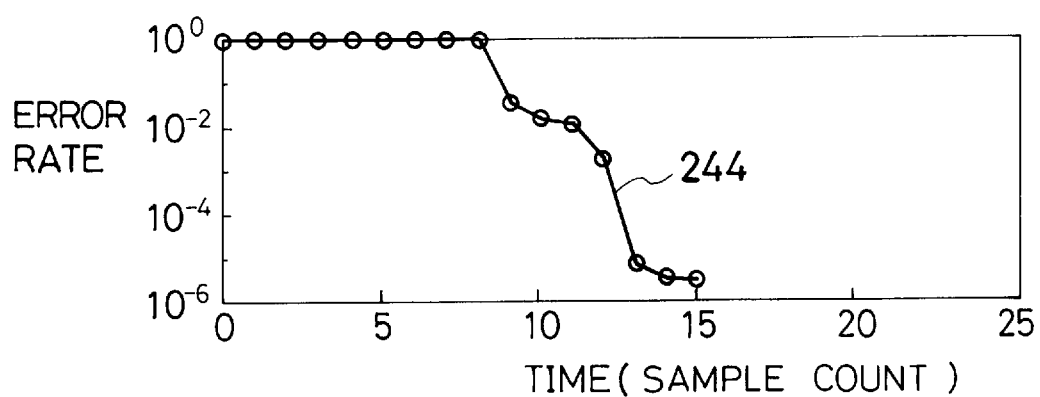
FIGS. 31A and 31B show the frequency distributions of the error rate of the seek time when two types of settling conditions are used in the seek control of the present invention.
Figure 31B:
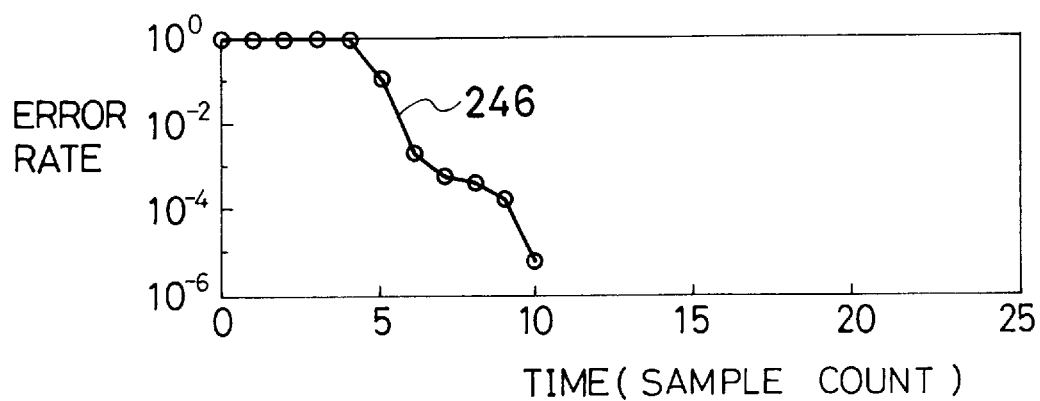

FIG. 30A shows the result of a test that measures the frequency distribution of seek time of one track seek that satisfies the first settling determination condition. Some 90% of the seek times fall within the sample count of 8. In the seek control of the present invention, however, since the overshoot and undershoot are rarely observed after the designated four-sample control, the seek time is determined simply by the magnitude of the position error as a second settling determination condition. Namely, the second settling determination condition is a position error to within ±0.1 track at the seek end. FIG. 30B shows the result of another test that measures the frequency of distribution of seek time according to the second settling determination condition. As seen from FIG. 30B, the probability of seek end with the settling condition satisfied in the vicinity of 4 samples is as high as 90%. FIG. 31A shows the measurements of error rate versus time determined by the sample count in connection with the first settling determination condition. FIG. 31B shows the measurements of error rate versus time determined by the sample count in connection with the second settling determination condition. The settling determination in FIG. 31B based on the second settling determination condition that depends on the position error only assures a sufficient error rate. Based on the fact that a satisfactory settling determination is achieved by determining the location error only at the end of the seek control of the designated sample count, the present invention performs the settling determination of the position error only as designated by the second settling determination condition at step S7, for read seek operation, as illustrated at steps S6 through S8 in FIG. 14. If the head is within the permissible read range, a read permission is immediately given at step S8. In contrast, in a write seek operation, there is a possibility of an erratic erasing of data due to position slip involved in an overshoot subsequent to the seek end; thus, the settling determination designated by the first settling determination condition is performed at step S10 in FIG. 14.

Figure 32:
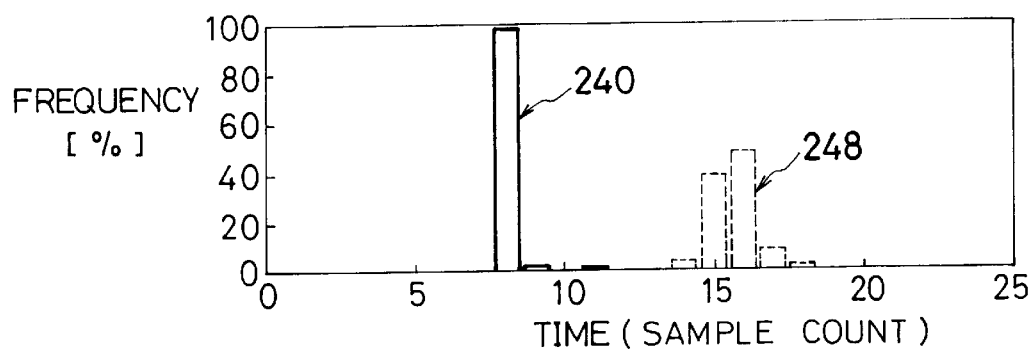
FIG. 32 shows the frequency distribution of the seek time in the seek controls according to the present invention and the prior art.
Figure 33:
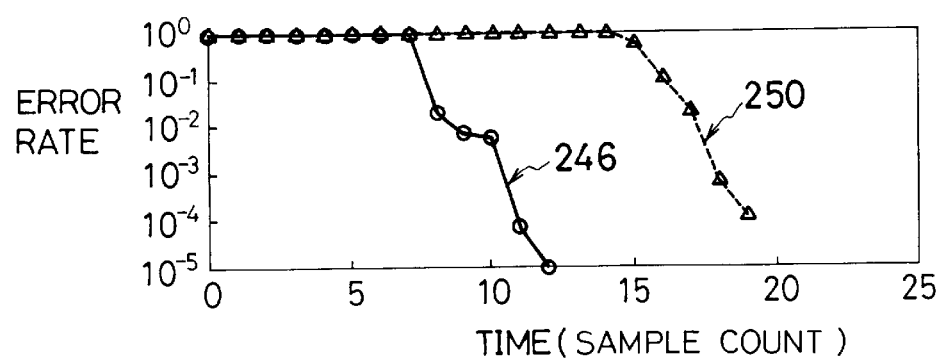
FIG. 33 shows the frequency distribution of the error rate of the seek time in the seek controls according to the present invention and the prior art.
Figure 34A:
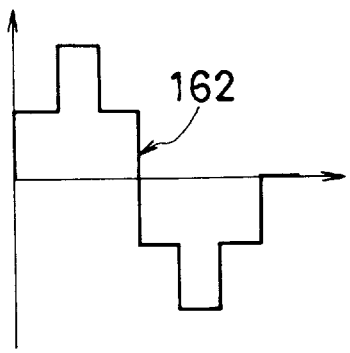
FIGS. 34A–34F show the sequences of the calibration of the FF current waveform used in the present invention.
Figure 34D:
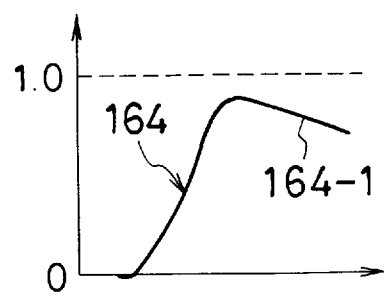
Figure 34B:
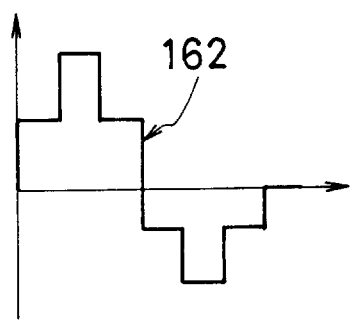
Figure 34E:
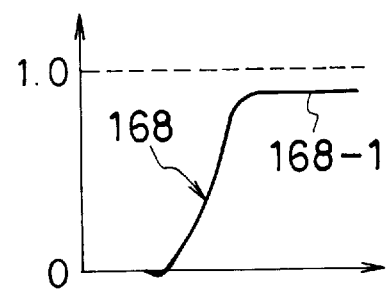
Figure 34C:
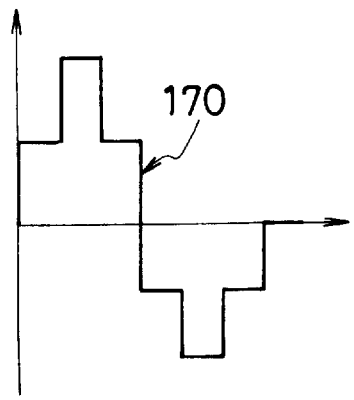
Figure 34F:
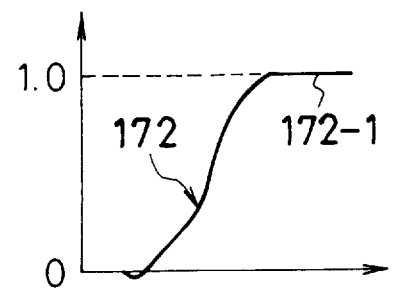

FIG. 32 shows the probability distribution of the measurements of seek time in the seek control of the present invention and the prior art when the first settling determination condition is used on the write seek distance of one track. FIG. 33 shows the error rates corresponding to FIG. 32. In FIG. 32, the distribution 248 of the seek time in the prior art agrees with the Gaussian distribution. In this case, however, a relatively long seek time as long as a sample count of 15 is required. In contrast, the present invention has some 95% of the seek times falling within the vicinity of a sample count of 8 as shown by a probability distribution 240. The probability distribution 240 itself has a peak uniquely concentrated on the sample count of 8. Even the write seek according to the first settling determination condition offers a short seek time of 8 samples, half the prior art seek time of 15 to 16 samples. Discussed next is the calibration of the FF current waveform. As for the FF current used in the seek control of the present invention, it is perfectly acceptable that its computed value is corrected according to the seek distance and the loop gain if the speed after the seek is zero. In practice, however, the speed after the seek cannot be zero, for example, if the area of the FF accelerating current waveform and the area of the FF decelerating current waveform are different. FIGS. 34A–34F show the correction sequence of the FF current. The FF current 162 in FIG. 34A is the waveform resulting from computation, and the seek control of such waveform produces the head trajectory 164 in FIG. 34D. This head trajectory 164 fails to move 1.0 track as the target location because of a lack of gain, and thus has a returning portion 164-1. The amplitude of the current is then corrected to the current waveform 166 in FIG. 34B so that the head trajectory 168 flattens off at a flat portion 168-1. With the waveform in FIG. 34B, however, the head trajectory fails to move 1.0 track as the target location. The amplitude of the waveform is increased even more as shown by the waveform 170 in FIG. 34C so that the head trajectory 172 in FIG. 34F is achieved. Thus, the current waveform is corrected for the head to settle after reaching the target location of 1.0 track.

Figures 35A, 35B, 35C:
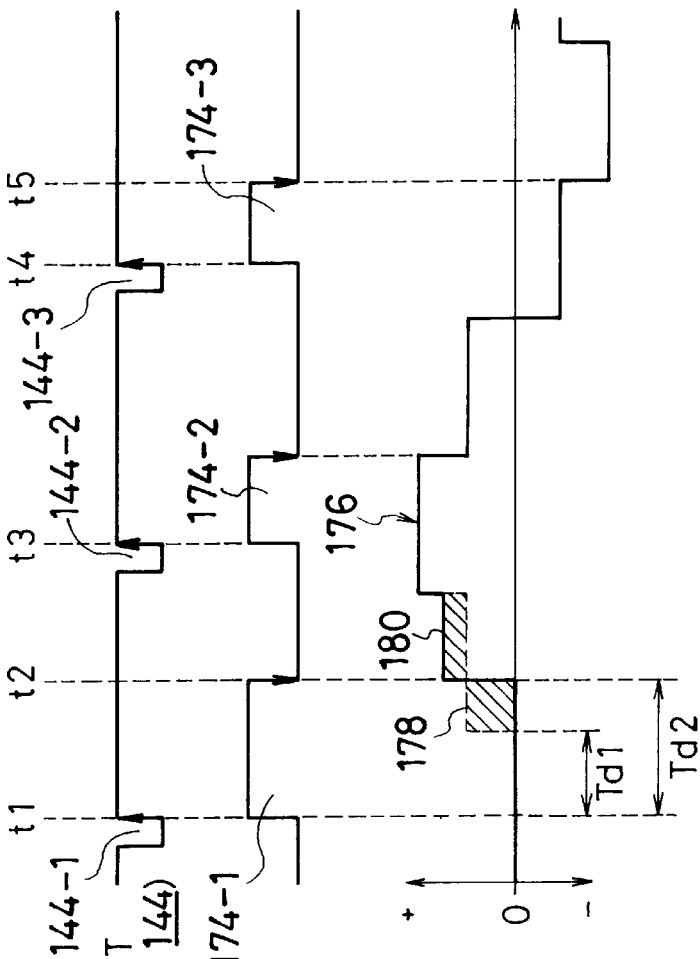
FIGS. 35A–35C show the corrections of the FF current waveform, wherein the delayed timing of the current flown at the first sample is compensated for in the present invention.

FIGS. 35A–35F show the correction of the FF current in consideration of the time delay resulting from the computation task of the controller. Since many initial computations required for the seek control should be performed at the sampling timing immediately after the reception of the seek command, the timing for outputting the current to the VCM is delayed compared with the sampling timings thereafter. If the time delay is predicted beforehand, the current value at the first sampling timing is compensated for the value corresponding to the time delay. In FIG. 35A, a task 174-1 that takes a relatively long time for initial computation is started at the first timing t1 as shown in FIG. 35B, and is completed at the timing t2. Then, the current flows through the VCM as shown in FIG. 35C. Now, suppose that the delay from the timing t1 is Td2, and that the FF current 178 is originally intended to flow with a shorter time delay of Td1 from the timing t1. The differential area between the delay times Td1 and Td2, namely the area corresponding to a portion 178 is added on the current value from the timing t2, and that compensated FF current is used. Even if the initial computation takes time at the first sampling timing delaying the output of the first FF current, the correct FF current is allowed to flow through the VCM without being adversely affected by the delay. As for another adjustment of the FF current, different frictional forces between the seek directions are measured beforehand, and corrections compensating for such a difference are preferably made. When there is a waveform difference between the accelerating current and decelerating current in the FF current, the speed is measured after the seek is performed in the open-loop control using the accelerating and decelerating currents. The speed at the end of seek may be set to be zero by increasing or decreasing the acceleration or deceleration.

Figures 36A, 36B, 36C:
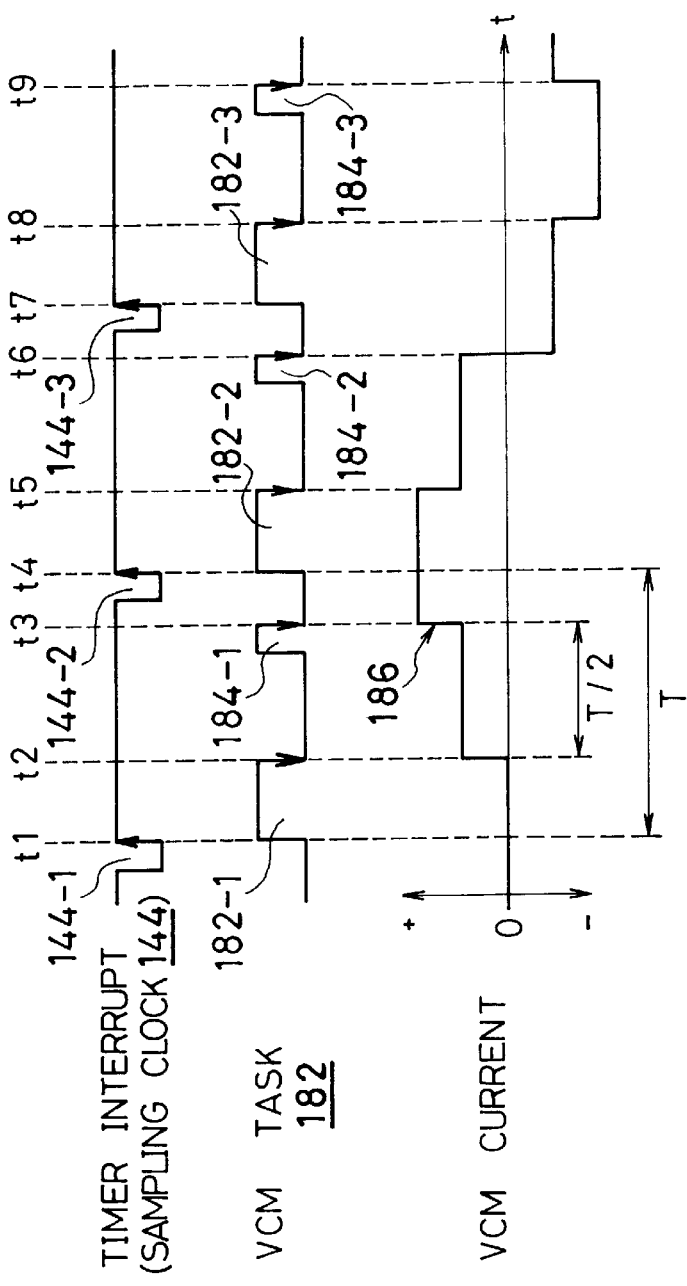
FIGS. 36A–36C are timing diagrams showing multi-rate control, wherein position control is performed by predicting a target location trajectory in addition to FF current at ½ sampling timings.

FIGS. 36A–36C are timing diagrams of the multi-rate control in the seek control of the present invention. In the seek control in FIG. 6, the FF current only is switched at each ½ sampling period. In the multi-rate control in FIGS. 36A–36C, the target location trajectory and its correction are processed at each ½ sampling period. Specifically, the head location is detected at each timing of t1, t4, and t7 to pick up a difference to the target location, the current value for the position feedback control is computed, the computed current value is added to the FF current, and the added current is fed to the VCM. Furthermore, by the multi-rate control, the action of the VCM between sampling timings is predicted to derive the difference to the target location and thus to compute the current. This current is added to the FF current. For example, as shown in FIG. 36C, the current determined at a task 184-1 is fed to the VCM at the timing t3 that is delayed by half the sample period T from the timing t2, in addition to the current output at the timing t2 given by a task 182-1 synchronized with the sampling timing t1. Between sampling timings t4 and t6, a current output is provided to the VCM at the timing t5 in the multi-rate control. The same is true of the timing t8 between timings t7 and t9. Available for predicting the target location between sampling timings in the multi-rate control are: a method in which computation is made on the assumption that the position difference between the target location and the actual position is zero, another method in which the interpolation with the position at the next sampling timing is used and yet another method in which the target location is determined according to a predetermined equation. In combination with the multi-rate control, the position feedback control matching an even more precise FF current output is performed, restricting the generation of overshoot and undershoot after the seek in an assured manner.

Figure 37A:
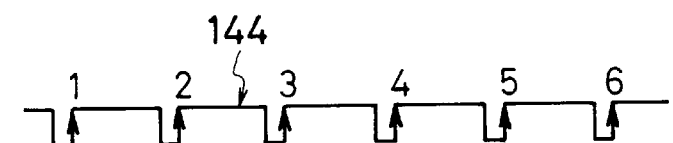
FIGS. 37A–37E show the triangular FF current waveform versus the sample counts.
Figure 37B:
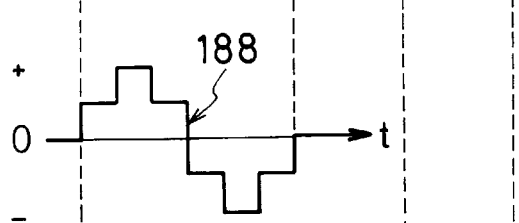
Figure 37C:
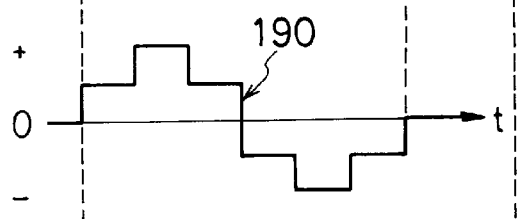
Figure 37D:
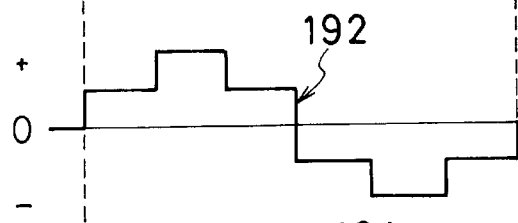
Figure 37E:
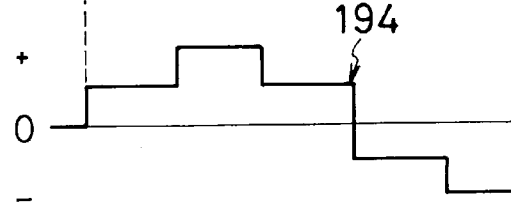

FIGS. 37A–37E show the FF current used in the present invention in terms of sample count. FIG. 37A shows the sampling clock. FIG. 37B shows a two-sampling-period long triangular-wave FF current 188, FIG. 37C shows a three-sampling-period long triangular-wave FF current 190, FIG. 37D shows a four-sampling-period long triangular-wave FF current 192, and FIG. 37E shows a five-sampling-period long triangular-wave FF current 194.

FIG. 38A shows the sampling clock, and FIGS. 38B–38E show two-, three-, four-, and five-sampling-period long rectangular-wave FF currents 196, 198, 200, and 202, respectively.

Figure 39A:
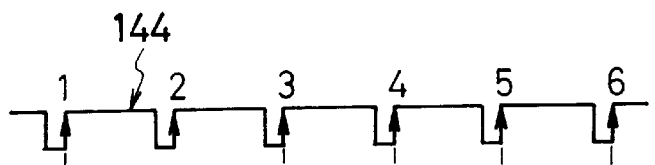
FIGS. 39A–39E show the trapezoidal FF current waveform versus the sample count.
Figure 39B:
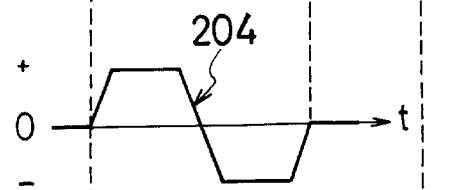
Figure 39C:
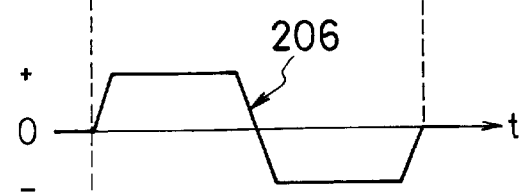
Figure 39D:
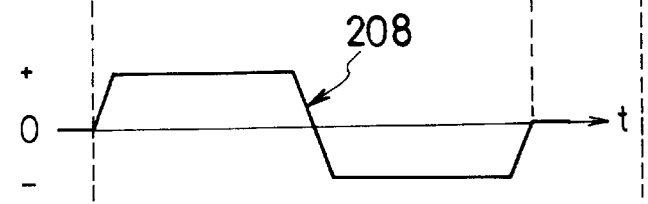
Figure 39E:
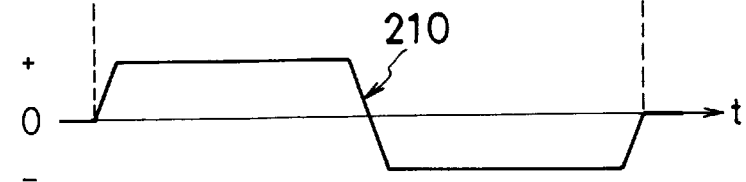

FIG. 39A shows the sampling clock, and FIGS. 39B–39E show two-, three-, four-, and five-sampling-period long trapezoidal-wave FF currents 204, 206, 208 and 210, respectively.

FIG. 40A shows the sampling clock, and FIGS. 40B, 40B and 40C show a triangular-wave FF current 212, rectangular-wave FF current 216 and trapezoidal-wave FF current 218, each having zero-current duration 214.

Figure 41A:
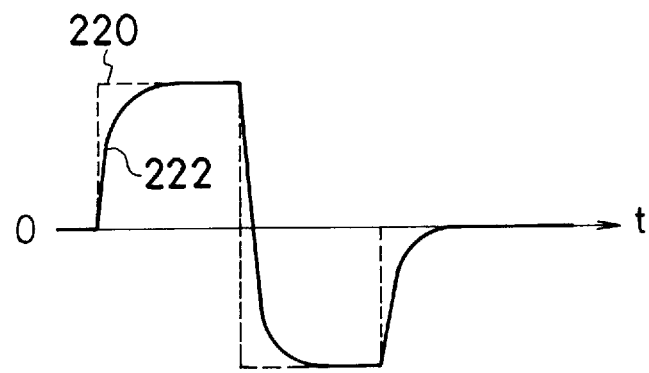
FIGS. 41A and 41B show the relationships between the rectangular FF current and the distortion of the real current depending on the presence or absence of the zero-current duration.
Figure 41B:
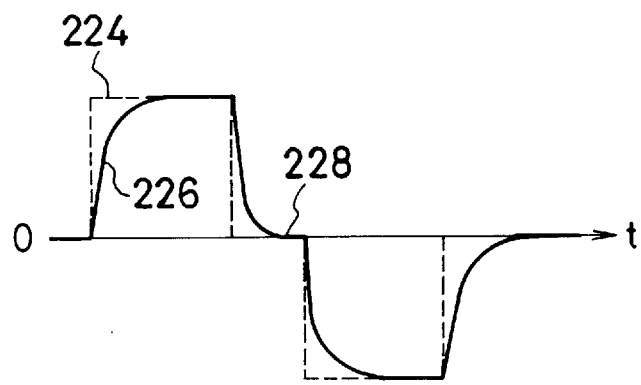

FIG. 41A shows a rectangular-wave FF current 220 having no zero-current duration in the middle between its first half and second half, wherein the area of the first half accelerating current and the area of the second half decelerating current are not equal. In contrast, if a zero-current duration 228 is formed in the middle of the wave as shown in FIG. 41B, the first half accelerating side and the second half decelerating side are identical in terms of the difference between the real current waveform 226 in the solid line and its ideal rectangular current waveform in the broken line. Thus, similarity between the accelerating current and decelerating current is assured. If no similarity is assured between the first half accelerating current and the second half decelerating current due to a distorted waveform of the FF current, the triangular, rectangular or trapezoidal-wave FF current having the zero-current duration in the middle of the wave shown in FIGS. 40B–40D is preferable.

Figure 42A:
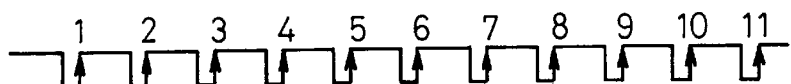
FIGS. 42A–42E show the FF current waveforms when the current is changed once a sampling cycle.
Figure 42B:
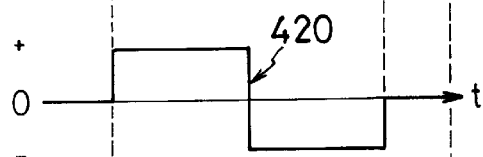
Figure 42C:
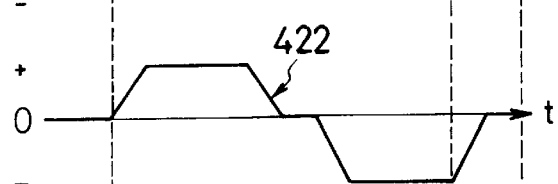
Figure 42D:
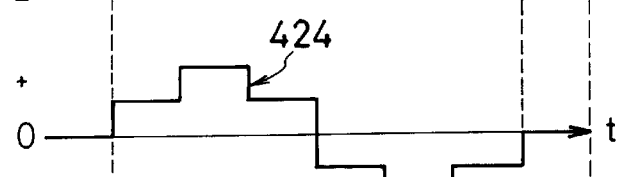
Figure 42E:
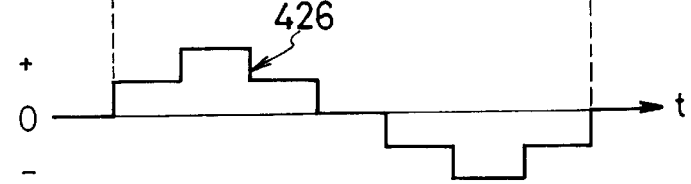

FIGS. 42A–42E show the FF current waveforms when each is switched once a sample in one track seek in the seek control of the present invention. Used herein are 5 to 10 sampling timings (4 to 9 sampling periods) of the sampling clocks in FIG. 42A. FIG. 42B shows a rectangular FF current 420 of 5 sampling timings (4 sampling periods). FIG. 42C shows a trapezoidal FF current 422 having a zero-current duration. A triangular FF current 424 is 7 sampling timings (6 sampling periods) long as shown in FIG. 42D. A triangular FF current 426 having a zero-current duration is 8 sampling timings (7 sampling periods) long as shown in FIG. 42E.

The final purpose of the calibration at the manufacturing stage is to adjust for the shortest seek time possible. The seek times are accurately compared by measuring error rates as shown in the write seek in FIG. 31A and the read seek in FIG. 31B. In the correction of the target location trajectory at the final phase of the calibration, error rates are measured to determine whether the correction done is optimum or not, the seek times that present a fixed error rate are determined and compared, and thus the optimum correction value of the target location trajectory is obtained.

Figure 43:
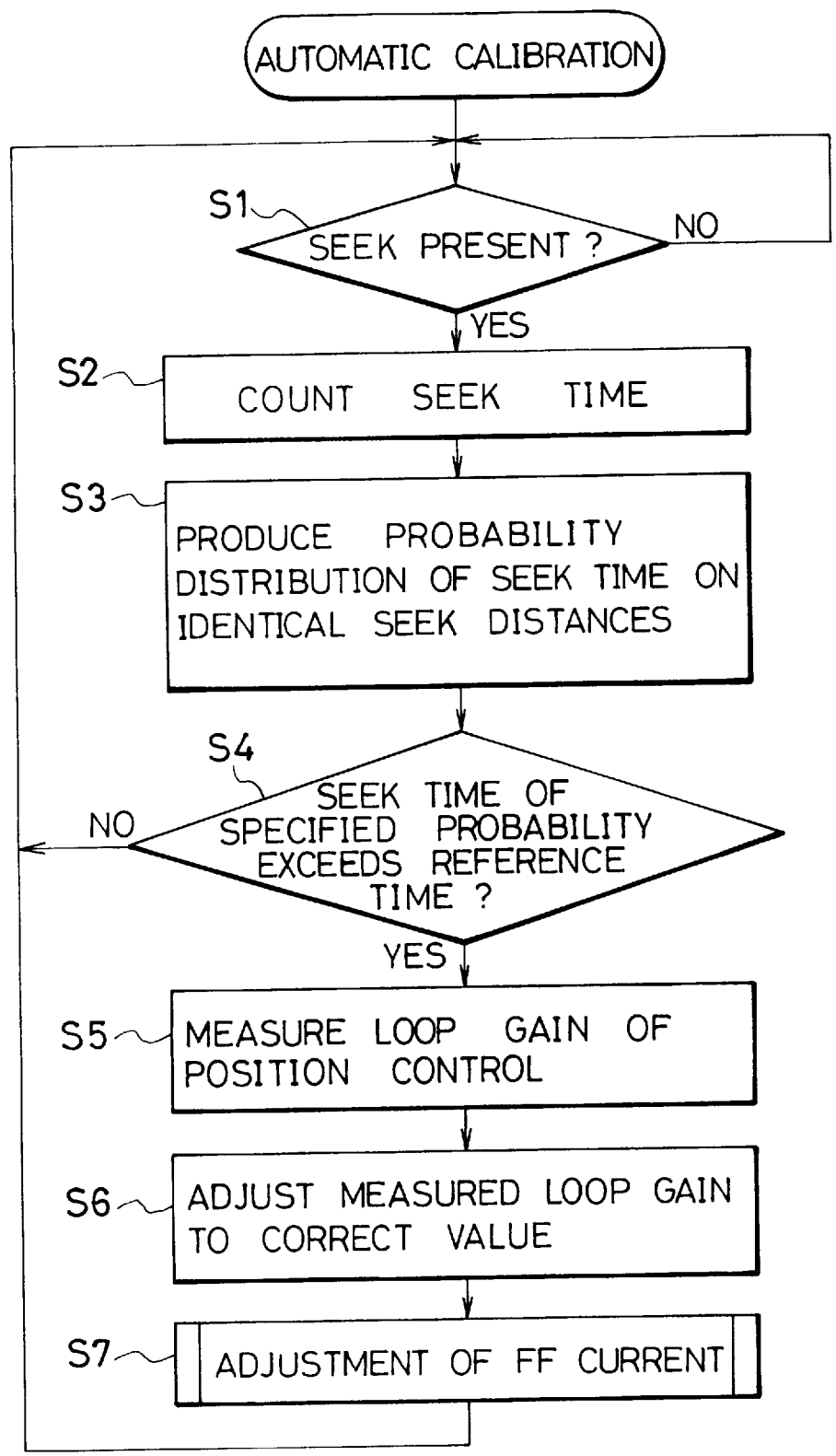
FIG. 43 is a flow diagram showing the automatic calibration that is performed when the apparatus is in service.
Figure 44:
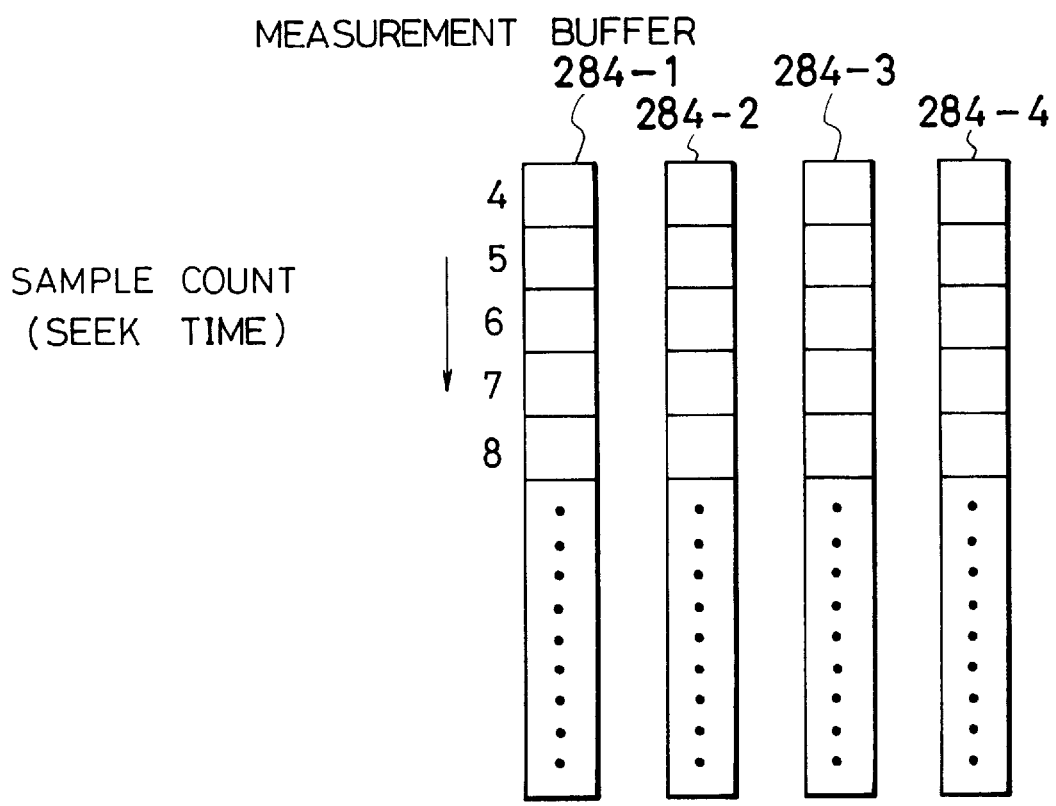
FIG. 44 shows the measuring buffer used in the measurement of the seek time of the apparatus of FIG. 43.

Discussed next is the calibration at the user stage. FIG. 43 shows the detailed flow diagram showing the automatic calibration at the user stage of steps S4 through S7 in FIG. 16. The automatic calibration checks the presence or absence of a seek control at step S1. If the seek control is performed, the sequence goes to step S2 to measure the seek times. The results of seeks are grouped by seek distance and then separately recorded. FIG. 44 shows, for example, the measurement buffers that record seek time measurements for 1.0 track seek. This example provides four buffers 284-1 through 284-4, each recording the frequency of seek times determined by sample count 4, 5, 7, 8, . . . . For example, the buffer 284-1 records seek times at the present time, the buffer 284-2 records seek times 5 minutes before, the buffer 284-3 records seek times 10 minutes before, and the buffer 284-4 records seek times 15 minutes before. When the storage time of 5 minutes for the buffer 284-1 has elapsed, the content of the buffer 284-4 that holds oldest seek time data, 15 minutes before, is erased to keep updated seek times. In this way, the record of the frequency of seek times from 15 minutes before to the present time is constantly maintained.

Returning to FIG. 43, the sequence goes to step S3 after the seek time is measured at step S2. From seek time measurements, the probability distribution of frequency of seek times on the same seek distance is derived from the seek time measurements. Specifically, the write seek time measurements and read seek time measurements are separately stored, and the probability distributions of the frequencies of the seek times are produced as shown in FIGS. 30A and 30B. The sequence goes to step S4, where a determination is made of whether or not the seek time of a designated probability exceeds a predetermined reference time. In the read seek in FIG. 30B, suppose that a probability of 80% is designated with the reference time for the designated probability being 4 samples. In connection with the probability distribution of the read seek actually determined at step S3, a calibration determination criterion is based on whether or not the seek time of a probability distribution in excess of the designated 80% increases beyond 4 samples. If the seek time of the designated probability exceeds the reference time at step S4, it is determined that a calibration is necessary. The sequence goes to step S5, where the loop gain of the position control is measured. In the measurement of the loop gain, the seek control to the seek distance that is going to be calibrated is performed on all tracks to measure loop gains, and measurements are averaged. At step S6, whether the actually measure loop gain agrees with the correct loop gain set at the manufacturing stage is checked. If both fail to agree, the loop gain deviates, and needs to be corrected to the correct value. When the loop gain is corrected, the sequence goes to step S7 for adjustments of the FF current.

Figure 45:
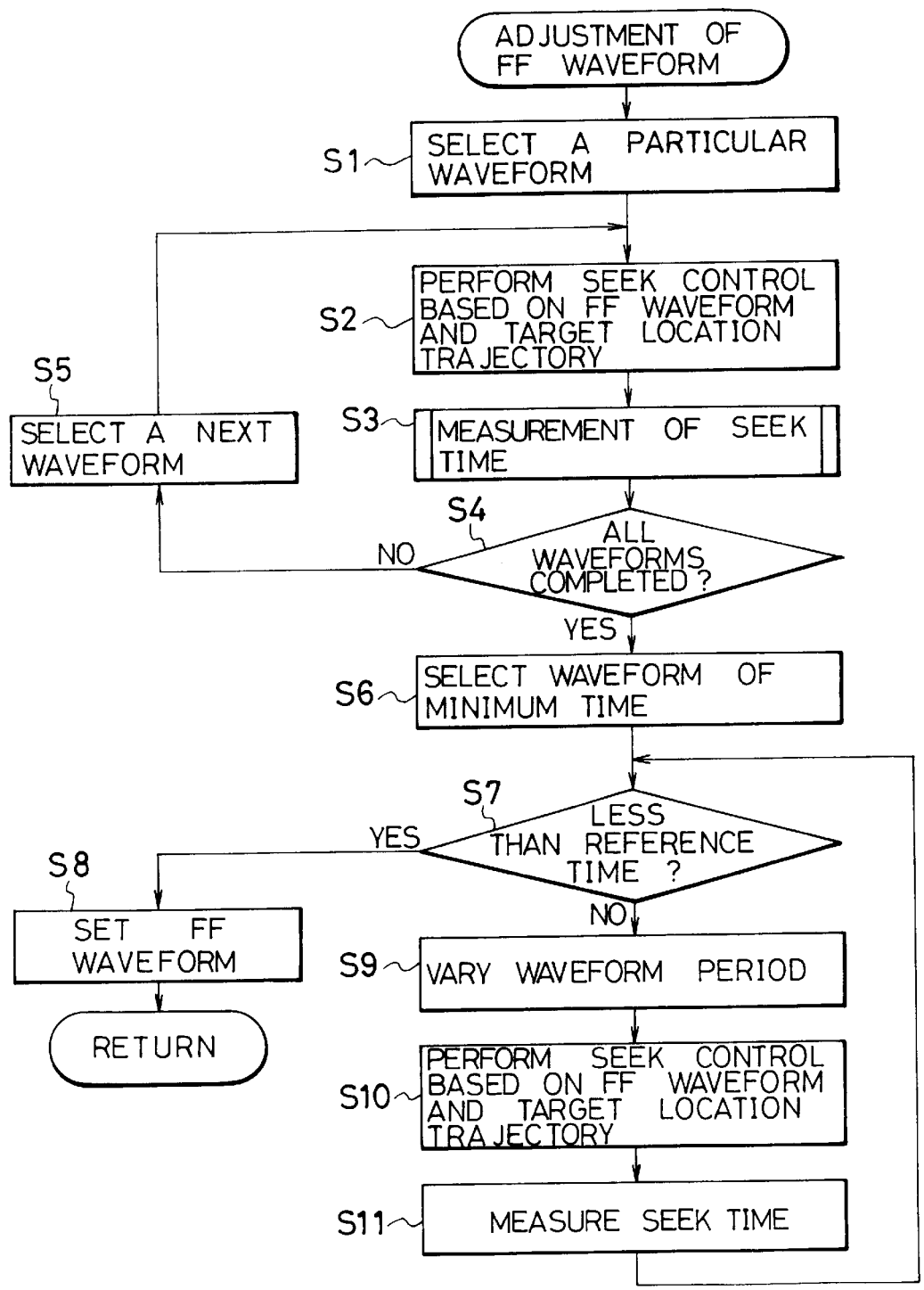
FIG. 45 is a flow diagram showing the adjustment process of the FF waveform with reference to FIG. 43.

FIG. 45 is the flow diagram of the adjustment process of the FF current at step S7 in FIG. 43. In the apparatus of the present invention, to enable the adjustment of the FF current, the ROM beforehand stores the triangular-wave, rectangular-wave and trapezoidal-wave FF currents having each of sample counts 3, 4, 5 and 6 shown in FIGS. 37B–37E, FIGS. 38B–38E, and FIGS. 39B–39E, respectively. In the adjustment of the FF current, a particular current waveform out of three types of triangular, rectangular and trapezoidal waveforms is selected at step S1. Based on the selected FF current and the target location trajectory corresponding to it, the seek control of 1.0 track, for example, is performed at step S2, and the seek time is measured at step S3.

Figure 46:
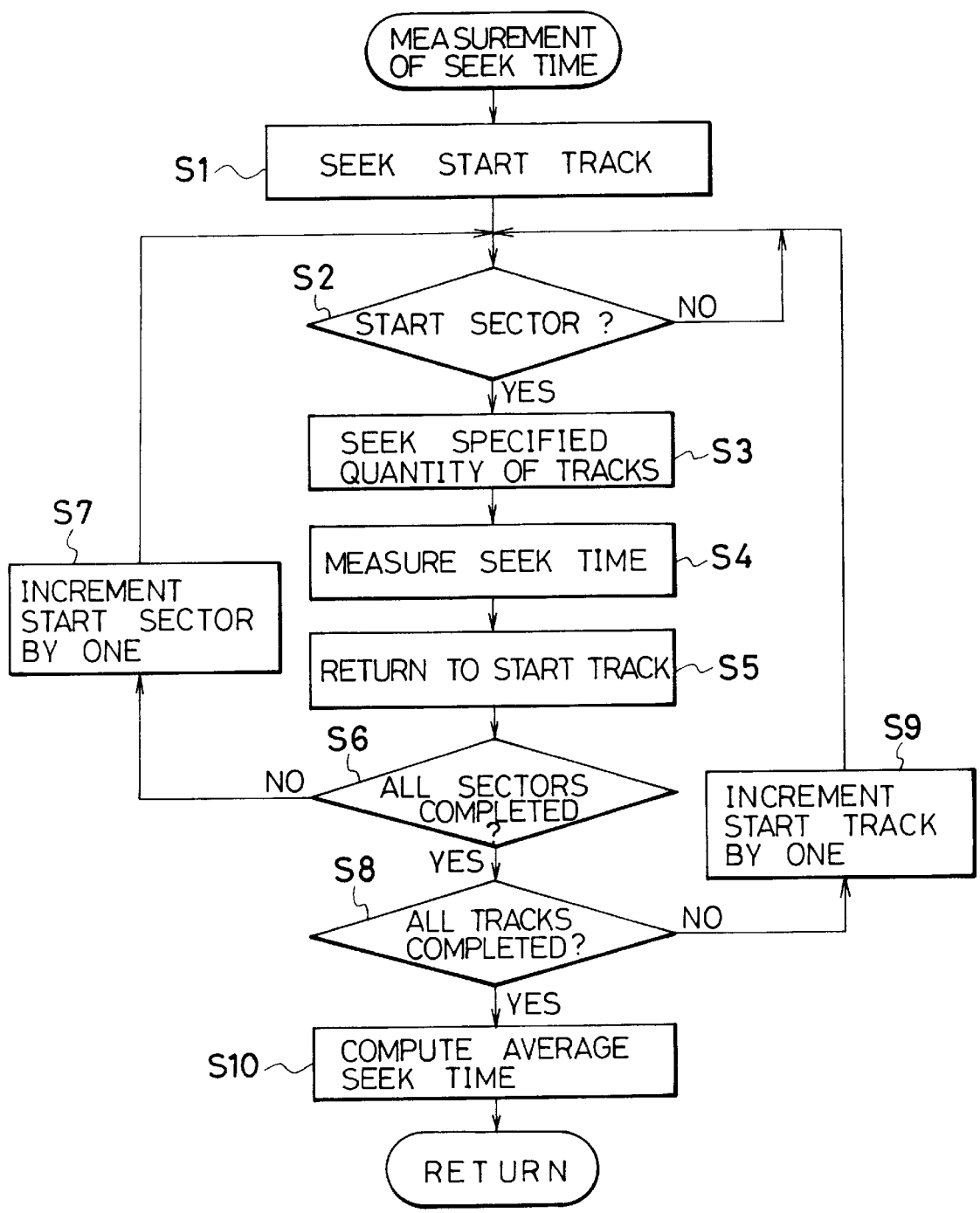
FIG. 46 is a flow diagram of the seek time measuring process performed in FIG. 45.

In the seek control and the seek time measurement process as shown the flow diagram in FIG. 46, the seek time is measured on all sectors of all tracks, and the measurements are averaged. At step S1, a predetermined seek start track is sought, and step S2, a determination is made of whether that track is a start sector or not. When the predetermined start sector is reached, a seek of a predetermined track count, for example, a 1.0 track seek, is performed at step S3. At step S4, the seek time is measured. When the seeks for one sector is completed, the process returns to the start track at step S5. At step S6, a determination is made of whether the seek time measurement is made to all sectors. If not, the start sector is increased by 1 at step S7, and steps S2 through S5 are repeated until the seek times of all sectors are measured. When the seek time measurement is completed to all sectors at step S6, the sequence goes to step S8. At step S8, a determination is made of whether the measurements of all tracks are completed. If not completed, the seek start track is increased by 1 and the process from step S2 thereafter is repeated. When the measurements of all tracks end, the sequence goes to step S10, where the averaged seek time is computed from the measured seek times. Since measuring the seek times on all sectors of all tracks is time consuming, the averaged seek time may be derived by averaging the seek times on all sectors of particular tracks designated.

Returning to FIG. 45, the sequence goes to step S4 after the seek time measurement at step S3 is completed. At step S4, a determination is made of whether the seek time measurement process for all waveforms is completed. If not completed, a next FF current is selected at step S5, and the process from step S2 thereafter is repeated. At step S4, the seek time measurement of all waveforms is completed, the FF current waveform presenting the minimum seek time is selected at step S6. At step S7, a determination is made of whether the minimum seek time of the selected FF current waveform is equal to or shorter than a reference time. If it is equal to or shorter than the reference time, the sequence goes to step S8, and the selected FF current waveform giving the minimum time is registered as an optimum waveform. On the other hand, if the minimum time exceeds the reference time at step S7, the selection of the FF current makes no improvements in the seek time, and thus the sequence goes to step S9. At step S9, the period of the FF current waveform giving the minimum time is varied. At step S10, the seek control is performed using the period-varied FF current waveform and the target location trajectory. At step S11, the seek time is measured. The measurement of the seek time in the seek control, in this case, again, uses the averaged value of the measurements of the seek times of all sectors of all tracks in accordance with the flow diagram in FIG. 46. When the measurement of the seek time ends at step S11, the sequence returns to step S7, where a determination is made of whether the seek time resulting from the varied period of the waveform is equal to or smaller than the reference time. If the seek time is equal to or smaller than the reference time, the sequence goes to step S8, where the waveform of the varied period is registered as an optimum FF waveform. The variation of the period of the waveform is performed not too near the vicinity of the resonance period in consideration of the resonance period of the apparatus.

In the automatic calibration in FIG. 43, the seek time is measured, and then the necessity of the calibration is determined based on the probability distribution of the frequency of seek time in each seek distance. Alternatively, error rate curves versus seek time in the write seek and read seek as shown in FIGS. 31A and 31B are derived from the seek time measurements in each seek distance, and the calibration may be performed only when the error rate curve exceeds a predetermined permissible range.

Alternatively, the necessity of the calibration may be determined as follows: the predetermined reference seek time is set for each seek distance, the ratio of the seek times to the ones in excess of the predetermined reference seek time is determined, and the calibration may be performed when the ratio of excess exceeds a predetermined threshold. In this case, to determine the ratio of seek times in excess of the predetermined reference seek time, the number of seek times in excess of the predetermined seek time may be simply divided by the total frequency of the seek times. Furthermore, instead of the division, in the following equations, $1 \leq$ (frequency of seek times within the reference range)$/2^n > 0.5$ $1 \leq$ (frequency of seek times outside the reference range)$/2^m > 0.5$ n and m are calculated. In the following equation, M0 is $n \leq m + M0$ determined. When this equation holds, it assures that the error rate is equal to or smaller than ½ M0. In this way, the calibration determination criterion is based on comparison with the reference value, the frequency of the seek times is measured on the same counter, and the recording of the frequency of the seek times on a per seek distance basis is not required. Thus, recording management of measurements of the frequency of the seek times is simplified.

Drawing Access Control in the Long-distance Seek Control

Figure 47:
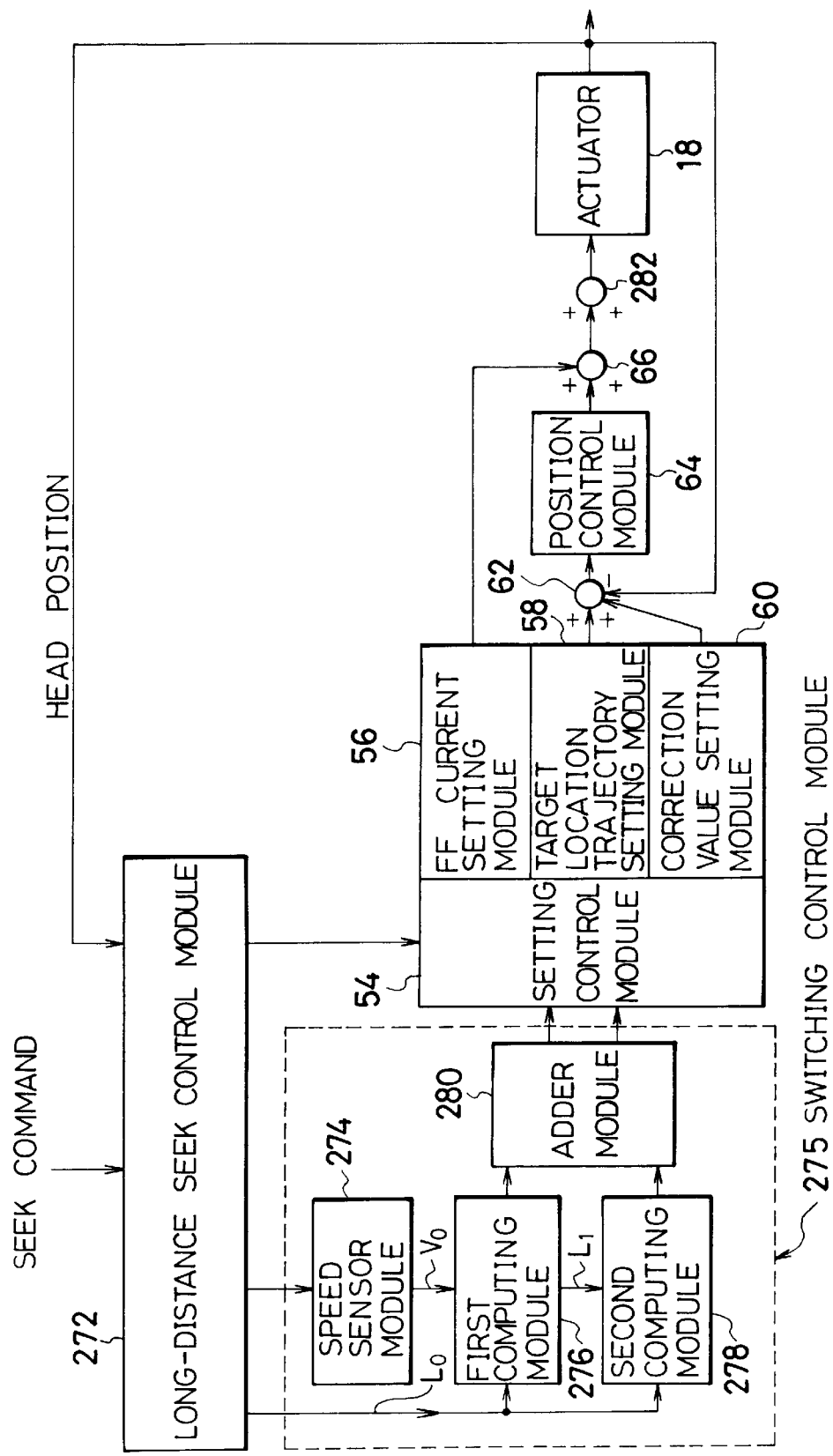
FIG. 47 is a block diagram of the embodiment, wherein the present invention is embodied in the access control in the standard long-distance seek.

FIG. 47 shows the embodiment, wherein the open-loop control using the FF current in combination with the position feedback control using the target location trajectory and its correction value according to the present invention is used in a drawing access control at which the prior art speed control is switched to the position control. On the seek distance of 13 tracks or longer, a long-distance seek control module 272 performs the seek control that allows the current to flow through the VCM of the actuator 18 according to the speed control. Specifically, when a seek command is received and when the seek distance is 13 tracks or longer, a target speed corresponding to the remaining track count (track difference) to the target location from the current location derived from the head location signal is read from a predetermined target speed table, and a speed feedback control is performed to move the head to the target location. In the course of the movement of the head through the speed control by the long-distance seek control module 272, the remaining track count to the target location draws near to a predetermined distance, for example, 1 track, a switching control module 275 is activated, and the drawing access control is performed in accordance with the FF current, target location trajectory and the position control. The FF current and target location trajectory used in the drawing access control are produced in the switching control module 275. The switching control module 275 comprises a speed sensor module 274 for sensing the speed when the long-distance seek is switched to the drawing access control, a first computing module 276 for computing a current −I1 for making the speed at the switching to zero and a seek distance L1 based on the current −I1, a second computing module 278 for computing the FF current and the target location trajectory for the seek distance L2 that is obtained by subtracting the seek distance L1 given by the first computing module 276 from the distance L0 to the target location, and an adder module 280 for outputting the currents and target location trajectories from the first computing module 276 and second computing module 278 to an FF current setting module 56 and a target location trajectory setting module 58. The circuit block connect to the switching control module 275 is identical to that for the short-distance seek control of the present invention in FIG. 6, and comprises a setting control module 54, the FF current setting module 56, the target location trajectory setting module 58, a correction value setting module 60, an adder 62, a position control module 64, and an adder 66. Connected to the adder 66 is an addition point 282 for adding the current obtained through the speed control of the long-distance seek control module 272.

Figure 48:
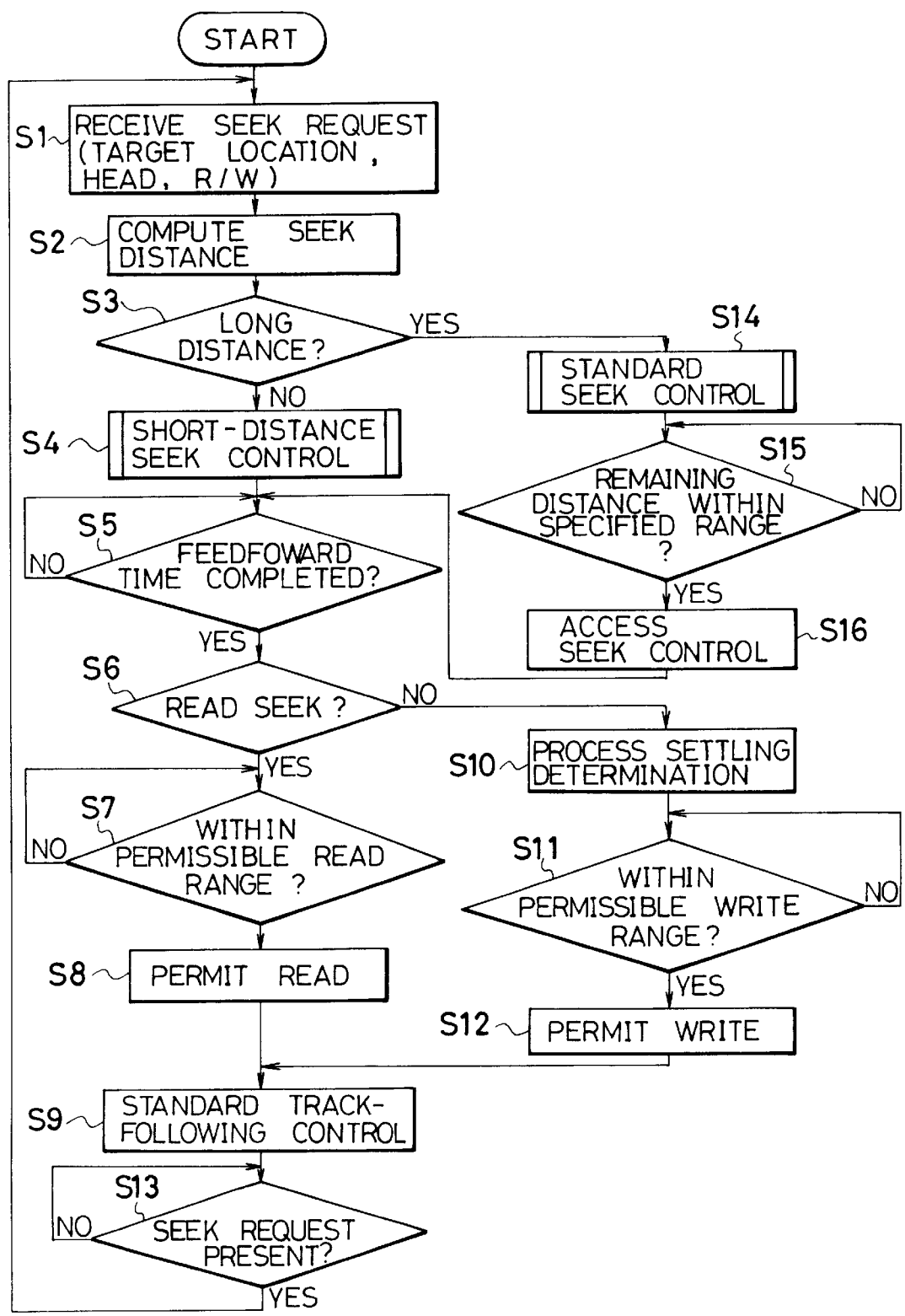
FIG. 48 is a flow diagram showing the seek control of FIG. 47.

FIG. 48 is the flow diagram showing the seek control in the embodiment in FIG. 47. For the short distance seek of the seek distance of 12 tracks or shorter, step S4 in FIG. 14 is used. For the long distance seek of 13 tracks or longer, the seek control in the standard speed control is performed at step S14. In the course of the seek control, a determination is made of whether the remaining distance falls within a designated range, for example, comes close to 1.0 track at step S15. If the remaining distance is close to 1.0 track, the sequence goes to step S16, where the drawing access seek control is performed by the switching control module 275. A series of process involving the settling determination after the drawing access control remains unchanged from those in FIG. 14.

Figure 49A:
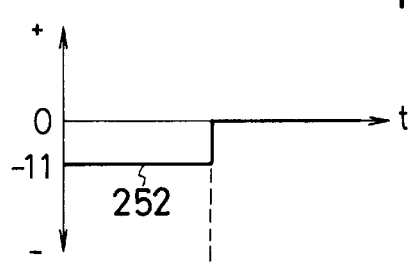
FIGS. 49A–49F are explanatory views showing computing process of the FF current and target location trajectory by the switching control module of FIG. 47.
Figure 49D:
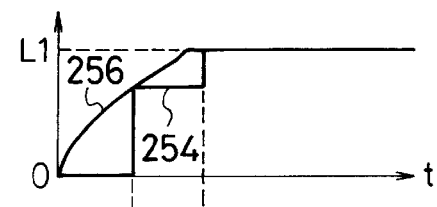

FIGS. 49A–49F show the setting process for the FF current and the target location trajectory by the switching control module 274 in FIG. 47, wherein the control duration to the target location is 4 samples. The first computing module 276 of the switching control module 275 computes the current −I1 that makes the head movement speed V, which is sensed by the speed sensor module 274 at the moment the drawing access control takes over, zero before the target location. The first computing module 276 also computes the target location trajectory that is derived when the current −I1 flows through the actuator 18. FIG. 49A shows a current waveform 252 of the current −I1 computed by the first computing module 276 for making zero the head speed V at the control switching. By allowing the current waveform 252 to flow though the VCM of the actuator 18, the target location trajectory 254 resulting in a head movement trajectory 256 in FIG. 49D is obtained. The seek distance L1 given by the target location trajectory 254 is shorter than the seek distance L0 to the target location, and the head movement speed becomes zero in the middle to the target location. The second computing module 278 in FIG. 47 computes the FF current and the target location trajectory to move the head to the target location over the seek distance L2 (=L0−L1) that is obtained by subtracting the seek distance L1 given by the first computing module 276 from the seek distance L0 to the target location.

Figure 49B:
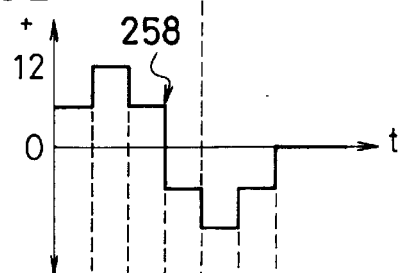
Figure 49E:
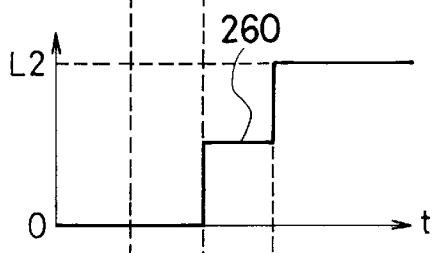

FIG. 49B shows an FF current waveform 258 having a peak current I2 when the seek control is performed over the seek distance L2 in 3 sampling periods. FIG. 49E shows a target location trajectory 260 when the FF current waveform 258 is allowed to flow through the VCM of the actuator 18.

Figure 49C:
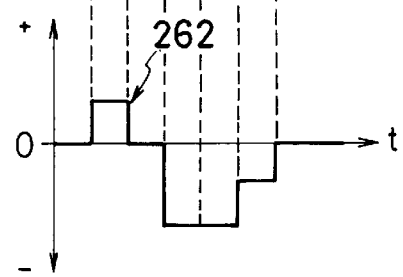
Figure 49F:
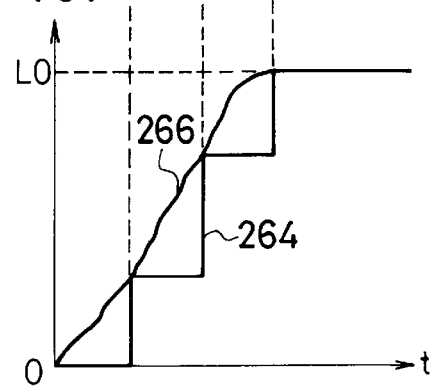

The adder module 280 in FIG. 47 adds the current 252 in FIG. 49A and the FF current 258 in FIG. 49B computed by the first computing module 276 and the second computing module 278 to result in an FF current 262 in FIG. 49C, and the adder module 280 then sets the FF current 262 in the FF current setting module 56 via the setting control module 54. Furthermore, the adder module 280 adds the target location trajectory 254 in FIG. 49D computed by the first computing module 276 and the target location trajectory 260 in FIG. 49E computed by the second computing module 278 to result in a target location trajectory 264 in FIG. 49F, and the adder module 280 sets the target location trajectory 264 in the target location trajectory setting module 58 via the setting control module 54. In the drawing access control after the switching, the FF current 262 in FIG. 49C is fed to the addition point 66 at each ½ sampling timing to cause the current to flow through the VCM of the actuator 18. The target location trajectory 264 in FIG. 49F is fed to the addition point 62 at each sampling timing to determine the error to the head location, and in response to the error, the position feedback control is performed by the position control module 64. As a result, the head is controlled to the target location in 4 samples in the drawing access.

Figure 50:
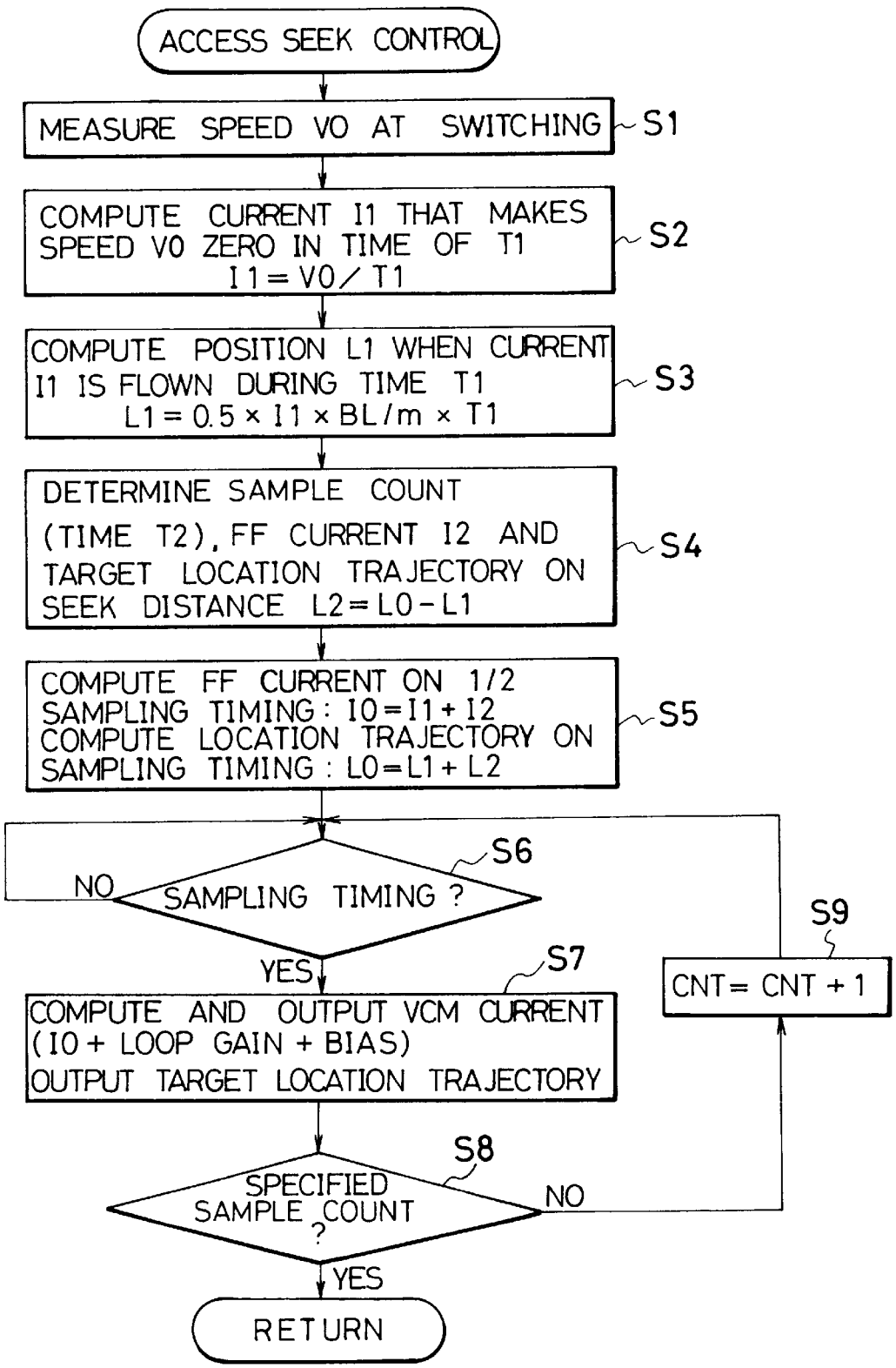
FIG. 50 is a flow diagram showing the access control by the switching control module of FIG. 47.

FIG. 50 is the flow diagram of the drawing access seek control at step S16 in FIG. 48. At step S1, the speed sensor module 274 measures the speed V0 at a switching point. At step S2, the first computing module 276 computes the current I1 that makes the speed V0 zero, time T1 before the target location. At step S3, computed is a location L1 that is reached when the current I1 flows for the duration of T1. Namely, L1=0.5×I1×BL/m×T1 is determined. At step S4, the second computing module 278 reads and determines the FF current I2 and the target location trajectory changing at a designated sample count from the table of the ROM in connection with the seek distance L2 that is obtained by subtracting the location L1 computed at step S3 from the seek distance L0 to the target location. At step S5, the adder module 280 determines the current I0 from I0=I1+I2 at each sampling timing, and determines the target location trajectory L0=L1+L2 at each sampling timing. At step S6, the sampling timing is determined, and at each sampling timing, the VCM current is computed and output at step S7. Namely, the VCM is obtained by correcting the added current I0 with the loop gain and bias and is output. At step S8, a determination is made of whether a designated sample count is reached. If not yet, the counter CNT of the sample count is increased by 1 at step S9. Each time the sampling timing is reached at step S6, computation and output of the VCM current is repeated at step S7. At step S8, the drawing access is switched to the standard position control at the designated 4-th sample.

Monitoring with a Shock Sensor

Figure 51:
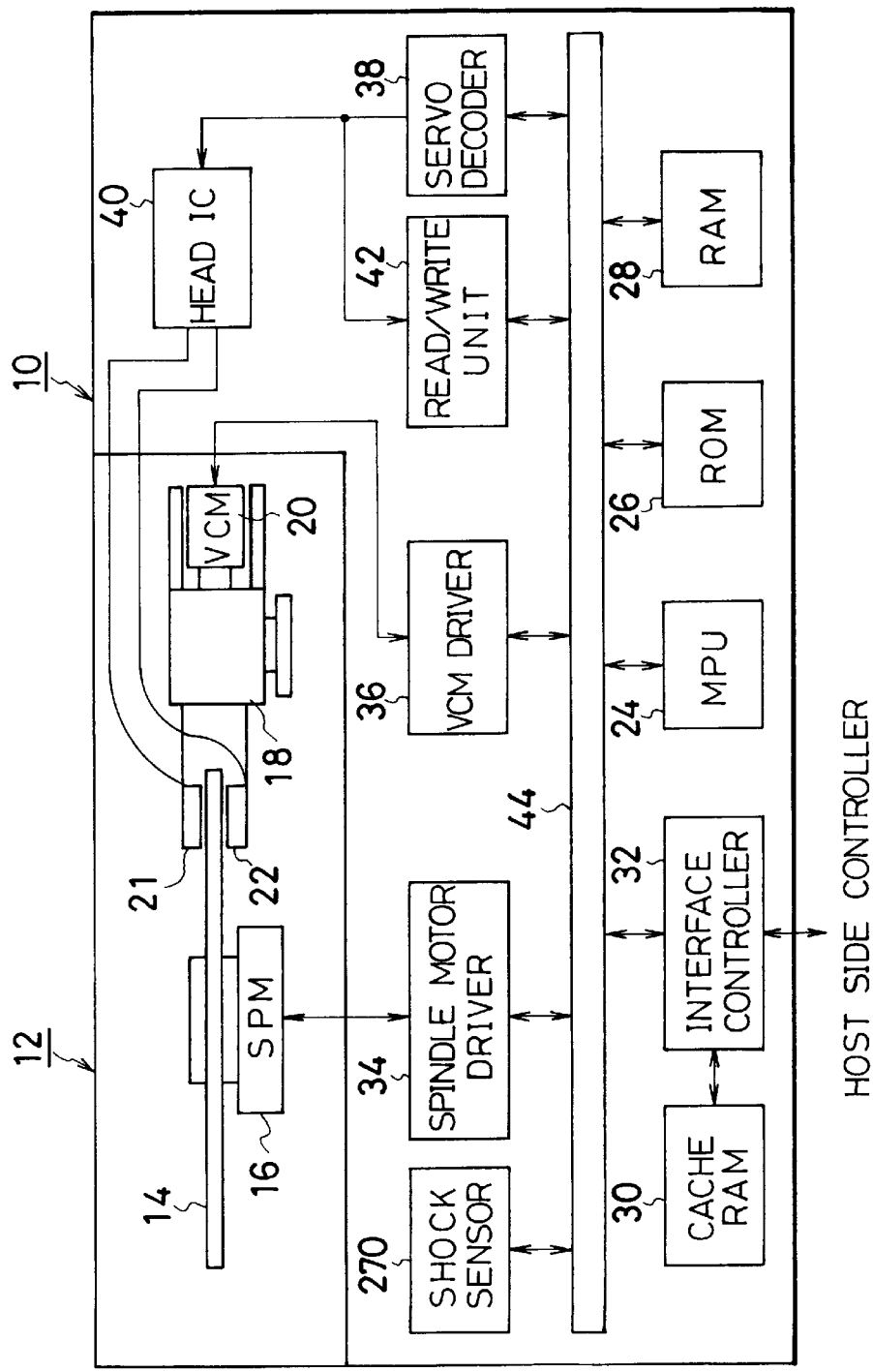
FIG. 51 is a block diagram of an embodiment of the present invention using a shock sensor.

FIG. 51 shows the embodiment in which an seek error is prevented by sensing a shock acting on the apparatus that is in the seek control according to the present invention. The disk storage apparatus according to the present invention constructed of the disk enclosure 12 and the control unit 10 is equipped with a shock sensor 270. An acceleration sensor, for example, is used as the shock sensor 270. The magnitude of a shock picked up by the shock sensor 270, an acceleration, for example, is monitored by MPU 24 during seek control. When a shock above a permissible level is detected, the setting determination is continuously performed until the vibration due to the shock is settled.

Figure 52:
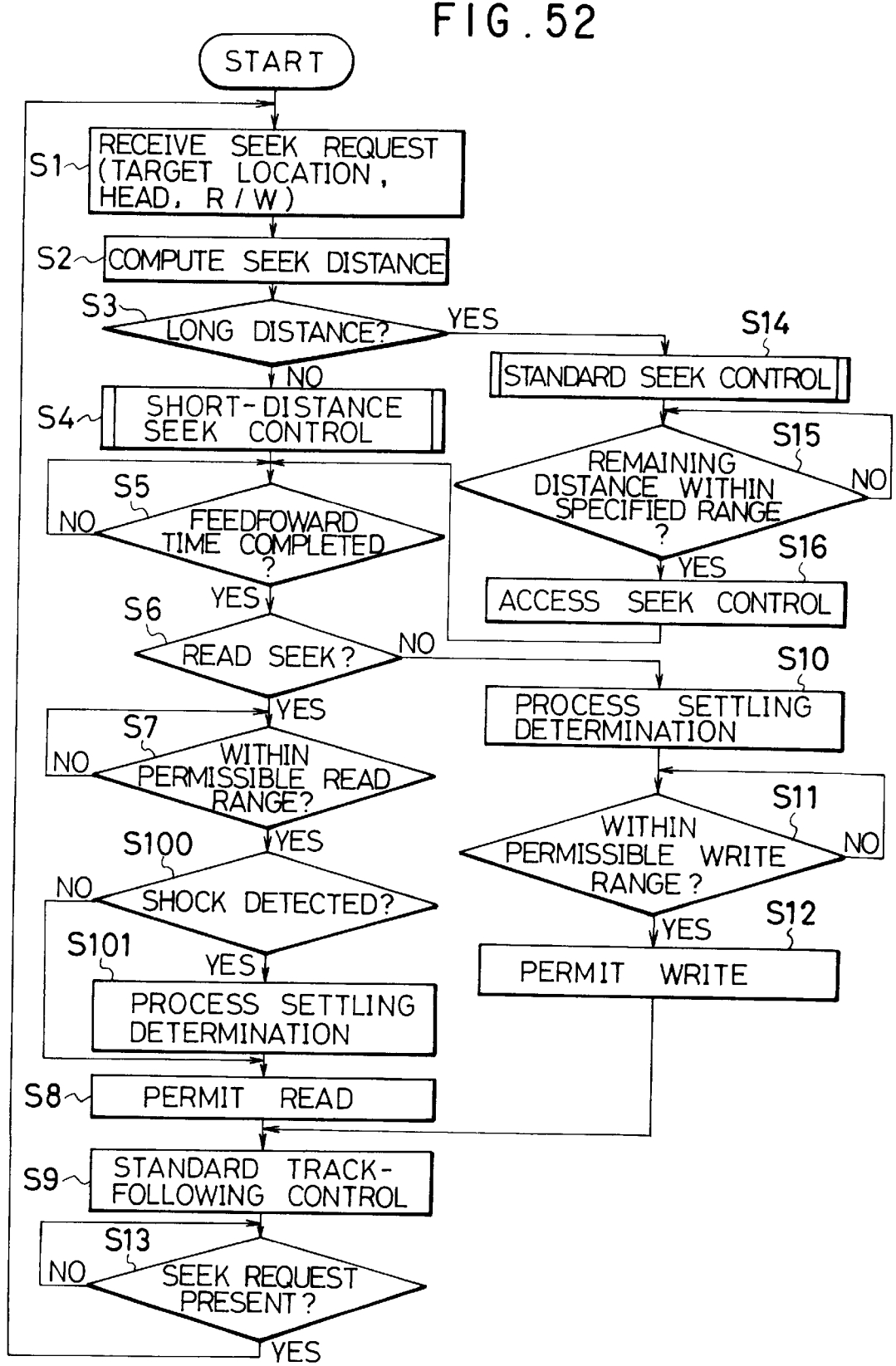
FIG. 52 is a flow diagram of the seek control using a shock sensor.

The flow diagram in FIG. 52 shows the seek control of the present invention with the shock sensor 270 in FIG. 51 mounted. The seek control herein is based on the process of the drawing access control in which the seek control of the present invention is performed before the target location in the standard seek control in FIG. 47. This embodiment may be also applied to the short-distance seek control in FIG. 14. In the flow diagram in FIG. 52, the presence or absence of a shock picked up by the shock sensor is checked at steps S100 in the read seek. If there is a shock in excess of a predetermined value, the settling determination process is continuously performed until the detected value by the shock sensor drops below the predetermined value, at step S101. At step S8, then, the read permission is given. In the write seek, the settling determination condition at step S10 works even under a shock in excess of the predetermined value. If a shock is extremely large enough to generate a large position slip needing no seek control anymore, the seek control may be suspended in its way and speed control is performed to keep the head movement speed zero to prevent the head from moving due to the shock, and the seek control is performed again by a retry action.

In the embodiments of the present invention, the resonance period of the head actuator is considered when determining the waveform period of the FF current. When the resonance of disk enclosure (cabinet) supporting the VCM and the spindle motor can be measured, the waveform and period of the FF current are preferably determined so that the FF current may not influence the resonance of the cabinet.

The disk storage apparatus may be provided with a sensor for measuring sound or a vibration sensor for measuring the vibration of the cabinet, and the waveform and period of the FF cur rent are determined so that the sound and vibration are minimized. The resonance frequency of the apparatus is measured in its user stage, and if any change takes place in the resonance frequency, the waveform and period of the FF current are corrected or modified to accommodate the change, and furthermore, the waveform and period of the FF current are preferably determined to match a resonance frequency slip that is slightly different from apparatus to apparatus.

When the resonance frequency is higher than half the sampling frequency, namely, higher than the Nyquist frequency, the resonance frequency seems folded back from the Nyquist frequency. If the resonance frequency is measured, the optimum period of the FF current in consideration of the folding back due to the Nyquist frequency can be set.

When there is a medium defect or when a track pitch is too large compared to the core width of the read head, brief signal missings may take place, the head location signals N, Q read from the servo patterns in FIG. 5 may suffer brief signal missings. If the seek control is performed using the location signal sampled at a sampling timing at which no normal location signal is acquired, an error is likely. If the timing at which no normal location signal is obtained is predicted, the seek control may be performed when the head passes by that place on the assumption that the target location trajectory is correctly followed. Measured beforehand are the overshoot and undershoot taking place at the timing at which no accurate head location signal is acquired. The correction value of the target location trajectory is determined so that the overshoot and undershoot disappear.

In the above embodiments, the speed of revolution of the disk medium is 5400 rpm, the servo frames per track are 60, and the sampling period is 185.6 $\mu$s. Since the sampling period is the value determined by the speed of revolution of the disk medium and the number of servo frames per track, the present invention is not limited to this value in the embodiments.

According to the present invention, as described above, on a short distance seek of 12 tracks or shorter, preferably on a short distance seek of 1 through 4 tracks, a fast seek control is performed without any effect from mechanical resonance, seek distance difference, seek direction difference, and repeatable and non-repeatable runouts. In particular, on a short distance seek as short as 1 or 2 tracks, the coarse time is restricted to 4 samples (3 sampling periods) or so, and the seek time inclusive of settling is restricted to 10 samples (9 sampling periods) or so. In the disk storage apparatus having a long sampling period for a head location signal from a sector servo, a fast seek control is achieved.

The short-distance seek control as short as 1 or 2 tracks according to the present invention is combined with the drawing access of the standard speed control for the target location according to the speed control of the long-distance seek. Thus, the seek control in the speed control is settled fast.

In the user stage of the apparatus, when the seek time is longer than the intended performance, the calibration is automatically performed to recover the optimum seek condition. The performance of the apparatus is thus reliably assured.

What is claimed is:

1. A disk storage apparatus that performs a seek control for moving a head toward a designated target track location for positioning, in which a head location signal is demodulated at each predetermined sampling period from a read signal which a head reads from servo information discretely recorded on a track of a medium, said disk storage apparatus comprising;

a setting control module, when a short-distance seek is designated, for setting a short-distance coarse control duration that extends over a plurality of sampling periods of the head location signal, and for giving a control instruction at each of the sampling timings including the control start timing of the short-distance control duration, a current setting module for holding beforehand at each of the sampling timings except the timing of the control end of a short-distance seek, the value of a feedforward current required for moving the head from a seek start location to a target location during the short-distance coarse control duration, and for causing a corresponding current to flow through a motor at each sampling timing in response to the instruction from the setting control module, a target location trajectory setting module for holding beforehand as the target location the position of the head movement trajectory at each sampling timing determined by the feedforward current from the current setting module, and for outputting the target location at each sampling timing in response to the instruction from the setting control module, a correction value setting module for holding beforehand the correction value of target location from the target location trajectory setting module, and for outputting the correction value at sampling timing in response to the instruction from the setting control module, and a position control module that performs a position feedback control by correcting at each sampling timing the target location by the correction value to determine an error to the current location and for causing a current to flow through a motor so that the corrected target location is followed based on the position error, wherein the current, setting module outputs an accelerating current and a decelerating current the period of the current waveform that is determined by the duration from the start of the flow of the accelerating current to the end of the flow of the decelerating current is set to be longer than the resonance period of an actuator having a resonance frequency higher than the frequency bandwidth of the position control module, and the accelerating current has a waveform similar to that of the decelerating current.

2. The apparatus according to claim 1, wherein, in the current setting module, the period of the current waveform is set to be longer than the resonance period of a cabinet having a resonance frequency higher than the frequency bandwidth of the position control module.

3. The apparatus according to claim 1, wherein, in the current setting module, the absolute value of the maximum of the accelerating current is equal to the absolute value of the maximum of the decelerating current.

4. The apparatus according to claim 1, wherein, in the current setting module, a zero-current duration is formed between the accelerating current and the decelerating current.

5. The apparatus according to claims 2 to 4, wherein the current setting module outputs a triangular current waveform as the accelerating current and the decelerating current.

6. The apparatus according to claims 2 to 4, wherein the current setting module outputs a rectangular current waveform as the accelerating current and the decelerating current.

7. The apparatus according to claims 2 to 4, wherein the current setting module outputs a trapezoidal current waveform as the accelerating current and the decelerating current.

8. The apparatus according to claim 1, wherein the short-distance coarse control duration set in the setting control module is the sampling timing count according to a seek distance.

9. The apparatus according to claim 8, wherein, when a designated seek distance is one track long, the short-distance coarse control duration set in the setting control module is 2 through 6 sampling timings, and the feedforward current is changed a plurality of times during one sample.

10. The apparatus according to claim 9, wherein, when a designated seek distance is one track long, a triangular current waveform as the accelerating current and the decelerating current is output, a zero-current duration is formed between the accelerating current and the decelerating current and the short-distance coarse control duration set in the setting control module is 5 sampling timings.

11. The apparatus according to claim 8, wherein, when a designated seek distance is one track long, the short-distance coarse control duration set in the setting control module is 5 through 10 sample timings, and the feedforward current is changed once during one sample.

12. The apparatus according to claim 11, wherein, when a designated seek distance is one track long, a triangular current waveform as the accelerating current and the decelerating current is output, a zero-current duration is formed between the accelerating current and the decelerating current, and the short-distance coarse control duration set in the setting control module is 8 sampling timings.

13. The apparatus according to any of claims 9 through 12, wherein the current setting module holds the value of the feedforward current at each of the sampling timings and at each of one or more timings set during each interval between sampling timings, and causes a corresponding current to flow at each of the timings.

14. The apparatus according to claim 1, wherein, when a current output is delayed at a seek start timing, the current setting module heightens the current value to compensate for the current corresponding to the delay time.

15. The apparatus according to claim 1, wherein the target location trajectory setting module sets the target location at each of the sampling timings by determining the target location trajectory based on the feedforward current over a corrected seek distance that is corrected to be shorter than the seek distance designated by the seek command.

16. The apparatus according to claim 15, wherein the target location trajectory setting module corrects the seek distance designated by the seek command to be shorter within a range of 10%.

17. The apparatus according to claim 16, wherein the target location trajectory setting module uses a value corrected through simulation as the target location, at each of the sampling timings, of the head movement trajectory determined by the feedforward current.

18. The apparatus according to claim 16, wherein the target location trajectory setting module uses a value corrected calibration as the target location, at each of the sampling timings, of the head movement trajectory determined by the feedforward current.

19. The apparatus according to claim 18, wherein the target location trajectory setting module corrects only the value at the final sampling timing out of the target location trajectory.

20. The apparatus according to claim 1, wherein the target location trajectory setting module holds the target location at each of the sampling timings of the target location trajectory according to a seek direction.

21. The apparatus according to claim 1, wherein the target location trajectory setting module holds the target location, at each of the sampling timings, of the target location trajectory according to a seek distance.

22. The apparatus according to claim 1, wherein the target location trajectory setting module holds offset measurements due to track position shifting in synchronism with the rotation of a disk, on a per sector location basis, the sector location common to all tracks, corrects the seek distance of the seek command based on the offset measurement of a seek start sector and the offset measurement of a target sector, and determines the target location trajectory based on the feedforward current over the corrected seek distance to hold the target location at each of the sampling timings.

23. The apparatus according to claim 22, wherein the target location trajectory setting module corrects the target location at each of the sampling timings of the target location trajectory of the seek distance of the seek command according to the ratio of the offset measurements of the seek start sector and the target sector.

24. The apparatus according to claim 1, wherein the target location trajectory setting module holds offset measurements corresponding to a head switching, and when receiving a seek command involving a head switching, the target location trajectory setting module determines the target location trajectory based on the feedforward current of the seek distance corrected by the offset measurement of the head switching, and holds the target location at each of the sampling timings.

25. The apparatus according to claim 24, wherein the target location trajectory setting module corrects the target location at each sampling timing of the location trajectory based on the seek distance of the seek command by the offset measurements before and after the head switching.

26. The apparatus according to claim 1 further comprising a settling determination module for determining whether a head location is within a predetermined permissible read range at the end of the short-distance coarse control when a seek command for reading is received, and for giving a read permission immediately when the head location is within the predetermined permissible read range.

27. The apparatus according to claim 1 further comprising a shock sensor and a settling determination module, whereby said settling determination module gives no read permission immediately after the short-distance coarse control ends when the sensor detects a shock in the course of the short-distance coarse control, but waits until the sensor detects no shock and then gives a read permission.

28. The apparatus according to claim 1 further comprising a settling determination module which determines, in response to a seek command for writing, at the end of the short-distance coarse control, whether a predetermined settling condition is satisfied, and which gives a write permission when the predetermined settling condition is satisfied.

29. The apparatus according to claim 1 further comprising a switching control module for performing a speed control in which a target speed is followed according to a remaining distance to the target location when a long-distance seek is designated, and for performing a short-distance seek control by the current setting module, the target location trajectory setting module and the correction value setting module when the remaining distance to the target location becomes shorter than a predetermined distance.

30. The apparatus according to claim 29, wherein said switching control module comprising:
   a speed sensor module for sensing a head speed when a long-distance seek control is switched to the short-distance seek control,
   a first computing module for computing a feedforward current I1 for making the head speed at the switching to zero, a distance run L1 when the feedforward current I1 flows the motor, and a target location at each of the sampling timings,
   a second computing module for computing a feedforward current I2 at each of the sampling timings for performing the short-distance seek control to a short distance L2 that is obtained by subtracting the distance L1 given by the first computing module from the distance L0 to the target location, and the location at each of the sampling timings of the target location trajectory when the feedforward current I2 flows through the motor,
   an adder module for adding two types of feedforward currents and target locations from the first computing module and the second computing module, whereby by the short-distance coarse control to the target location L0 is performed based on the feedforward current I0 and the target trajectory location from the adder module.

31. The apparatus according to claim 1 further comprising a calibration module for automatically performing calibration based on statistic information of seek time in the short-distance coarse control.

32. The apparatus according to claim 31, wherein the calibration module comprising:
   a time measuring module for measuring and then storing the seek time from the start of a seek to the end of settling on a per seek distance basis for each short-distance seek control,
   an initiator module for determining the probability distribution of seek times of equal seek distances and initiating calibration when the seek time giving a predetermined probability is longer than a predetermined reference time, and
   a calibration execution module for performing a predetermined calibration in response to the calibration initiated by the initiator module.

33. The apparatus according to claim 31, wherein the calibration execution module measures the loop gain of the position control module and corrects the loop gain when the measured loop gain fails to agree with the optimum value set at initial setting.

34. The apparatus according to claim 31, wherein the calibration execution module measures seek times by performing short-distance control by selecting a plurality of feedforward currents and set values of target position trajectory corresponding to the plurality of feedforward currents, and then selects the feedforward current out of the plurality of feedforward currents that results in the shortest seek time to cause the feedforward current setting module to store the feedforward current.

* * * * *

UNITED STATES PATENT AND TRADEMARK OFFICE
CERTIFICATE OF CORRECTION

PATENT NO. : 5,859,742
DATED : January 12, 1999
INVENTOR(S) : Kazuhiko Takaishi

It is certified that error appears in the above-identified patent and that said Letters Patent is hereby corrected as shown below:

On the Title Page of the Patent:

Under "[56] References Cited for Foreign Patent Documents", delete "9010630" and insert --9010930-- therefor Under "[56] References Cited for Other Publications", title page, Col. 2, line 9, delete "Hira" and insert --Hirai-- therefor Under "[56] References Cited for Other Publications", title page, Col. 2, line 14, delete "Hira" and insert --Hirai-- therefor

UNITED STATES PATENT AND TRADEMARK OFFICE
CERTIFICATE OF CORRECTION

PATENT NO. : 5,859,742
DATED : January 12, 1999
INVENTOR(S) : Kazuhiko Takaishi

It is certified that error appears in the above-identified patent and that said Letters Patent is hereby corrected as shown below:

Under "[56] References Cited for Other Publications", title page, Col. 2, line 17, delete "Tsumtou" and insert --Tsutomu-- therefor Under "[56] References Cited for Other Publications", page 2, Col. 2, line 10, delete "Fujisu" and insert --Fujitsu-- therefor Column 28, delete "$\leq$" and insert --$\geq$-- therefor (line 23)

Column 28, delete "$\leq$" and insert --$\geq$-- therefor (line 25)

Column 28, delete "$\leq$" and insert --$\geq$-- therefor (line 29)

UNITED STATES PATENT AND TRADEMARK OFFICE
CERTIFICATE OF CORRECTION

PATENT NO.   : 5,859,742
DATED        : January 12, 1999
INVENTOR(S)  : Kazuhiko Takaishi It is certified that error appears in the above-identified patent and that said Letters Patent is hereby corrected as shown below:

Column 31, line 32, delete "cur rent" and insert --current-- therefor

Column 33, line 4, insert --,-- after

"decelerating current"

Signed and Sealed this

Fifteenth Day of February, 2000

Attest:

Attesting Officer

Q. TODD DICKINSON

Commissioner of Patents and Trademarks